US006623900B1

(12) United States Patent
Saito

(10) Patent No.: US 6,623,900 B1
(45) Date of Patent: **\*Sep. 23, 2003**

(54) PHTHALOCYANINE COMPOUND AND ORGANIC PHOTOCONDUCTOR

(75) Inventor: Yoshitaka Saito, Saitama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/587,512

(22) Filed: Jun. 5, 2000

Related U.S. Application Data

(62) Division of application No. 08/593,338, filed on Jan. 29, 1996, now Pat. No. 6,117,604.

(30) Foreign Application Priority Data

Apr. 28, 1995 (JP) .............................................. 7-106243

(51) Int. Cl.[7] ................................................. G03G 5/06
(52) U.S. Cl. ....................... 430/78; 430/59.5; 540/140; 540/141; 252/501.1; 106/410
(58) Field of Search ................... 430/56, 59.5, 78; 540/140, 141; 252/501.1; 106/410, 411, 412, 413

(56) References Cited

U.S. PATENT DOCUMENTS 6,117,604 A * 9/2000 Saito ........................... 430/78

FOREIGN PATENT DOCUMENTS

JP A-5-273775 10/1993

OTHER PUBLICATIONS

Patent & Trademark Office English–Language Translation of JP 05–273775 (Pub Oct. 1993).*
Watanabe et al.,; "Formation and Characteristics of Titanyl Phthalocyanine Crystals Containing Diol compounds", Japan Hard Copy (1992), pp. 153–156.
Watanabe et al.,; "Syntheses and Properties of Titanyl Phthalocyanine New Polymorphs", Japan Hard Copy (1993), pp. 659–662.
Caplus abstract AN: 1994:232008 of JP 05–273775 (Pub Oct. 1993).
Japio abstract AN: 93: 273775 of JP 05–273775 (Pub Oct. 1993).

* cited by examiner

Primary Examiner—Janis L. Dote
(74) Attorney, Agent, or Firm—Armstrong, Westerman & Hattori, LLP

(57) ABSTRACT

A di-substituted alkylene glycolate titanium phthalocyanine compound comprising a reaction mixture of a threo-alkanediol having one hydroxy group per each of the two adjacent carbon atoms, said carbon atoms each being a secondary carbon atom, and an oxytitanium phthalocyanine compound, and an organic photoconductor comprising the di-substituted alkylene glycolate titanium phthalocyanine compound are disclosed.

11 Claims, 31 Drawing Sheets

PHTHALOCYANINE COMPOUND AND ORGANIC PHOTOCONDUCTOR

This application is a division of prior application Ser. No. 08/593.338, filed Jan. 29, 1996, U.S. Pat. No. 6,117,604.

FIELD OF THE INVENTION

The present invention relates to a novel phthalocyanine compound. Also, the invention relates to an organic photoconductor and also a multilayer-type or monolayer-type organic photoconductor being used for, for example, copying machines, LD (laser diode) printers, LED (light emitting diode) printers, etc.

BACKGROUND OF THE INVENTION

Phthalocyanine series compounds are known as pigments for a long time but recently these compounds are also being watched with keen interest as the materials responding to a near infrared light source having a long wavelength.

In particular, as the materials being used for organic photoconductors of copying machines, LD printers, LED printers, etc., utilizing a light source of a long wavelength of near 800 nm, such as a semiconductor laser and light emitting diode (LED) with the recent development of electronic industry, the phthalocyanine series compounds responding to these light sources being watched with keen interest.

In the preprints, Japan Hardcopy '92, pages 153–156, 1992 Densi Shashin Gakkai (Electrophotographic Society), there is described a lecture gist entitled "Formation and Properties of Titanyl Phthalocyanine Crystals containing Diol Compound" and in the preprints, Japan Hardcopy '93, pages 659–662, 1993 Densi Shasin Gakkai (Electrophotographic Society), there is described a lecture gist entitled "Syntheses and Properties of Titanyl Phthalocyanine new Polymorphs". Also, in JP-A-5-273775 (the term "JP-A" as used herein means an "unexamined published Japanese patent application"), there is described that a diol compound having one hydroxy group at each of two adjacent carbon atoms, such as, for example, 2,3-butanediol, etc., reacts with oxytitanium phthalocyanine at an addition ratio of 1:2 to form an addition compound and the possibility capable of being used for organic photoconductors, etc., is suggested.

As the material responding to a near infrared light source, a material having a light absorption at a longer wavelength region is preferred but in the compound obtained by reacting commercially available 2,3-butanediol as it is with titanyl phthalocyanine, there are problems that the absorption wavelength is not in a sufficiently long wavelength region, etc.

Furthermore, when a steroisomer group can exist in a diol compound such as 2,3-butanediol, by such a broad concept expression, it is unknown that a phthalocyanine compound is obtained by what kind of an isomer diol and for example, an organic photoconductor using a compound obtained by performing the reaction of meso-isomer diol and oxytitanium phthalocyanine has a fault that a sufficient sensitivity is not obtained.

SUMMARY OF THE INVENTION

When the present inventor has made various investigations under the circumstances described above, it has been discovered that the absorption wavelength of a reaction mixture of a diol compound having a specific isomer structure and an oxytitanium phthalocyanine compound and/or a di-substituted alkylene glycolate titanium phthalocyanine compound having a specific isomer structure, the compound being produced regardless of types of synthesis, exist in a long wavelength region and each of these compounds has selectively excellent absorption characteristics and that an organic photoconductor containing a reaction mixture of a diol compound having a specific isomer structure and an oxytitanium phthalocyanine compound and/or the foregoing di-substituted alkylene glycolate titanium phthalocyanine compound having the specific isomer structure has a selectively excellent sensitivity, and the present invention has been accomplished based on the discoveries.

That is, according to an aspect of the present invention, there is provided a reaction mixture of a threo-alkanediol having one hydroxy group at each of two adjacent carbon atoms thereof, said carbon atoms each being a secondary carbon atom, and an oxytitanium phthalocyanine compound.

According to other aspect of the present invention, there is provided a phthalocyanine compound represented by formula (I)

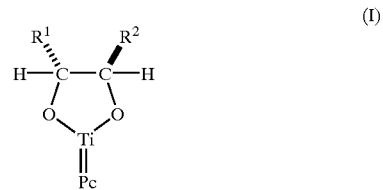

wherein $R^1$ and $R^2$ each independently represents a substituted or unsubstituted alkyl group and Pc represents a substituted or unsubstituted phthalocyanine residue.

According to another aspect of the present invention, there is provided an organic photoconductor comprising the reaction mixture described above and/or the phthalocyanine compound described above.

DETAILED DESCRIPTION OF THE INVENTION

Figure 1:
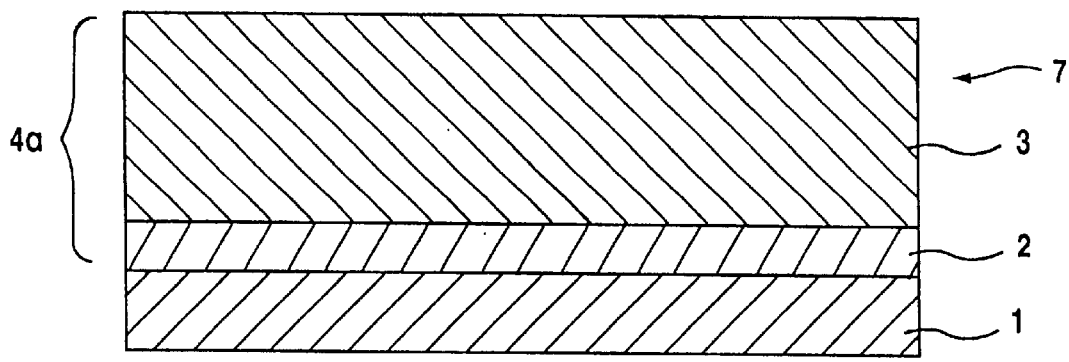
FIG. 1 is a schematic enlarged cross sectional view showing an embodiment of the layer structure of the organic photoconductor of the present invention.

Then, the present invention is described in detail.

The phthalocyanine compound represented by formula (I) of the present invention is a threo-di-substituted alkylene glycolate titanium phthalocyanine compound which is the reaction product obtained by reacting (a) at least one of the two optical isomers of a threo-alkanediol having one hydroxy group at each of the two adjacent carbon atoms thereof, said carbon atoms each being a secondary carbon atom with (b) an oxytitanium phthalocyariine compound.

In the present invention, the reaction mixture may contain the starting phthalocyanine compound, and in this case, the mixture can be obtained in substantially the same manner as the production of the compound represented by formula (I) described above.

Further, the term "reaction mixture" as used in the present invention includes the case consisting of the reaction product obtained by reacting the component (a) with the component (b).

The term "di-substituted" means that each of two adjacent carbon atoms in the 5-membered alkylene glycolate titanium ring is substituted by a substituent group other than a hydrogen atom. In this case, the carbon atoms are asymmetric carbon atoms.

Accordingly, formula (I) shown above includes the three kinds of the compounds based on the diol variety being used.

That is, the phthalocyanine compound of the present invention is the di-substituted alkylene glycolate titanium phthalocyanine compound shown by formula (II),

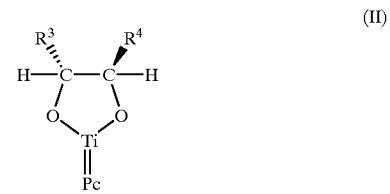

(II)

the di-substituted alkylene glycolate titanium phthalocyanine compound shown by formula (III),

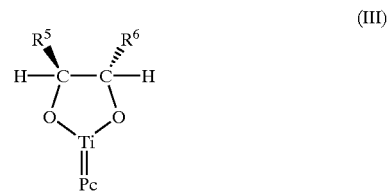

(III)

or a mixture of the foregoing two compounds.

In formulae (I), (II), and (III) described above, $R^1$, $R^2$, $R^3$, $R^4$, $R^5$, and $R^6$ each independently represents a substituted or unsubstituted alkyl group and Pc represents a substituted or unsubstituted phthalocyanine residue.

As is clear from formulae (I) to (III) shown above, the feature of the phthalocyanine compound of the present invention is that the compound has the structure that the cyclic alcoholate titanium of the specific isomer structure is bonded to two nitrogen atoms at the center of the phthalocyanine residue.

Also, the feature of the organic photoconductor of the present invention is that the organic photoconductor contains a reaction mixture of a threo-alkanediol having one hydroxy group at each of the two adjacent carbon atoms thereof, said carbon atoms each being a secondary carbon atom, and an oxytitanium phthalocyanine compound. Further, the largest feature of the organic photoconductor of the present invention is that the reaction mixture includes the phthalocyanine compound which is the reaction product containing the foregoing threo-di-substituted alkylene glycolate titanium phthalocyanine compound.

As specific examples of the structural formula of such a threo-di-substituted alkylene glycolate titanium phthalocyanine compound which is included by the above-described reaction mixtures including the compound of formula (I), the following structural formulae can be illustrated.

In addition, in the following formulae, Me represents a methyl group, Et represents an ethyl group, n-Pr represents a straight chain propyl group, iso-Pr represents a iso-propyl group, Ph represents a phenyl group, Bz represents a benzyl group, and Pc represents a substituted or unsubstituted phthalocyanine residue. Also, the numeral in ( ) described at the right side of each structural formula shows No. of the illustrated compound.

(1)

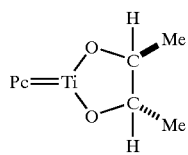

(2)

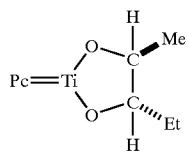

(3)

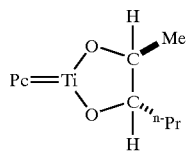

(4)

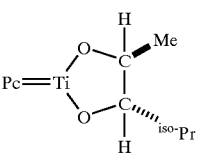

-continued (5)

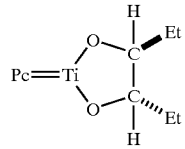

(6)

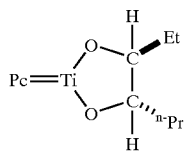

(7)

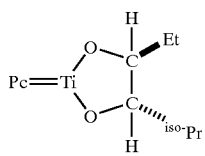

(8)

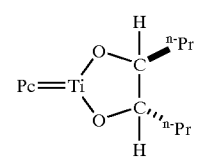

(9)

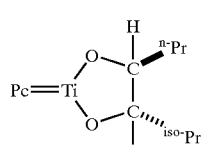

(10)

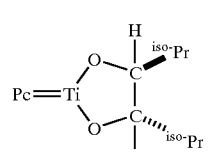

(11)

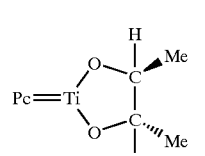

(12)

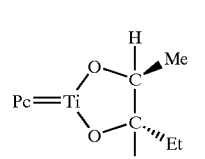

(13)

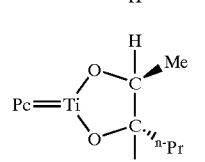

(14)

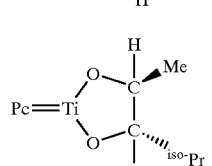

-continued
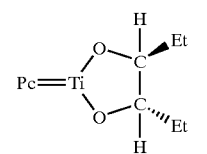 (15)
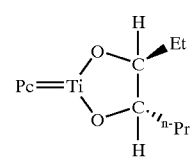 (16)
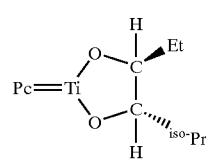 (17)
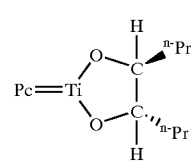 (18)
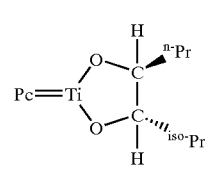 (19)
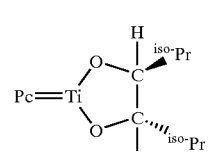 (20)
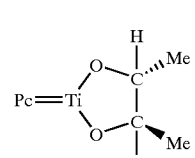 (21)
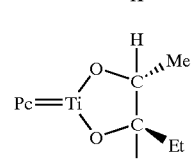 (22)
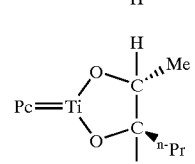 (23)
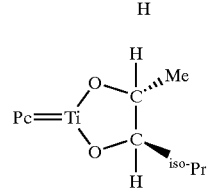 (24)
-continued
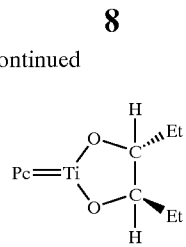 (25)
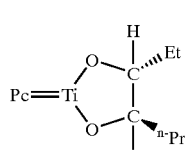 (26)
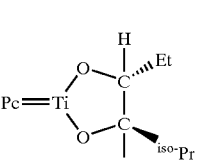 (27)
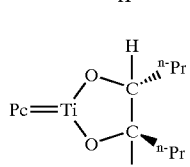 (28)
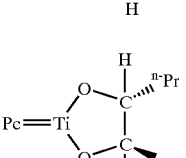 (29)
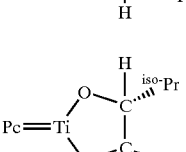 (30)
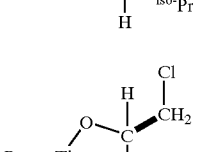 (31)
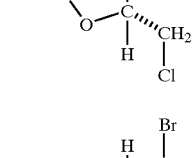 (32)
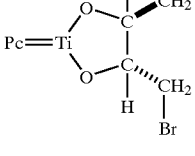 (33)
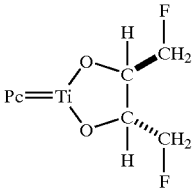

-continued
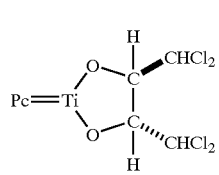 (34)
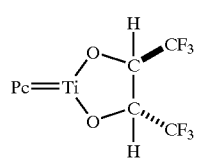 (35)
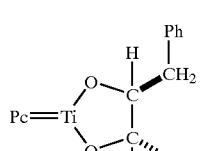 (36)
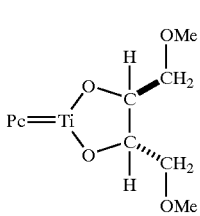 (37)
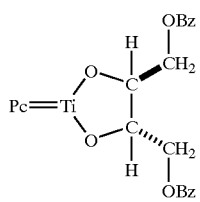 (38)
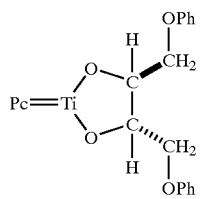 (39)
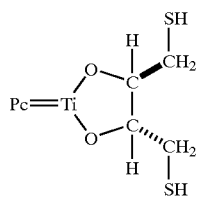 (40)
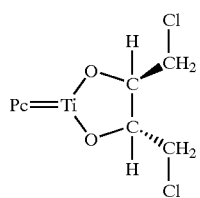 (41)
-continued
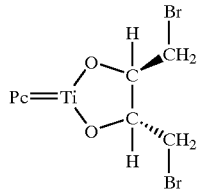 (42)
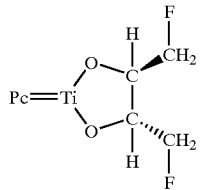 (43)
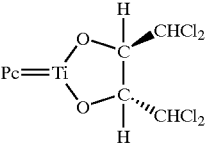 (44)
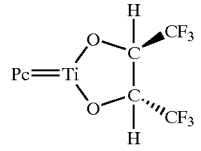 (45)
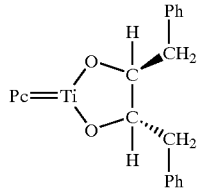 (46)
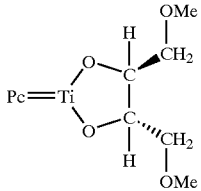 (47)
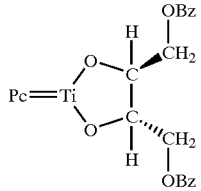 (48)
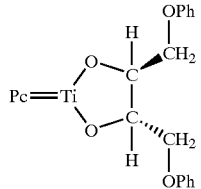 (49)

(50) 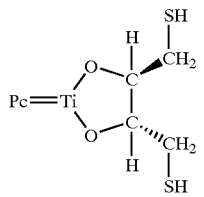

(51) 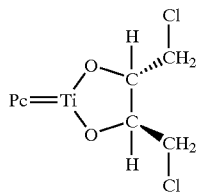

(52) 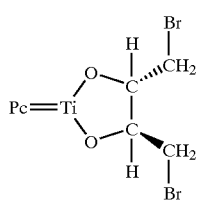

(53) 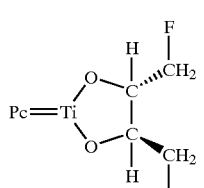

(54) 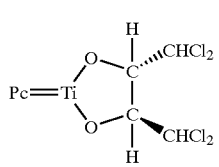

(55) 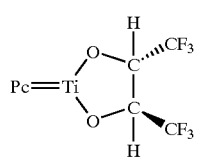

(56) 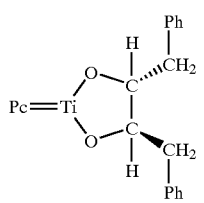

(57) 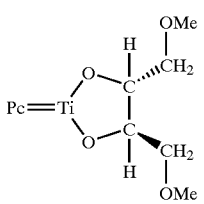

(58) 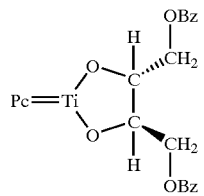

(59) 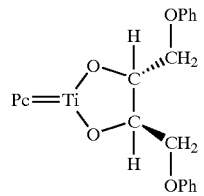

(60) 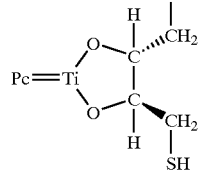

In addition, the phthalocyanine residue in this invention is shown, for example, by formula (IV);

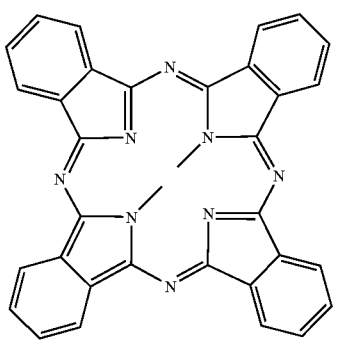

(IV)

In the case of the phthalocyanine compound of the present invention and the di-substituted alkylene glycolate titanium phthalocyanine compound which is included in the reaction mixture used in the organic photoconductor of the present invention (hereinafter referred to as "the di-substituted alkylene glycolate titanium phthalocyanine compound used in the organic photoconductor of the present invention"), the hydrogen atom(s) of the benzene ring of the phthalocyanine residue may be unsubstituted or substituted and when the hydrogen atom is substituted, as the substituent, there are, for example, a halogen atom such as chlorine, bromine, etc.; an alkyl group such as methyl, ethyl, etc.; or an alkoxy group such as methoxy, ethoxy, etc.

Also, the phthalocyanine compound of this invention may be a ring-expanded type phthalocyanine derivative such as a naphthalocyanine compound, etc. In the case of the di-substituted alkylene glycolate titanium phthalocyanine compound used in the organic photoconductor of this invention, the phthalocyanine residue is preferably an unsubstituted phthalocyanine residue.

The threo-alkanediol having one hydroxy group at each of the two adjacent carbon atoms thereof, each carbon atom being a secondary carbon atom, which can be preferably used in the reaction with the oxytitanium phthalocyanine compound for obtaining the phthalocyanine compound of the present invention or which can be used for obtaining the di-substituted alkylene glycolate titanium phthalocyanine compound used in the organic photoconductor of the present invention is, for example, the threo-alkanediol shown by formula (V):

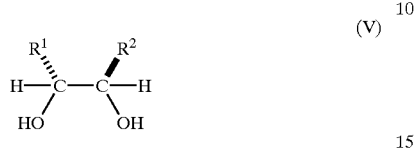

(V)

The threo-alkanediol shown by the above formula (V) includes the diol compound having the specific isomer structure shown by formula (VI) and/or the diol compound having the specific isomer structure shown by formula (VII);

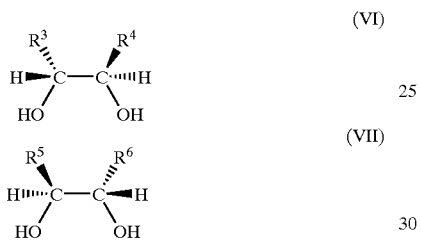

(VI)

(VII)

In formulae (V), (VI), and (VII) described above, $R^1$, $R^2$ $R^3$, $R^4$, $R^5$, and $R^6$ each independently represents an alkyl group, which may be substituted, and as the substituent thereof, there are various functional groups, for example, a halogen atom such as chlorine, bromine, etc.; an alkyl group such as methyl, ethyl, t-butyl, etc.; an alkoxy group such as methoxy, ethoxy, etc.; a substituted or unsubstituted aryl group such as phenyl, naphthyl, etc.; a substituted or unsubstituted aryloxy group such as benzyloxy, etc.; a substituted or unsubstituted heterocyclic group such as pyridyl, etc.; a substituted or unsubstituted amino group; and a substituted or unsubstituted thiol group.

As specific examples of the structural formula of the diol compound having the foregoing specific isomer structure, the following structural formulae can be illustrated.

In addition, in the following formulae, Me represents a methyl group, Et represents an ethyl group, n-Pr represents a straight chain propyl group, iso-Pr represents an iso-propyl group, Ph represents a phenyl group, and Bz represents a benzyl group. Also, the numeral in ( ) described at the right side of each structural formula shows No. of the illustrated compound.

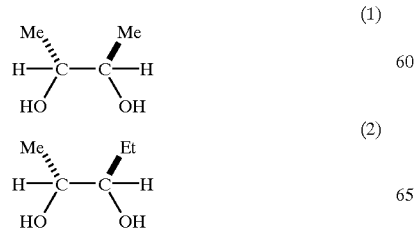

(1)

(2)

-continued (3)

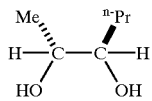

(4)

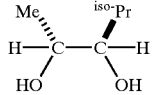

(5)

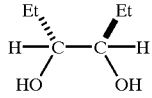

(6)

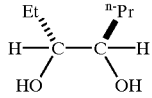

(7)

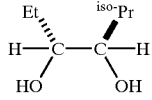

(8)

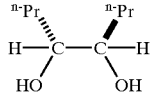

(9)

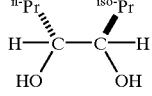

(10)

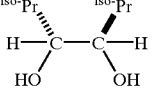

(11)

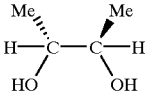

(12)

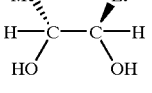

(13)

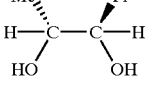

(14)

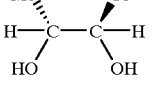

(15)

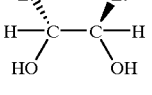

(16)

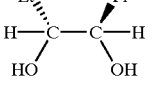

-continued
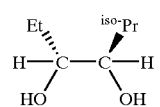 (17)
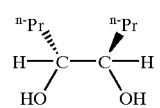 (18)
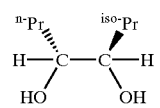 (19)
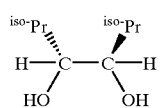 (20)
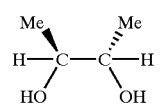 (21)
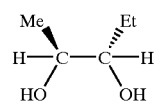 (22)
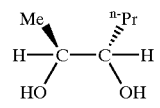 (23)
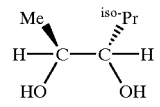 (24)
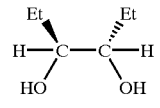 (25)
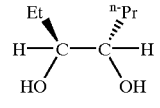 (26)
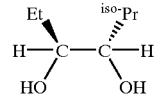 (27)
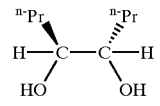 (28)
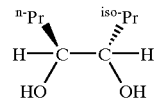 (29)
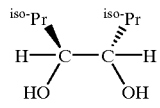 (30)
-continued
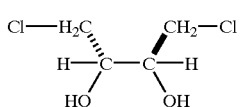 (31)
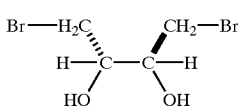 (32)
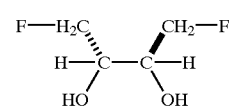 (33)
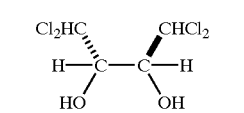 (34)
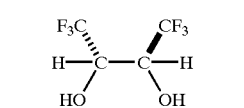 (35)
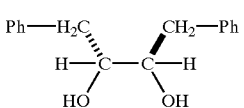 (36)
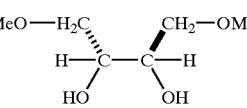 (37)
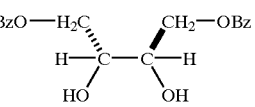 (38)
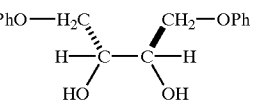 (39)
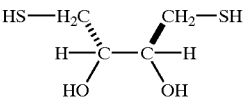 (40)
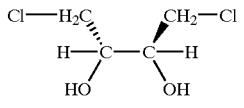 (41)
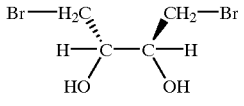 (42)
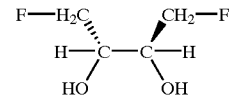 (43)
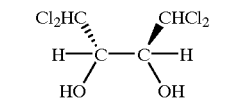 (44)

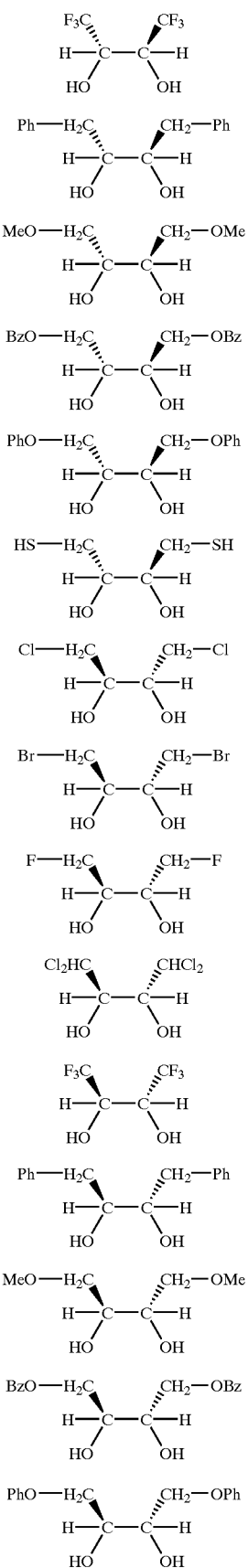

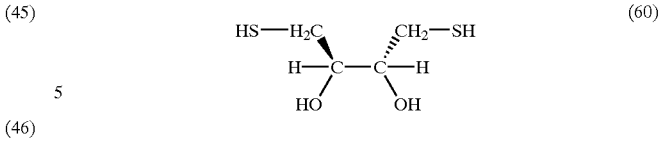

In these diol compounds, as the diol compound having the specific isomer structure which can be preferably used in the reaction with the oxytitanium phthalocyanine compound for obtaining the di-substituted alkylene glycolate titanium phthalocyanine compound used in the organic photoconductor of the present invention, a threo-2,3-butanediol compound is preferable and as the foregoing threo-2,3-butanediol compound, at least one compound selected from the group consisting of (2R,3R)-(−)-2,3-butanediol, (2S,3S)-(+)-2,3-butanediol, (2R,3R)-(+)-1,4-bis(benzyloxy)-2,3-butanediol, and (2S,3S)-(−)-1,4-bis(benzyloxy)-2,3-butanediol is more preferred.

As the oxytitanium phthalocyanine compound which can be preferably used for obtaining the phthalocyanine compound of the present invention and the di-substituted alkylene glycolate titanium phthalocyanine compound used in the organic photoconductor of the present invention, any oxytitanium phthalocyanine compounds may be used if these compounds each has oxytitanium at the center of the substituted phthalocyanine residue and/or the unsubstituted phthalocyanine residue and if the effects of the present invention are not reduced by these compounds. Also, the oxytitanium phthalocyanine compounds may be of an any crystal type if the effects of the present invention are not reduced.

As the examples, there are substituted oxytitanium phthalocyanine compounds and/or unsubstituted oxytitanium phthalocyanine compounds of a.crystal type such as an α type, a β type, an α,β mixed type, a γ type, a Y type, an amorphous type, etc. Further, a ring-expanded type oxytitanium phthalocyanine derivative such as an oxytitanium naphthalocyanine compound may also be used. Furthermore, these compounds can be used singly or as a mixture thereof if the effects of the present invention are not reduced.

Also, the foregoing oxytitanium phthalocyanine compounds can be produced by a conventionally known process. For example, the oxytitanium phthalocyanine compound can be obtained by hydrolyzing dichlorotitanium phthalocyanine (or the derivative thereof) obtained by the reaction of titanium tetrachloride and orthophthalodi-nitrile (or the derivative thereof) or can be obtained by the reaction of titanium tetraalkoxide such as titanium tetrabutoxide, etc., and 1,3-diiminoisoindoline (or the derivative thereof).

There is no particular restriction on the production process of the phthalocyanine compound of the present invention and the reaction mixture which is used in the organic photoconductor of the present invention but these can be produced by, for example, the dehydrocondensation reaction of an oxytitanium phthalocyanine compound and a diol compound having a specific isomer structure.

The reaction of an oxytitanium phthalocyanine compound and the diol having a specific isomer structure for obtaining the phthalocyanine compound of the present invention and the reaction mixture used in the organic photoconductor of the present invention is preferably carried out under a heating condition and the reaction temperature is in the range of preferably from 30° C. to 300° C. and more preferably from 50° C. to 250° C.

Also, the equivalent of the oxytitanium phthalocyanine compound and the diol having the specific isomer structure in the reaction described above is preferably from 0.25 to 5.0 mol equivalent, and more preferably from 0.5 to 1.5 mol equivalent.

As a matter of course, other production processes than the foregoing process can be used for producing the phthalocyanine compound of the present invention and the reaction mixture used in the organic photoconductor of the present invention. As the examples of such production process, there are a coupling reaction by the dehydrohalogenation of a di-halotitanium phthalocyanine compound such as dichlorotitanium phthalocyanine, etc., and the diol compound of a specific isomer structure having a hydroxy group at each of the adjacent carbon atoms and a coupling reaction of a titanium salt such as titanium tetrachloride, etc., and an ortho-phthalonitrile derivative in the presence of a diol compound of a specific isomer structure having a hydroxy group at each of the adjacent groups thereof.

At the practice of the foregoing reaction, if necessary, various kinds of organic solvents, which are known and conventionally used, can be used together. Examples of the organic solvents are aromatic organic solvents such as benzene, nitrobenzene, dichlorobenzene, trichlorobenzene, α-chloronaphthalene, etc.; ketone series organic solvents such as cyclohexanone, methyl ethyl ketone, methyl isobutyl ketone, etc.; ether series organic solvents such as tetrahydrofuran, dimethyl cellosolve, etc.; ester series organic solvents such as ethyl butanate, butyl lactate, etc.; nonprotonic polar organic solvents such as dimethylformamide, dimethyl sulfoxide, etc.; halogen series organic solvents such as trichloroethane, etc.; and monohydric alcohol series organic solvents such as amyl alcohol, dodecanol, etc. These organic solvents may be used singly or as a mixture thereof.

Also, as a matter of course, at the case of obtaining the phthalocyanine compound of the present invention and the phthalocyanine compound which is the feature of the organic photoconductor of the present invention, if necessary, the phthalocyanine compound may be purified and as the examples thereof, there are a method of sublimating purification, etc.

Moreover, the production conditions for producing the phthalocyanine compound of the present invention and the phthalocyanine compound which is the feature of the organic photoconductor of the present invention, such as the reaction equivalent ratio, the reaction temperature, the reaction temperature, the solvent, the catalyst, the purification method, the crystallization method, etc., may be properly selected.

In addition, the phthalocyanine compound of the present invention can be easily obtained by the reaction of the diol compound having the foregoing specific isomer structure and the oxytitanium phthalocyanine compound and as a matter of course, in this case, it is preferred that the diasteroisomer of the diol having the foregoing specific isomer structure is not used together with the dial. For example, in the foregoing threo-alkanediol of formula (V) including the threo-alkanediol shown by formulae (VI) and (VII) or a mixture of these threo-alkanediols, which can be preferably used for obtaining the phthalocyanine compound of the present invention, there exists an erythro-alkanediol shown by formula (VIII) as a diasteroisomer;

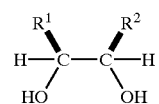

(VIII)

(in formulae (V) and (VIII), $R^1$ and $R^2$ each independently represents a substituted or unsubstituted alkyl group), but in the case of obtaining the phthalocyanine compound of this invention, it is preferred to selectively use the foregoing threo-alkanediol(s) only. As is also clear from the examples shown below, the effects of the selective use of the threo-alkanediol(s) are clear about various characteristics, such as the sensitive characteristics, etc., of the organic photoconductor of the present invention.

The reason that the characteristics such as the sensitivity, etc., of the organic photoconductor of this invention using the reaction mixture obtained by selectively using the threo-alkanediol only in the reaction with the oxytitanium phthalocyanine compound are superior to those in the case of using the erythro-alkanediol only, which is a diasteroisomer, has not yet been clarified. However, it is assumed to be that in the case of using each phthalocyanine compound as the state of "crystals", which are the aggregate of the molecules as, in particular, in the organic photoconductors in the examples shown below, the phthalocyanine compound shown by formula (I) described above obtained from the threo-alkanediol gives a crystal state useful for the various photoinductive characteristics of the organic photoconductor, such as the sensitivity characteristics, etc., as compared with the phthalocyanine compound shown by formula (IX) obtained from the erythro-alkanediol based on the difference in the fundamental molecular structures of both the compounds.

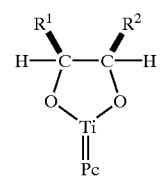

(IX)

In formulae (I) and (IX), $R^1$ and $R^2$ each independently represents a substituted or unsubstituted alkyl group and Pc represents a substituted or unsubstituted phthalocyanine residue.

Also, when the threo-alkanediol only is selectively used, a phthalocyanine compound having an absorption in a longer wavelength region than the case of using a mixture of the threo-alkanediol and the corresponding erythro-alkanediol.

The production process of the phthalocyanine compound of the present invention and the reaction mixture used in the organic photoconductor of the present invention is explained on the case of the reaction of 2,3-butanediol and oxytitanium phthalocyanine as an example.

About 2,3,-butanediol, there exist three kinds of optical isomers, i.e., (2R,3R)-(−)-2,3-butanediol, (2S,3S)-(+)-2,3-butanediol, and meso-2,3-butanediol. In the case of obtaining the phthalocyanine compound of the present invention, one or both of the former two threo-isomers, i.e., (2R,3R)-(−)-2,3-butanediol and/or (2S,3S)-(+)-2,3-butanediol, are used.

In the case of obtaining a mixture of the specific phthalocyanine compound of the R-threo-isomer having the (2R, 3R)-2,3-butylene glycolate titanium skeleton and the specific phthalocyanine compound of the S-threo-isomer having the (2S,3S)-2,3-butylene glycolate titanium skeleton, the method of reacting a mixture of (2R,3R)-(−)-2,3-butanediol and (2S,3S)-(+)-2,3-butanediol with oxytitanium phthalocyanine is not preferred, and rather the method of mixing (a) only a specific phthalocyanine compound of the R-threo-isomer having the (2R,3R)-2,3-butylene glycolate skeleton which is obtained by reacting (2R,3R)-(−)-2,3-butanediol only with oxytitanium phthalocyanine with (b) only a specific phthalocyanine compound of the S-threo-isomer having the (2S,3S)-2,3-butylene glycolate skeleton which is obtained by reacting (2S,3S)-(+)-2,3-butanediol only with oxytitanium phthalocyanine is preferred because the characteristics are better and the organic photoconductor having a better sensitivity is obtained. Also, in the latter method, the light absorption of the organic photoconductor preferably exists at a longer wavelength side.

The reaction mixtures obtained by using threo-alkanediols other than the above-described threo-2,3-butanediol can also be preferably produced in the same manner as described above. That is, in the case of obtaining a mixture of a phthalocyanine compound having the R-threo disubstituted alkylene glycolate titanium skeleton and a phthalocyanine compound having the S-threo disubstituted alkylene glycolate titanium skeleton, the method comprising preparing the R-threo-isomer and the S-threo-isomer separately, and then mixing them is preferred.

One of the features of the phthalocyanine compound of the present invention and the phthalocyanine compound used in the organic photoconductor of the present invention is that the pyrolysis curve in the thermogravimetry is a specific one. For example, in the case of the phthalocyanine compound which is the reaction product of (2R,3R)-(−)-2,3-butanediol and oxytitanium phthalocyanine in Example 1 shown below, a multistage weight decrease pattern of the weight decrease in lithe range of a low-temperature portion of from 330° C. to 390° C. and the weight decrease in the range of a high-temperature portion of 400° C. or higher is shown as illustrated in FIG. 10.

Figure 7:
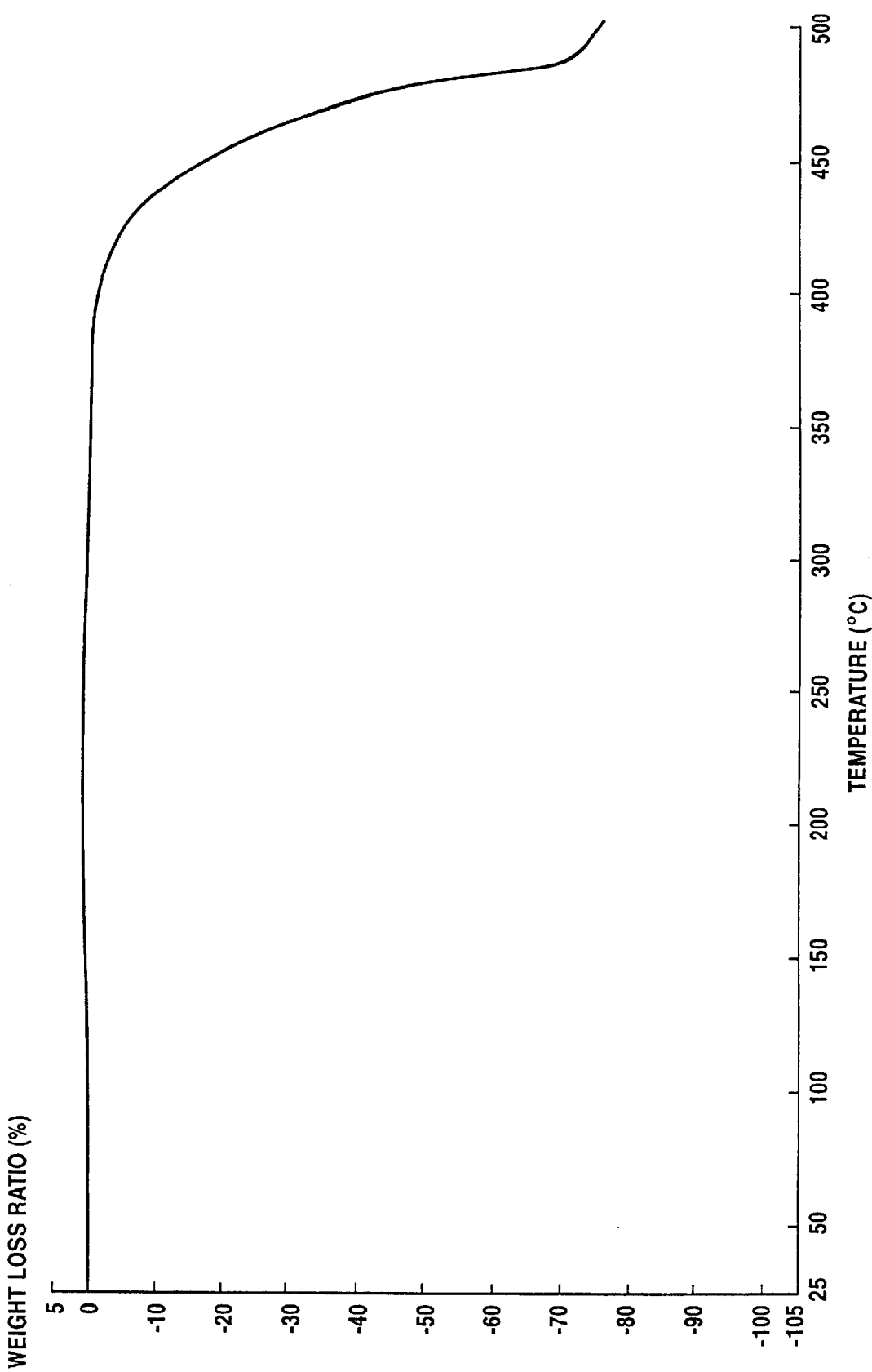
FIG. 7 is a graph showing the pyrolysis curve of oxytitanium phthalocyanine used in Example 1.

It has not yet been confirmed that the phenomenon shows a what kind of phenomenon but since as shown in FIG. 7, the pyrolysis of the raw material, oxytitanium phthalocyanine starts from about 400° C., it is assumed that the weight decrease at the low-temperature portion is caused by that the cyclic alcoholate titanium portion specific to the phthalocyanine compound which is the feature of the present invention is decomposed and changed to oxytitanium (Ti=O) and the weight decrease at the high-temperature portion is caused by the decomposition of the phthalocyanine skeleton.

Figure 10:
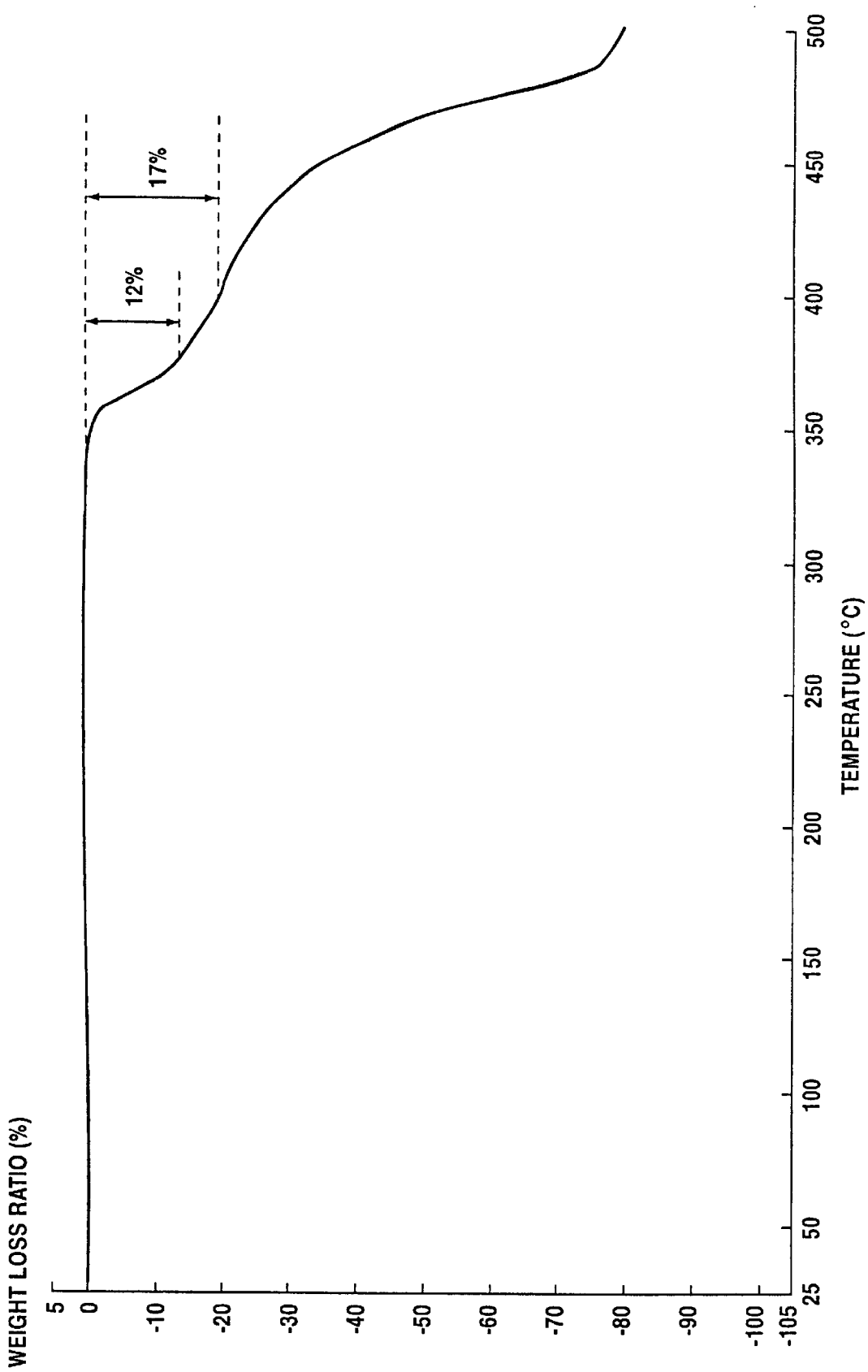
FIG. 10 is a graph showing the pyrolysis curve of the phthalocyanine compound of the present invention obtained in Example 1.

For example, in the case of the reaction product of (2R,3R)-(−)-2,3-butanediol and oxytitanium phthalocyanine described above, the weight decrease ratio at the low-temperature portion is from 12% to 17% as shown in FIG. 10 and since the molecular weight of the phthalocyanine compound is 648, the weight decrease ratio means the decrease of the molecular weight of from about 78 to 110 and this is assumed to be explained by that the weight decease at the low-temperature is an elimination step of one molecule of butanediol (molecular weight 90) or one molecule of butylene oxide (molecular weight 78) from the cyclic alcoholate titanium portion specific to the phthalocyanine compound of the present invention.

In addition, in the case of the product of 2,3-butanediol and oxytitanium phthalocyanine described in the three known literatures described above at the addition ratio of 1:2, the weight decrease of 7.5% in the thermogravimetry has been confirmed and it can be considered that the difference in the weight decrease ratios is based on the structural difference from the phthalocyanine compound of the present invention to be formed at an addition ratio of 1:1 but since the structure of the addition compound is not clarified in the foregoing literatures, the details are unknown.

Other feature of the phthalocyanine compound of the present invention and the phthalocyanine compound used in the organic photoconductor of the present invention is remarkable in the IR absorption spectrum as is clear from Examples shown below. For example, the phthalocyanine compound of this invention having the (2R,3R)-2,3-butylene glycolate skeleton or the phthalocyanine compound of this invention having the (2S,3S)-2,3-butylene glycolate skeleton, which is the reaction product of (2R,3R)-(−)-2,3-butanediol or (2S,3S)-(+)-2,3-butanediol and oxytitanium phthalocyanine in Example 1 or 2 shown below, has the absorption, in particular, at $631\pm2$ cm$^{-1}$ in the range of from 620 to 650 cm$^{-1}$.

Also, a reaction mixture of 2,3-butanediol and a titanyl phthalocyanine compound which is a mixture of stereoisomers shows plural absorption peaks caused by the mixture of the stereoisomers in the range of from 620 to 650 cm$^{-1}$ but the phthalocyanine compound of the present invention has one absorption peak at, in particular, $631\pm2$ cm$^{-1}$ in the range of from 620 to 650 cm$^{-1}$ caused by selectively having the specific isomer structure.

As described above, the phthalocyanine compound of the present invention shows the specific absorption peak in the range of from 620 to 650 cm$^{-1}$ and although the reason that the peak is caused by what kind of an atomic bond in the structure of the phthalocyanine compound has not yet been confirmed but from that the raw material, the oxytitanium phthalocyanine compound does not have any characteristic peak(s) in the range of from 620 to 650 cm$^{-1}$ and the peak intensity near 972 cm$^{1}$ caused by Ti=O which is the feature of the raw material, the oxytitanium phthalocyanine compound is decreased after the reaction, etc., it is assumed that the foregoing reason is caused by the substituted cyclic alcoholate titanium portion as seen in the phthalocyanine compound of this invention.

The phthalocyanine compound of this invention or the phthalocyanine compound used in the organic photoconductor of this invention can be used as it is but the compound may be formed in a characteristic crystal form as a mixed crystal, which is not a single crystal of a single compound by, for example controlling the charge proportion of reaction of the diol compound to the oxytitanium phthalocyanine compound. In this invention, the mixed crystal is a crystal formed by an irregular or regular periodic arrangement of plural kinds of molecules and is clearly different from a mixture of two or more kinds of crystals each formed by the congregation of a single kind of a molecule. The phthalocyanine compound of the present invention can form a mixed crystal with other titanium phthalocyanine compound(s).

More practically, for example, threo-2,3-butylene glycolate titanium phthalocyanine compound can form a mixed crystal with other titanium phthalocyanine compound than corresponding erythro-, i.e., meso-2,3-butylene glycolate titanium phthalocyanine compound. The foregoing threo-2,3-butylene glycolate titanium phthalocyanine compound can form a mixed crystal with the foregoing erythro-isomer but since the mixed crystal is insufficient in the sensitivity, it is undesirable to use the mixed crystal as the charge generating material for the organic photoconductor. As the threo-alkylene glycolate titanium phthalocyanine compound capable of forming the mixed crystal which can be used as the charge generating material for the organic photoconductor of the present invention, threo-2,3-butylene glycolate titanium phthalocyanine is more preferred and as the phthalocyanine compound to be combined therewith, which is neither the threo-alkylene glycolate titanium phthalocyanine nor the erythro-glycolate titanium phthalocyanine, there is, for example, an oxytitanium phthalocyanine compound.

For example, as described in Example 6 shown below, (2R,3R)-2,3-butylene glycolate titanium phthalocyanine (A) and oxytitanium phthalocyanine (B) form a mixed crystal. 3Whether the crystal is a mixed crystal or not can be confirmed by confirming the existence the two kinds of the molecules by measuring various spectra such as the mass spectrum, the IR spectrum, etc. In particular, in the case described above, since as shown in FIG. 16, the pattern of the crystal observed in the powder X-ray diffraction spectrum does not coincide with the crystal form composed of Compound (A) shown in FIG. 8 and also with any known crystal forms of Compound (B), such as of an α-type, a β-type, a C-type, a γ-type, a Y-type, etc., it can be confirmed that the crystal is clearly different from a mixture of the crystal composed of Compound (A) only and the crystal composed of Compound (B) only but is a characteristic mixed crystal in a simple crystal state wherein two kinds of molecules of Compounds (A) and (B) are regularly and periodically arranged.

When the phthalocyanine compound of the present invention forms a mixed crystal, the existing ratio (composition ratio) of at least two kinds of the phthalocyanine compounds which are the constituting components in the mixed crystal is optional but when the mixed crystal is composed of, for example, two kinds of phthalocyanine compounds C and D, the composition ratio C:D (by mol) is preferably from 10:90 to 90:10, more preferably from 40:60 to 60:40, far more preferably from 30:70 to 70:30, and particularly preferably at 50:50.

For example, in the case of the-reaction mixture of foregoing (2R,3R)-(−)-2,3-butanediol (A) and oxytitanium phthalocyanine (B), the reaction mixture can form a mixed crystal when the composition ratio A:B is from 40:60 to 60:40, and preferably at 50:50.

Also, in the mixed crystal of, for example, the threo-di-substituted alkylene glycolate titanium phthalocyanine compound shown by formula (I) described above, it is preferred that the mixed crystal does not contain the erythro-di-substituted alkylene glycolate titanium phthalocyanine compound shown by formula (IX) shown above, which is the diasteroisomer thereof.

Furthermore, in the foregoing threo-di-substituted alkylene glycolate titanium phthalocyanine compound, there exist a threo-di-substituted alkylene glycolate titanium phthalocyanine compound (E) having an absolute structure shown by formula (X),

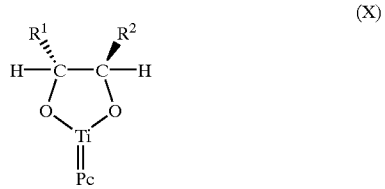

and a threo-di-substituted alkylene glycolate titanium phthalocyanine compound (F) having an absolute structure shown by formula (XI),

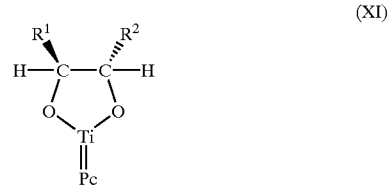

which is the enantioisomer thereof, in the case of obtaining, for example, the mixed crystal of the compound (E), when the mixed crystal does not contain the compound (F), which is the enantioisomer of the compound (E), as other constituting component and in the case of obtaining the mixed crystal of the compound (F), when the mixed crystal does not contain the compound (E), which is the enantioisomer of the compound (F), as other constituting component, the phthalocyanine compound suitable for the organic photoconductor having good characteristics, and in particular a better sensitivity is obtained.

In the case of obtaining the mixed crystal of the phthalocyanine compound of the present invention, the mixed crystal can be easily obtained by reacting, for example, the oxytitanium phthalocyanine compound and not more than 1 mol equivalent of the diol compound having the specific isomer structure. The stocking equivalent ratio of the oxytitanium phthalocyanine compound and the diol compound may be from 0.3 to 40 mol equivalent of the latter to 1 mol equivalent of the former but for adding not more than 1 mol equivalent of the diol compound to the oxytitanium phthalocyanine compound as a result, the amount of the oxytitanium phthalocyanine compound is from 0.3 to 1.5 mol equivalent, and more preferably from 0.5 to 1.0 mol equivalent in the same standard.

Then, the organic photoconductor of the present invention is explained in detail.

In addition, in the case of obtaining the organic photoconductor of the present invention, the foregoing threo-di-substituted alkylene glycolate titanium phthalocyanine compound or the foregoing reaction mixture of this invention is used as a charge generating material or a photoconductive material having both the charge generating function and a charge transport function singly or as a mixed system but if the features of the present invention are not reduced, the phthalocyanine compound or the reaction mixture can be used together with other charge generating material or photoconductive material.

As examples of such other charge generating material, etc., other phthalocyanine compounds, etc., than the phthalocyanine compound of the present invention having the specific isomer structure can be used but they are not limited to these materials. Practically, there are, for example, non-metallic phthalocyanine compounds, metallic phthalocyanine compounds, α-, β-, α,β mixed-, γ-, Y-, etc., crystal type or noncrystalline oxytitanium phthalocyanine compounds, azo series pigments, anthraquinone series pigments, perylene series pigments, polycyclic quinone series pigments, and squaryium series pigments.

The phthalocyanine compound of this invention or the specific di-substituted alkylene glycolate titanium phthalocyanine compound used in the organic photoconductor of the present invention can be crystallized as one threo-isomer or both of the two threo-isomers but in the case of obtaining the organic photoconductor having good electrophotographic characteristics, in particular, a high sensitivity, it is preferred to use the former crystals (i.e., crystals prepared from the R-threo isomer or the S-threo isomer). As the matter of course, if necessary, the former crystals are mixed with the crystals of other phthalocyanine compound and the mixture can be used as a charge generating material.

Also, for, for example, sensitivity control, etc., the threo-di-substituted alkylene glycolate titanium phthalocyanine compound of the present invention may be used together with an erythro-di-substituted alkylene glycolate titanium phthalocyanine compound, which is a diasteroisomer thereof as one of other charge generating materials or photoconductive materials but in this case, it is preferred that a threo-di-substituted alkylene glycolate titanium phthalocyanine compound only is obtained and the compound is mixed with a phthalocyanine compound mainly composed of the aerythro-di-substituted alkylene glycolate titanium phthalocyanine compound.

Also, in the organic photoconductor of the present invention, if necessary, a charge transport material such as a positive hole transport material, an electron transport material, etc., can be used together.

There is no particular restriction on the charge transport material being used for the organic photoconductor of the present invention and various kinds of materials can be used. For example, there are arylamine series compounds, hydrazone series compounds, pyrazoline series compounds, oxazole series compounds, oxadiazole series compounds, stilbene series compounds, butadiene series compounds, thiazole series compounds, carbazole series compounds, diphenoquinone series compounds, arylmethane series compounds, tetracyanoquinone series compounds, and polymeric compounds such as poly-N-vinylcarbazole, polysilane, etc.

Structures of specific compounds of the charge transport material are shown below. In addition, the numeral in ( ) described under each structural formula represents No. of the illustrated compound.

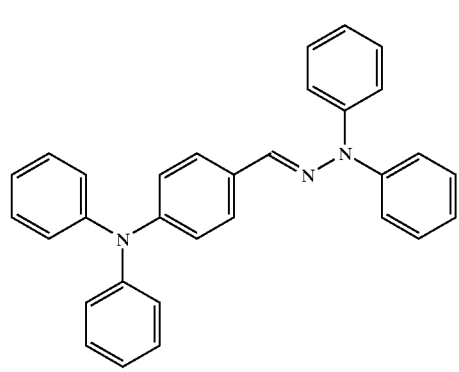

(1)

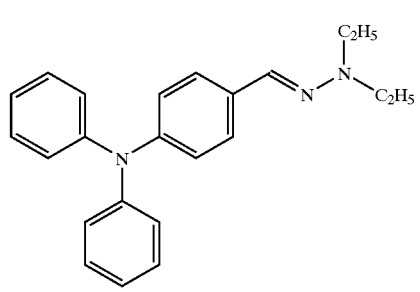

(2)

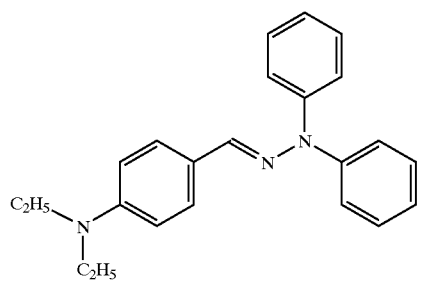

(3)

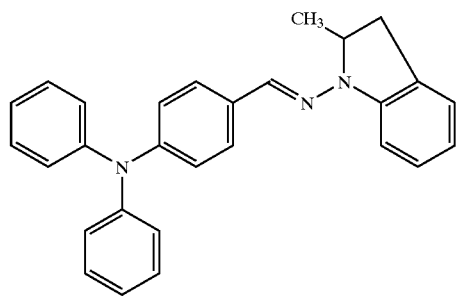

(4)

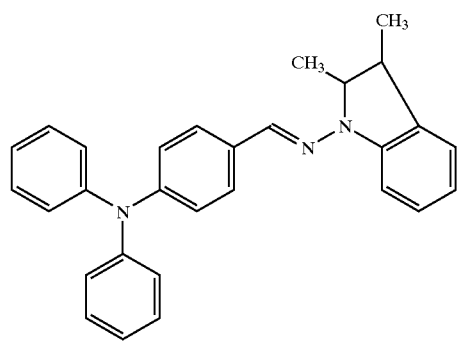

(5)

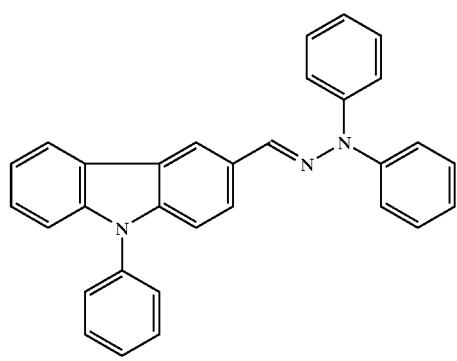

(6)

-continued
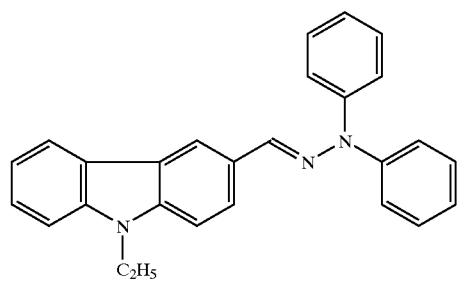
(7)
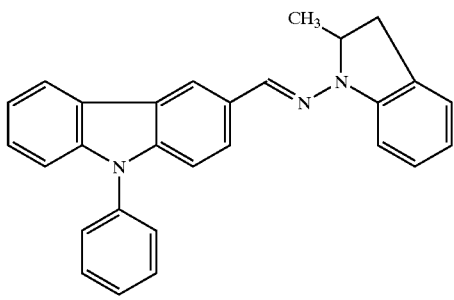
(8)
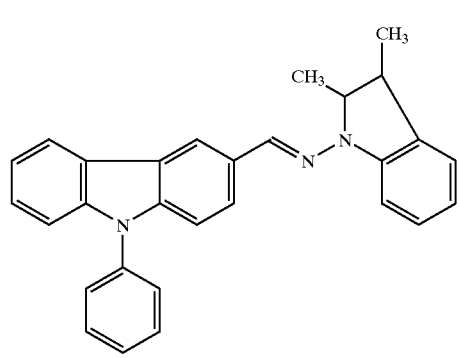
(9)
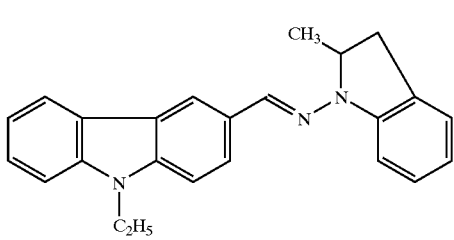
(10)
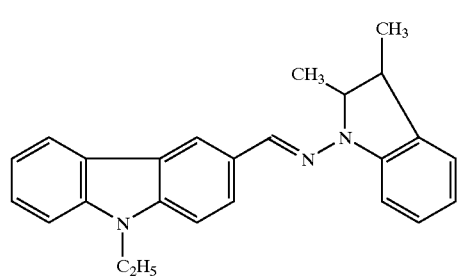
(11)
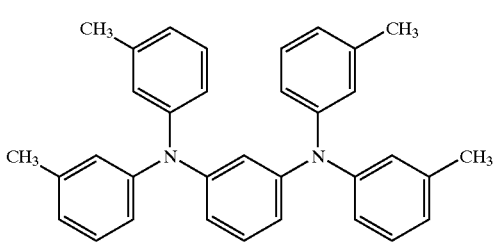
(12)
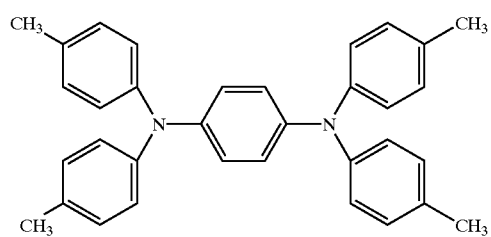
(13)
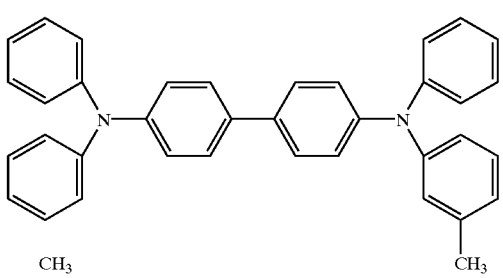
(14)
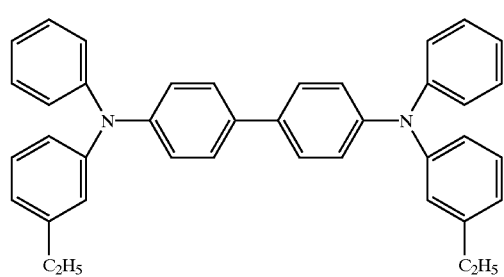
(15)
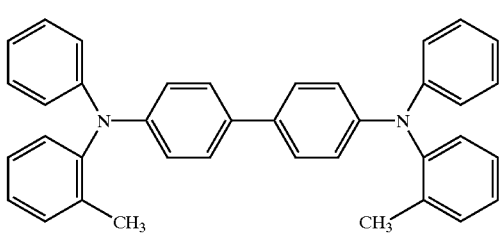
(16)

-continued
(17)
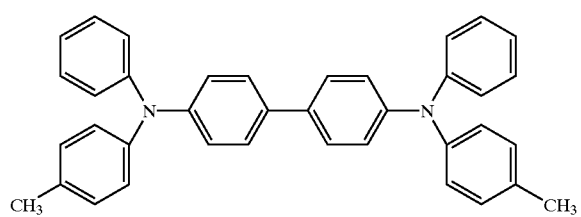
(18)
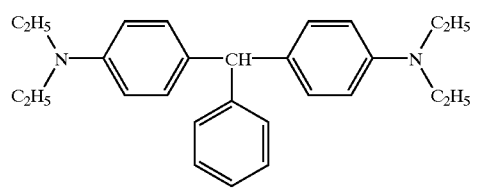
(19)
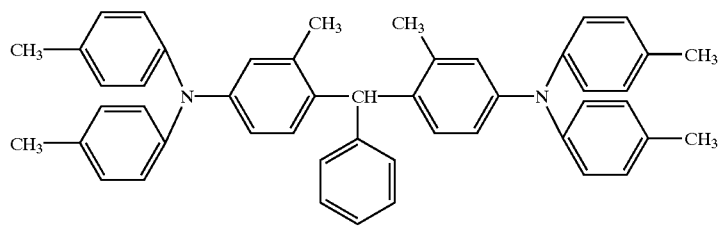
(20)
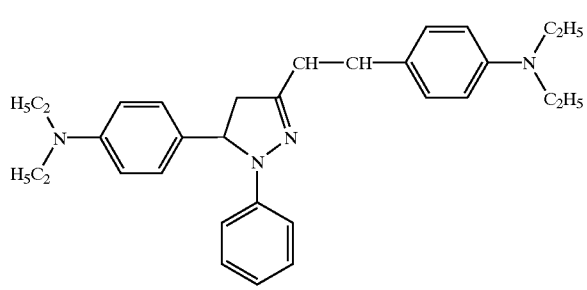
(21)
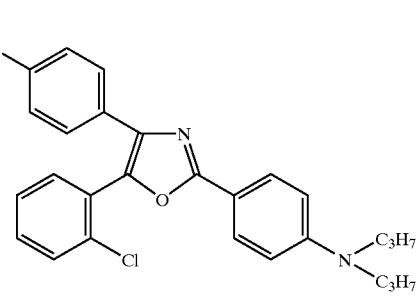
(22)
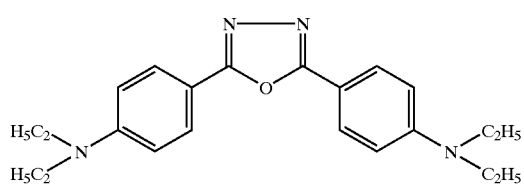
(23)
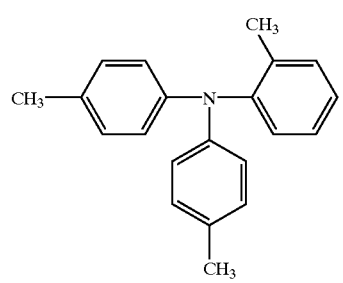
(24)
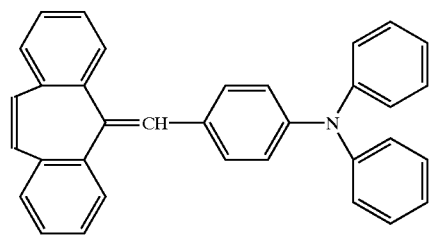
(25)
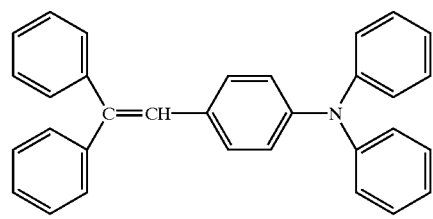
(26)
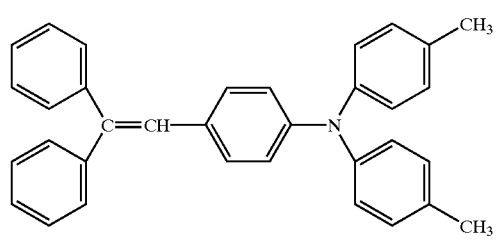
(27)
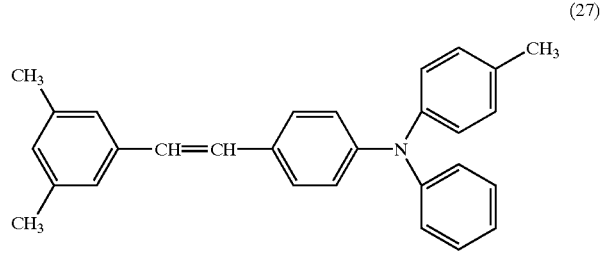

-continued
(28)
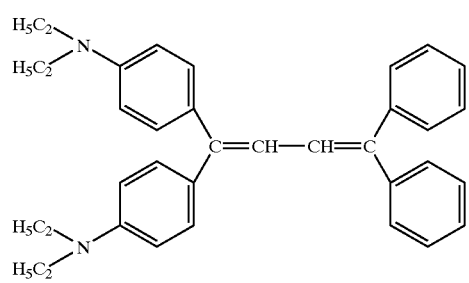
(29)
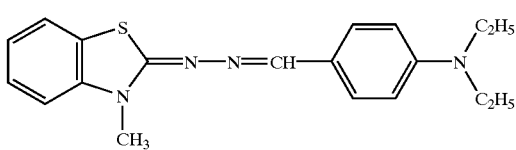
(30)
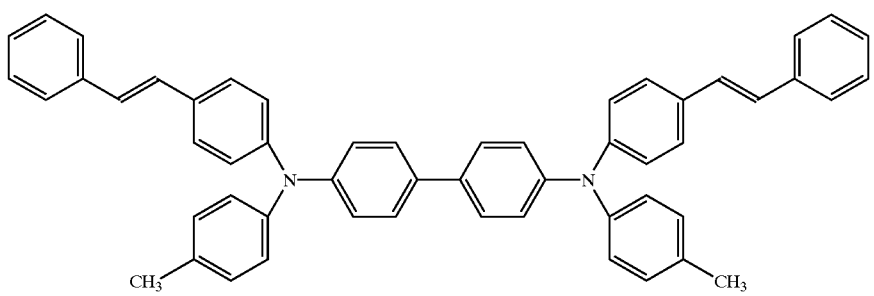
(31)
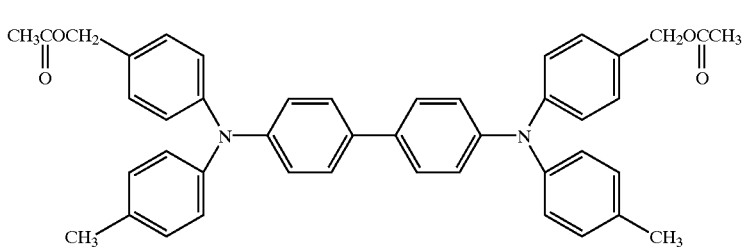
(32)
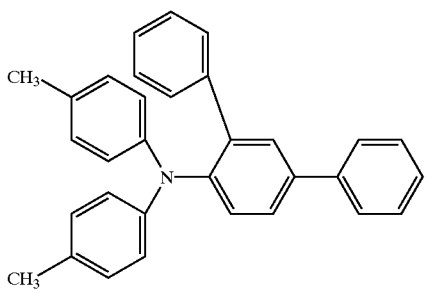
(33)
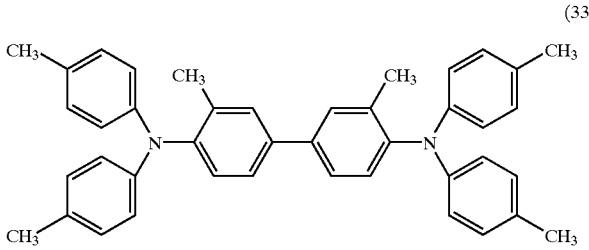
(34)
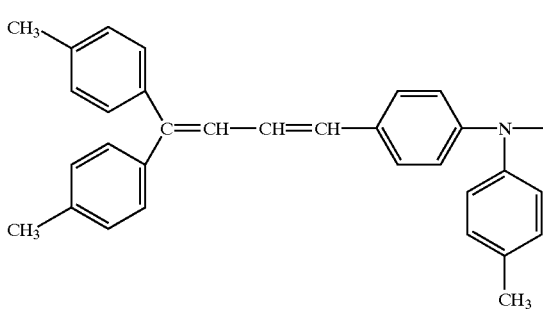

-continued (35)

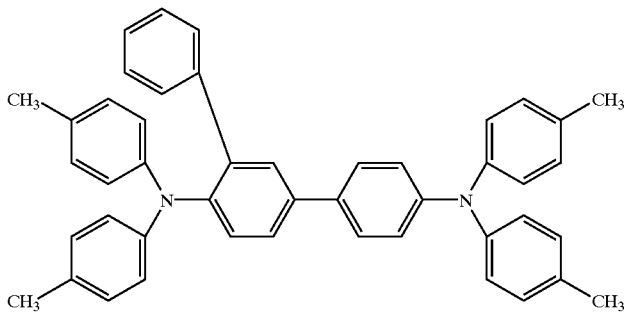

As the forms of the organic photoconductor, various forms are known and the form of the organic photoconductor of the present invention may be any such forms. Several examples of organic photoconductor of this invention are shown in FIG. 1 to FIG. 4.

Figure 2:
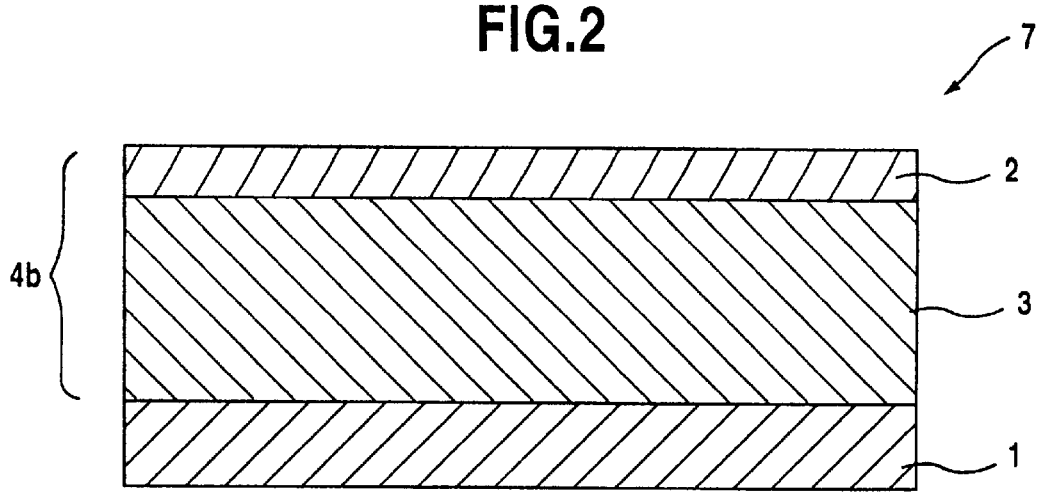
FIG. 2 is a schematic enlarged cross sectional view showing other embodiment of the layer structure of the organic photoconductor of the present invention.
Figure 3:
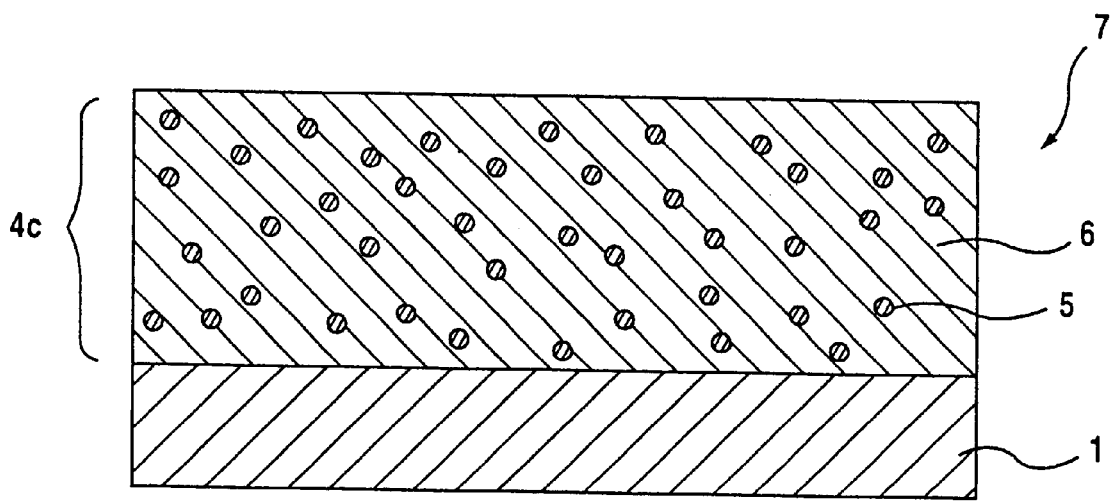
FIG. 3 is a schematic enlarged cross sectional view showing still other embodiment of the layer structure of the organic photoconductor of the present invention.
Figure 4:
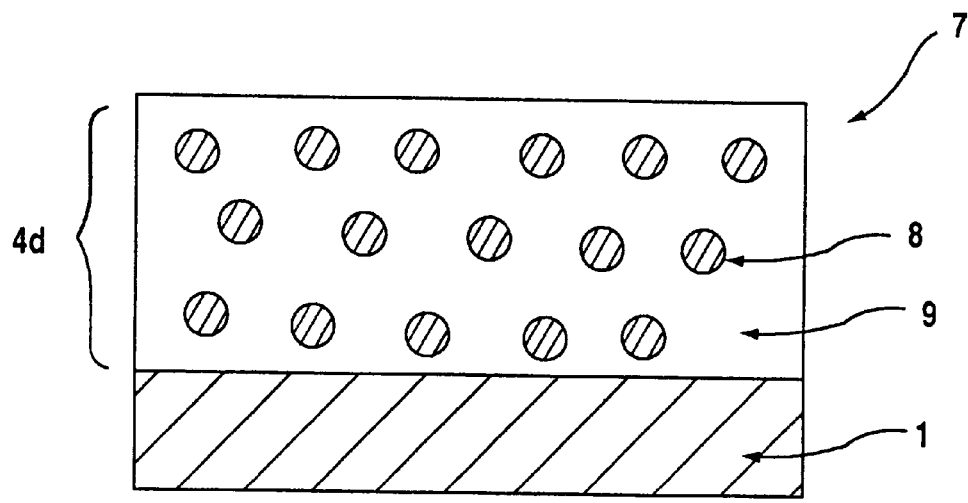
FIG. 4 is a schematic enlarged cross sectional view showing another embodiment of the layer structure of the organic photoconductor of the present invention.

The organic photoconductor 7 of this invention shown in FIG. 1 and FIG. 2 is composed of an electroconductive support 1 having formed thereon a photosensitive layer 4a or 4b composed of a charge generating layer 2 and a charge transport layer 3. The organic photoconductor shown in FIG. 3 is composed of an electroconductive support 1 having formed thereon a photosensitive layer 4c having a charge generating material 5 dispersed in a charge transport medium 6. The organic photoconductor shown in FIG. 4 is composed of an electroconductive support 1 having formed thereon a photosensitive layer 4d having a photoconductive material 8 dispersed in a binder 9 such as a binder resin, etc.

The threo-di-substituted alkylene glycolate titanium phthalocyanine compound of this invention can be used for producing all the organic photoconductors shown in FIGS. 1 to 4 described above. However, when the threo-1,4-bis(benzyloxy)-2,3-butylene glycolate titanium phthalocyanine is used as the charge generating material, the monolayer-type organic photoconductor of the layer structure as shown in FIG. 3 is preferred in the point of the electrophotographic characteristics, in particular, a high sensitivity. In addition, threo-2,3-butylene glycolate titanium phthalocyanine can provide all the organic photoconductors of the layer structures shown in FIGS. 1 to 4 each having an excellent sensitivity.

In the case of the organic photoconductors shown in FIG. 1 and FIG. 2, the charge generating material contained in the charge generating layer 2 generates electric charges and on the other hand, the charge transport layer 3 receives the injection of the charges and transports the charges. That is, the formation of the electric charges necessary for the light decay is performed by the charge generating material and the transport of the electric charges is performed mainly by the charge transport medium. In the organic photoconductor shown in FIG. 3, the charge generating material generates electric charges to light and the transport of the charges is performed mainly by the charge transport medium. In the organic photoconductor shown in FIG. 4, the generation of electric charges to light and the transport of the charges are performed by the photoconductive material.

The organic photoconductor shown in FIG. 1 can be produced by vapor-depositing the fine particles of the charge generating material onto the electroconductive support 1, if necessary, coating thereon a dispersion obtained by dispersing a binder resin in a solvent followed by drying, and coating thereon a solution of the charge transport material alone or, if necessary, together with a binder resin followed by drying.

The organic photocondudtor shown in FIG. 2 can be produced by coating a solution of the charge transport material alone or, if necessary, together with a binder resin on an electroconductive support followed by drying and vapor-depositing thereon the fine particles of the charge generating material or by coating a dispersion obtained by dispersing the fine particles of the charge generating material in a solvent or a binder resin solution followed by drying.

The organic photoconductor 7 shown in FIG. 3 can be produced by dispersing the fine particles of the charge generating material in a solution having dissolved therein the charge transport material alone or, if necessary, together with a binder resin and coating the dispersion on an electroconductive support followed by drying.

Also, the organic photoconductor 7 shown in FIG. 4 can be produced by coating a dispersion obtained by dispersing the photoconductive material in a solution having dissolved therein a binder such as a binder resin, etc., on an electroconductive support followed by drying.

As a means of grinding the phthalocyanine compound of the present invention acting as the charge generating material or the photoconductive material and dispersing the ground compound in a binder solution, there are practically a general stirring apparatus, a homomixer, a disperser, an agitator, a ball mill, a sand mill, an attritor, a paint conditioner, etc., although the means being used in this invention is not limited to these means.

Also, as a method for coating, for example, a dip coating method, a spray coating method, a spin coating method, a bead coating method, a wire bar coating method, a blade coating method, a roller coating method, and a curtain coating method can be used.

As a matter of course, the charge generating layer may be formed by a vapor deposition, etc., of the charge generating material without using a binder resin.

As to the thickness of the photosensitive layer, in the case of the organic photoconductor shown in FIG. 1 and FIG. 2, the thickness of the charge generating layer is not thicker than 5 $\mu$m, and preferably from 0.01 to 2 $\mu$m and the thickness of the charge transport layer is from 3 to 50 $\mu$m, and preferably from 5 to 30 $\mu$m. Also, in the case of the organic photoconductor shown in FIG. 3 and FIG. 4, the thickness of the photosensitive layer is from 3 to 50 $\mu$m, and preferably from 5 to 30 $\mu$m.

In the organic photoconductor shown in FIG. 1 and FIG. 2, the ratio of the charge transport material in the charge transport layer is in the range of preferably from 5 to 100% by weight. Also, in the organic photoconductor shown in FIG. 1 and FIG. 2, the ratio of the charge generating material in the charge generating layer is in the range of preferably from 5 to 100% by weight, and particularly preferably from 40 to 80% by weight.

In the organic photoconductor shown in FIG. 3, the ratio of the charge transport material in the photosensitive layer is in the range of preferably from 5 to 99% by weight and the ratio of the charge generating material is in the range of preferably from 1 to 50% by weight, and particularly preferably from 3 to 20% by weight.

In the organic photoconductor shown in FIG. 4, the ratio of the photoconductive material is in the range of preferably from 3 to 80% by weight, and particularly preferably from 5 to 50% by weight.

In addition, in the case of producing the organic photoconductors shown in FIG. 1 to FIG. 4, a plasticizer and a sensitizer can be used together with a binder.

As the electroconductive support being used for the organic photoconductor of the present invention, there are, for example, metal plates or metal drums using a metal or an alloy, such as aluminum, copper, zinc, stainless steel, chromium, titanium, nickel, molybdenum, vanadium, indium, gold, and platinum; and papers, plastic films, etc., coated, vapor-deposited, or laminated with an electrically conductive compound such as a conductive polymer, indium oxide, etc., a metal such as aluminum, palladium, gold, or an alloy thereof.

As the binder resin which can be used according to necessary, a high-molecular polymer which is hydrophobic and can form a film having an electric insulating property is preferably used. As such a high-molecular polymer, there are, for example, polycarbonate, polyester, a methacrylic resin, an acrylic resin, polyvinyl chloride, polyvinylidene chloride, polystyrene, polyvinyl acetate, a styrene-butadiene copolymer, a vinyl chloride-vinyl acetate-maleic anhydride copolymer, a silicone resin, a silicone-alkyd resin, a phenol-formaldehyde resin, a styrene-alkyd resin, poly-N-vinylcarbazole, polyvinyl butyrate, polyvinyl formal, and polysulfone although the binder resin being used in this invention is not limited to these polymers. These binder resins can be used singly or as a mixture thereof.

Also, a surface modifying agent can be used together with the binder resin. As the surface modifying agent, there are silicone oils, fluorine resins, etc.

Furthermore, the organic photoconductor of the present invention may contain a well-known plasticizer for improving the film-forming property, the plasticity, and the mechanical strength thereof.

As the plasticizer, there are, for example, aromatic compounds such as biphenyl, biphenyl chloride, o-terphenyl, p-terphenyl, dibutyl phthalate, diethyl glycol phthalate, dioctyl phthalate, triphenyl phosphate, methylnaphthalene, benzophenone, chlorinated paraffin, polypropylene, polystyrene, fluorohydrocarbon phthalic acid esters, fluorohydrocarbon phosphoric acid esters, fluorohydrocarbon halogenated paraffins, and fluorohydrocarbon methylnaphthalene.

As a sensitizing agent being used for the photosensitive layer described above, well-known sensitizers can be used.

As the sensitizing agent, there are, for example, triphenylmethane dyes such as Methyl Violet, Brilliant Green, Crystal Violet, etc.; thiazine dyes such as Methyl Blue, etc.; cyanine dyes, pyrylium dyes, chloranyl, tetracyanoethylene, Rhodamine B, merocyanine dyes, and thiapyrylium dyes.

Also, in the organic photoconductor of the present invention, deterioration preventing agents such as an antioxidant, a light stabilizer, etc., can be incorporated in the photosensitive layer for improving the storage stability, the durability, and the anti-environmental reliance. As the examples thereof, there are phenol compounds, hydroquinone compounds, and amine compounds and specifically, there are butylhydroxytoluene, etc.

In addition to the foregoing additives, if necessary, other various kinds of additives may be used.

Furthermore, in the present invention, if necessary, an adhesive layer or a barrier layer may be formed between the electroconductive support and the photosensitive layer for improving the adhesion between the conductive support and the photosensitive layer and preventing the injection of free electric charges from the conductive support into the photosensitive layer.

As the materials being used for these layers, in addition to the high-molecular compounds being used as the foregoing binder resins, there are, for example, casein, gelatin, polyvinyl alcohol, ethyl cellulose, nitrocellulose, polyvinyl butyral, a phenol resin, polyamide, carboxymethylcellulose, a vinylidene chloride series polymer latex, a styrene-butadiene series polymer latex, polyurethane, aluminum oxide (alumite), tin oxide, and titanium oxide.

The thickness of these layers is preferably not thicker than 1 $\mu$m. Furthermore, as these layers, a layer formed by dispersing a material such as a perylene pigment, etc., in the foregoing binder resin can be used and the thickness of the layer is preferably from 1 to 10 $\mu$m, and more preferably from 3 to 8 $\mu$m.

Also, if necessary, a protective layer such as an overcoat layer, etc., may be formed on the photosensitive layer for improving the strength to abrasion.

The phthalocyanine compound of the present invention has the construction described above and as is clear from the examples shown below, has excellent properties.

Also, the organic photoconductor of the present invention has the construction described above and as is clear from the examples shown below, has an excellent sensitivity.

More specifically, the embodiments of the present invention are as follows.

(1) A di-substituted alkylene glycolate titanium phthalocyanine compound comprising a reaction mixture of a threo-alkanediol having one hydroxy group per each of the two adjacent carbon atoms, said carbon atoms each being a secondary carbon atom, and an oxytitanium phthalocyanine compound.

(2) A compound selected from the group consisting of (2R,3R)-2,3-butylene glycolate titanium phthalocyanine, (2S,3S)-2,3-butylene glycolate titanium phthalocyanine, (2R,3R)-1,4-bis(benzyloxy)-2,3-butylene glycolate titanium phthalocyanine and (2S,3S)-1,4-bis(benzyloxy)-2,3-butylene glycolate titanium phthalocyanine.

(3) A mixed crystal consisting of threo-2,3-butylene glycolate titanium phthalocyanine compound and another titanium phthalocyanine compound other than meso-2,3-butylene glycolate titanium phthalocyanine.

(4) A mixed crystal described in (3) above, wherein the threo-2,3-butylene glycolate titanium phthalocyanine compound is (2R,3R)-2,3-butylene glycolate titanium phthalocyanine or (2S,3S)-2,3-butylene glycolate titanium phthalocyanine.

(5) A mixed crystal described in (3) above, wherein the titanium phthalocyanine compound other than meso-2,3-butylene glycolate titanium phthalocyanine is an oxytitanium phthalocyanine compound.

(6) A mixed crystal described in (3) above, wherein threo-2,3-butylene glycolate titanium phthalocyanine compound is (2R,3R)-2,3-butylene glycolate titanium phthalocyanine or (2S,3S)-2,3-butylene glycolate titanium phthalocyanine and the titanium phthalocyanine compound other than meso-2,3-butylene glycolate titanium phthalocyanine is an oxytitanium phthalocyanine compound.

(7) A mixed crystal described in (3) above, wherein the threo-2,3-butylene glycolate titanium phthalocyanine compound is (2R,3R)-2,3-butylene glycolate titanium phthalocyanine or (2S,3S)-2,3-butylene glycolate titanium phthalocyanine and the titanium phthalocyanine compound other than meso-2,3-butylene glycolate titanium phthalocyanine is an oxytitanium phthalocyanine compound, said mixed crystal having a main peak at the Bragg angle (2θ±0.2°) of 8.3° in the X-ray diffraction spectrum to CuKα.

(8) An organic photoconductor comprising the di-substituted alkylene glycolate titanium phthalocyanine compound described in (1) above.

(9) An organic photoconductor comprising a reaction mixture comprising a di-substituted alkylene glycolate titanium phthalocyanine compound which is obtained by reacting a threo-alkanediol having one hydroxy group per each of the two adjacent carbon atoms, said carbon atoms each being a secondary carbon atom, with an oxytitanium phthalocyanine compound, the reaction charge equivalent ratio of the former to the latter being from 0.5 to 1.5 mol equivalent.

(10) An organic photoconductor described in (9) above, wherein said threo-alkanediol is at least one diol selected from the group consisting of (2R,3R)-2,3-butanediol, (2S, 3S)-2,3-butanediol, (2R,3R)-1,4-bis(benzyloxy)-2,3-butanediol and (2S,3S)-1,4-bis(benzyloxy)-2,3-butanediol.

(11) An organic photoconductor described in (9) above, wherein said threo-alkanediol is (2R,3R)-2,3-butanediol or (2S,3S).-2,3-butanediol.

(12) An organic photoconductor described in (9) above, wherein said reaction mixture is a single crystal consisting of the corresponding di-substituted alkylene glycolate titanium phthalocyanine compound or a mixed crystal consisting of the corresponding di-substituted alkylene glycolate titanium phthalocyanine compound and an oxytitanium phthalocyanine compound.

(13) An organic photoconductor described in (9) above, wherein said reaction mixture is selected from the group consisting of a single crystal consisting of (2R,3R)-2,3-butylene glycolate titanium phthalocyanine compound, a single crystal consisting of (2S,3S)-2,3-butylene glycolate titanium phthalocyanine compound, a mixed crystal consisting of (2R,3R)-2,3-butylene glycolate titanium phthalocyanine compound and an oxytitanium phthalocyanine compound and a mixed crystal consisting of (2S,3S)-2,3-butylene glycolate titanium phthalocyanine compound and an oxytitanium phthalocyanine compound.

(14) An organic photoconductor described in (9) above, wherein said reaction mixture is a mixed crystal consisting of (2R,3R)-2,3-butylene glycolate.titanium phthalocyanine and an oxytitanium phthalocyanine compound or a mixed crystal consisting of (2S,3S)-2,3-butylene glycolate titanium phthalocyanine and an oxytitanium phthalocyanine compound, having a main peak at the Bragg angle (2θ±0.2°) of 8.3° in the X-ray diffraction spectrum to CuKα.

(15) An organic photoconductor comprising a photosensitive layer comprising a mixed crystal consisting of (2R, 3R)-2,3-butylene glycolate titanium phthalocyanine which is obtained by reacting (2R,3R)-2,3-butanediol with oxytitanium phthalocyanine, and oxytitanium phthalocyanine, or a mixed crystal consisting of (2S,3S)-2,3-butylene glycolate titanium phthalocyanine which is obtained by reacting (2S,3S)-2,3-butanediol with oxytitanium phthalocyanine, and oxytitanium phthalocyanine, said photosensitive layer having a main peak at the Bragg angle (2θ±0.2°) of 8.3° in the X-ray diffraction spectrum to CuKα.

(16) An organic photoconductor comprising a charge generation material consisting essentially of the compound described in (2) above.

(17) An organic photoconductor comprising the mixed crystal described in (3) above.

(18) A di-substituted alkylene glycolate titanium phthalocyanine compound described in (1) above, wherein the threo-alkanediol is a threo-2,3-butanediol compound.

(19) A phthalocyanine compound represented by formula (I):

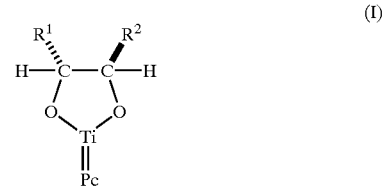

wherein $R^1$ and $R^2$ each independently represents a substituted or unsubstituted alkyl group and Pc represents a substituted or unsubstituted phthalocyanine residue.

(20) A mixed crystal consisting of (2R,3R)-2,3-butylene glycolate titanium phthalocyanine and oxytitanium phthalocyanine and having peaks at the Bragg angle (2θ±0.2°) of at least 8.3°, 24.7°, and 25.1° in the X-ray diffraction spectrum to CuKα.

(21) A mixed crystal consisting of (2S,3S)-2,3-butylene glycolate titanium phthalocyanine and oxytitanium phthalocyanine and having peaks at the Bragg angle (2θ±0.2°) of at least 8.3°, 24.7°, and 25.1° in the X-ray diffraction spectrum to CuKα.

(22) A mixed crystal consisting of (2R,3R)-2,3-butylene glycolate titanium phthalocyanine and oxytitanium phthalocyanine and having a main peak at the Bragg angle (2θ±0.2°) of 8.3° in the X-ray diffraction spectrum to CuKα and absorption peaks at $970±2$ $cm^1$ of the infrared absorption spectrum and at $631±2$ $cm^{-1}$ in the range of from 620 to 650 $cm^{-1}$.

(23) A mixed crystal consisting of (2S,3S)-2,3-butylene glycolate titanium phthalocyanine and oxytitanium phthalocyanine and having a main peak at the Bragg angle (2θ±0.2°) of 8.3° in the X-ray diffraction spectrum to CuKα and absorption peaks at $970±2$ $cm^{-1}$ of the infrared absorption spectrum and at $631±2$ $cm^{-1}$ in the range of from 620 to 650 $cm^{-1}$.

(24) A mixed crystal consisting of (2R,3R)-2,3-butylene glycolate titanium phthalocyanine and oxytitanium phthalocyanine and having peaks at the Bragg angle (2θ±0.2°) of at least 8.3°. 24.7°, and 25.1° in the X-ray diffraction spectrum to CuKα and absorption peaks at $970±2$ $cm^{-1}$ of the infrared absorption spectrum and at $631±2$ $cm^{-1}$ in the range of from 620 to 650 $cm^{-1}$.

(25) A mixed crystal consisting of (2S,3S)-2,3-butylene glycolate titanium phthalocyanine and oxytitanium phthalocyanine and having peaks at the Bragg angle (2θ±0.2°) of at least 8.3°. 24.7°, and 25.1° in the X-ray diffraction spectrum to CuKα and absorption peaks at $970±2$ $cm^{-1}$ of the infrared absorption spectrum and at $631±2$ $cm^{-1}$ in the range of from 620 to 650 $cm^{-1}$.

(26) An organic photoconductor containing a reaction mixture of an oxytitanium phthalocyanine compound and an alkanediol having one hydroxy group per each of the two adjacent carbon atoms, wherein said alkanediol is a threo-alkanediol in which each of the carbon atoms each having the hydroxy group is a secondary carbon atom.

(27) An organic photoconductor described in (26) above, wherein said alkanediol is a compound represented by formula (V):

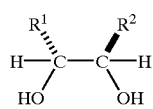

(V)

wherein $R^1$ and $R^2$ each independently represents a substituted or unsubstituted alkyl group.

(28) An organic photoconductor described in (26) above, wherein said alkanediol is a compound represented by formula (VI), a compound represented by formula (VII) or a mixture thereof:

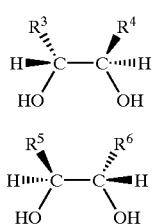

(VI)

(VII)

wherein, $R^3$, $R^4$, $R^5$, and $R^6$ each independently represents a substituted or unsubstituted alkyl group.

(29) An organic photoconductor described in (26) above, wherein said alkanediol is (2R,3R)-(−)-2,3-butanediol, (2S,3S)-(+)-2,3-butanediol or a mixture thereof.

(30) An organic photoconductor described in (26) above, wherein said reaction mixture is a reaction mixture obtained by reacting the oxytitanium phthalocyanine compound and the threo-alkanediol at a reaction charge equivalent ratio of from 0.5 to 1.5 mol equivalent.

(31) An organic photoconductor described in (26) above, wherein said reaction mixture is a mixed crystal consisting of (a) a reaction product of an oxytitanium phthalocyanine compound and an alkanediol having one hydroxy group per each of the two adjacent carbon atoms, and (b) an oxytitanium phthalocyanine compound.

(32) An organic photoconductor comprising a mixed crystal consisting of threo-2,3-butylene glycolate titanium 9 phthalocyanine and oxytitanium phthalocyanine as a charge generating material.

(33) An organic photoconductor comprising a charge generating material consisting of threo-2,3-butylene glycolate titanium phthalocyanine and/or threo-1,4-bis (benzyloxy)-2,3-butylene glycolate titanium phthalocyanine crystal.

(34) An organic photoconductor described in (26) above, wherein said reaction mixture is a crystal having a main peak at the Bragg angle (2θ±0.2°) of 9.5° in the X-ray diffraction spectrum to CuKα.

(35) An organic photoconductor described in (26) above, wherein said reaction mixture is a crystal having peaks at the Bragg angle (2θ±0.2°) of at least 8.5°, 24.7°, and 25.1° in the X-ray diffraction spectrum to CuKα.

(36) An organic photoconductor described in (26) above, wherein said reaction mixture is contained in a photosensitive layer constituting the organic photoconductor and the photosensitive layer has a main peak at the Bragg angle (2θ±0.2°) of 8.3°.

(37) An organic photoconductor comprising a charge generating material consisting essentially of a phthalocyanine compound having the specific steric structure represented by formula (I):

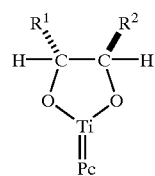

(I)

wherein $R^1$ and $R^2$ each independently represents a substituted or unsubstituted alkyl group and Pc represent a substituted or unsubstituted phthalocyanine residue.

(38) An organic photoconductor comprising a charge generating material consisting essentially of a phthalocyanine compound having the specific steric structure represented by formula (XII):

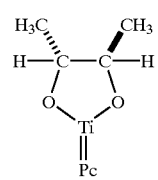

(XII)

wherein Pc represents a substituted or unsubstituted phthalocyanine residue.

(39) An organic photoconductor comprising a charge generating material consisting essentially of a mixed crystal consisting of a phthalocyanine compound having the specific steric structure represented by formula (I) and an oxytitanium phthalocyanine compound:

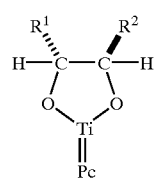

(I)

wherein $R^1$ and $R^2$ each independently represents a substituted or unsubstituted alkyl group and Pc represents a substituted or unsubstituted phthalocyanine residue.

(40) An organic photoconductor comprising a charge generating material consisting essentially of a mixed crystal consisting of a phthalocyanine compound having the specific steric structure represented by formula (XII) and an oxytitanium phthalocyanine compound:

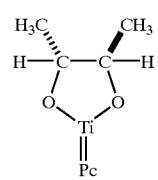

(XII)

wherein Pc represents a substituted or unsubstituted phthalocyanine residue.

(41) An organic photoconductor described in (37) or (39) above, wherein the phthalocyanine compound having the specific steric structure or the mixed crystal consisting of the phthalocyanine compound having the specific steric structure and the oxytitanium phthalocyanine compound is a crystal having a main peak at the Bragg angle (2θ±0.2°) of 9.5° in the X-ray diffraction spectrum to CuKα.

(42) An organic photoconductor described in (37) or (39) above, wherein the phthalocyanine compound having the specific steric structure or the mixed crystal consisting of the phthalocyanine compound having the specific steric structure and the oxytitanium phthalocyanine compound is a crystal having peaks at the Bragg angle (2θ±0.2°) of at least 8.3°, 24.7°, and 25.1° in the X-ray diffraction spectrum to CuKα.

(43) An organic photoconductor described in (37) or (39) above, wherein the phthalocyanine compound having the specific steric structure or the mixed crystal consisting of the phthalocyanine compound having the specific steric structure and the oxytitanium phthalocyanine compound is contained in a photosensitive layer and the photosensitive layer has a main peak at the Bragg angle (2θ±0.2°) of 8.3° in the X-ray diffraction spectrum to CuKα.

(44) An organic photoconductor described in (26) above, wherein said reaction mixture is a crystal having peaks at the Bragg angle (2θ±0.2°) of at least 5.8°, 6.6°, and 10.0° in the X-ray diffraction spectrum to CuKα.

(45) An organic photoconductor containing a phthalocyanine compound having the specific steric structure represented by formula (XIII):

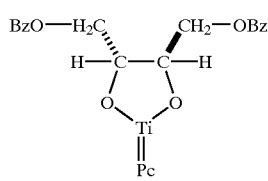

(XIII)

wherein Bz represents a benzyl group and Pc represents a substituted or unsubstituted phthalocyanine residue.

(46) An organic photoconductor described in (37) or (39) above, wherein the phthalocyanine compound having the specific steric structure is a crystal having peaks at the Bragg angle (2θ±0.2°) of at least 5.8°, 6.6°, and 10.0° in the X-ray diffraction spectrum to CuKα.

(47) An organic photoconductor containing a reaction mixture of an oxytitanium phthalocyanine compound and threo-2,3-butanediol.

(48) An organic photoconductor comprising a charge generating material consisting essentially of a mixed crystal consisting of (2R,3R)-2,3-butylene glycolate titanium phthalocyanine and oxytitanium phthalocyanine and a mixed crystal consisting of (2S,3S)-2,3-butylene glycolate titanium phthalocyanine and oxytitanium phthalocyanine.

(49) An organic photoconductor containing a reaction mixture of an oxytitanium phthalocyanine compound and threo-1,4-bis(benzyloxy)-2,3-butanediol.

(50) An organic photoconductor described in (26) above, wherein said organic photoconductor comprises an electroconductive support having provided thereon a photosensitive layer comprising at least two layers composed of a charge generating layer and a charge transport layer.

(51) An organic photoconductor described in (50) above, wherein said charge generating layer and said charge transport layer are formed on said electroconductive support in this order.

(52) An organic photoconductor described in (51) above, further comprising an undercoat layer provided between said electroconductive support and said charge generating layer.

(53) An organic photoconductor described in (50) above, wherein said photosensitive layer consists of a single layer.

(54) An organic photoconductor comprising an electroconductive support having provided thereon a photosensitive layer, wherein said photosensitive layer contains a phthalocyanine compound represented by formula (XIV)

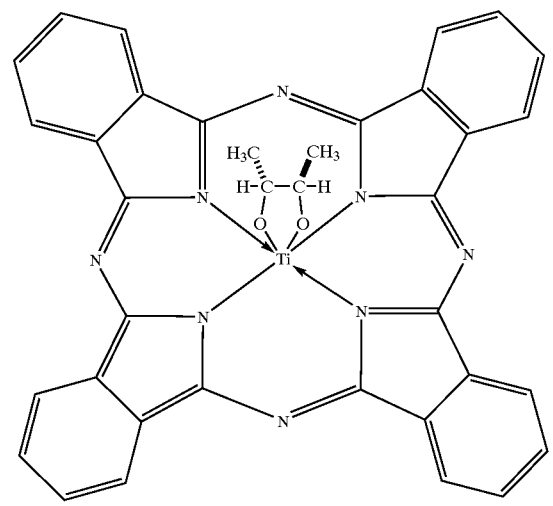

(XIV)

and has a peak at the Bragg angle (2θ±0.2°) of 8.3° in the X-ray diffraction spectrum to CuKα.

(55) An organic photoconductor comprising an electroconductive support having provided thereon a photosensitive layer, wherein said photosensitive layer contains a phthalocyanine compound represented by formulae (XV) and/or (XVI)

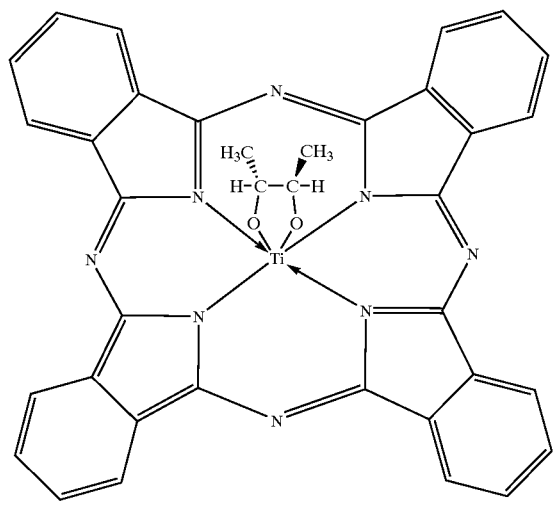

(XV)

-continued

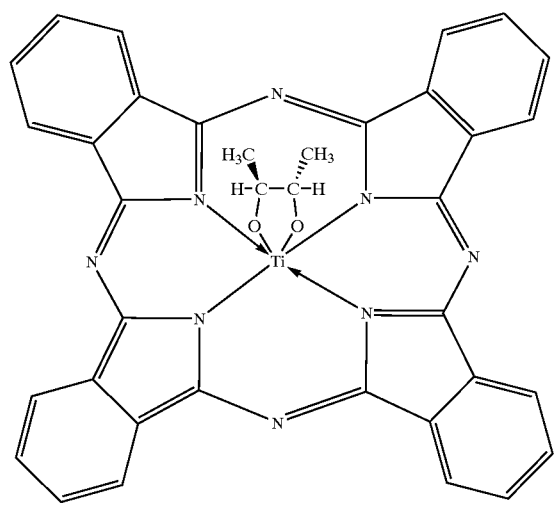
(XVI)

and has a peak at the Bragg angle (2θ±0.2°) of 8.3° in the X-ray diffraction spectrum to CuKα.

(56) An organic photoconductor comprising an electroconductive support having provided thereon a photosensitive layer, wherein said photosensitive layer contains a phthalocyanine compound represented by formula (XIV) and oxytitanium phthalocyanine

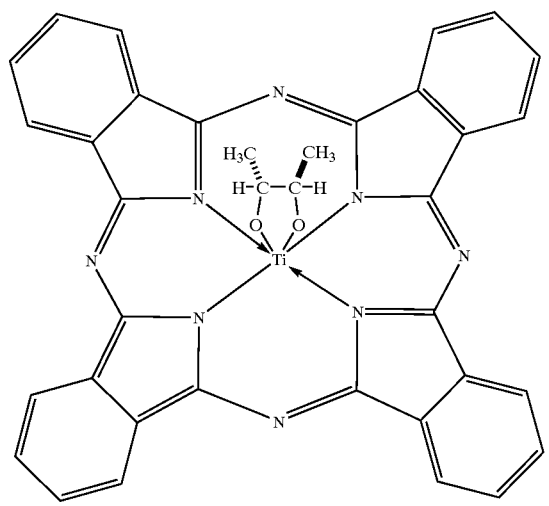
(XIV)

and has a peak at the Bragg angle (2θ±0.2°) of 8.3° in the X-ray diffraction spectrum to CuKα.

(57) An organic photoconductor comprising an electroconductive support having provided thereon a photosensitive layer, wherein said photosensitive layer contains a phthalocyanine compound represented by formulae (XV) and/or (XVI) and oxytitanium phthalocyanine

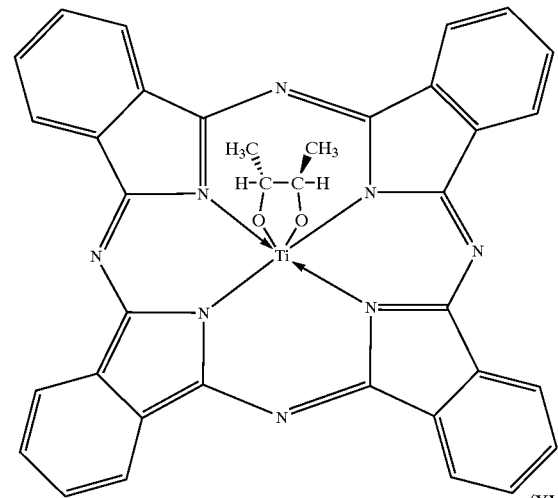
(XV)

(XVI)

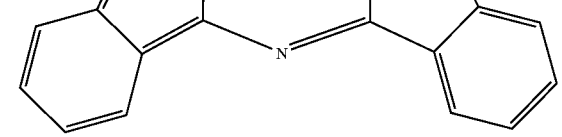

and has a peak at the Bragg angle (2θ±0.2°) of 8.3° in the X-ray diffraction spectrum to CuKα.

(58) An organic photoconductor comprising an electroconductive support having provided thereon a photosensitive layer, wherein said photosensitive layer contains a mixed crystal of a phthalocyanine compound represented by formula (XIV) and oxytitanium phthalocyanine

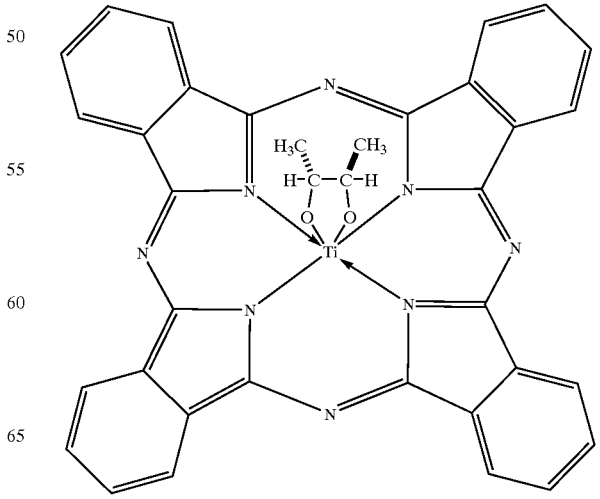
(XIV)

and has a peak at the Bragg angle (2θ±0.2°) of 8.3° in the X-ray diffraction spectrum to CuKα.

(59) An organic photoconductor comprising an electroconductive support having provided thereon a photosensitive layer, wherein said photosensitive layer contains a mixed crystal of a phthalocyanine compound represented by formulae (XV) and/or (XVI) and oxytitanium phthalocyanine

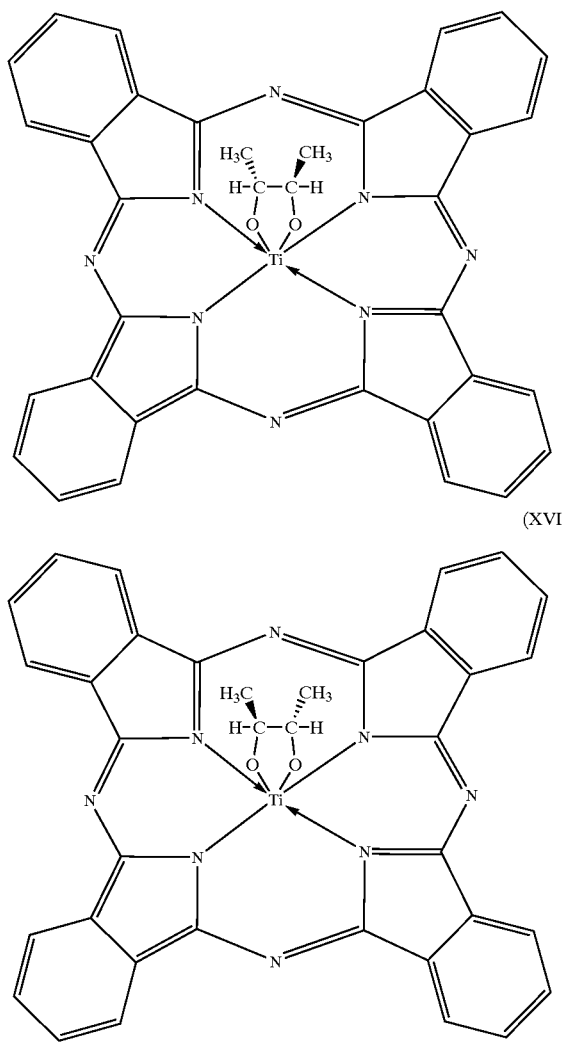

(XV)

(XVI)

and has a peak at the Bragg angle (2θ±0.2°) of 8.3° in the X-ray diffraction spectrum to CuKα.

Then, the following examples are intended to illustrate the present invention but not to limit the invention in any way. In addition, in the following examples, "parts" are, unless otherwise indicated, are "by weight".

EXAMPLE 1

Synthesis of (2R,3R-2,3-Butylene Glycolate Titanium Phthalocyanine (XV)

Figure 5:
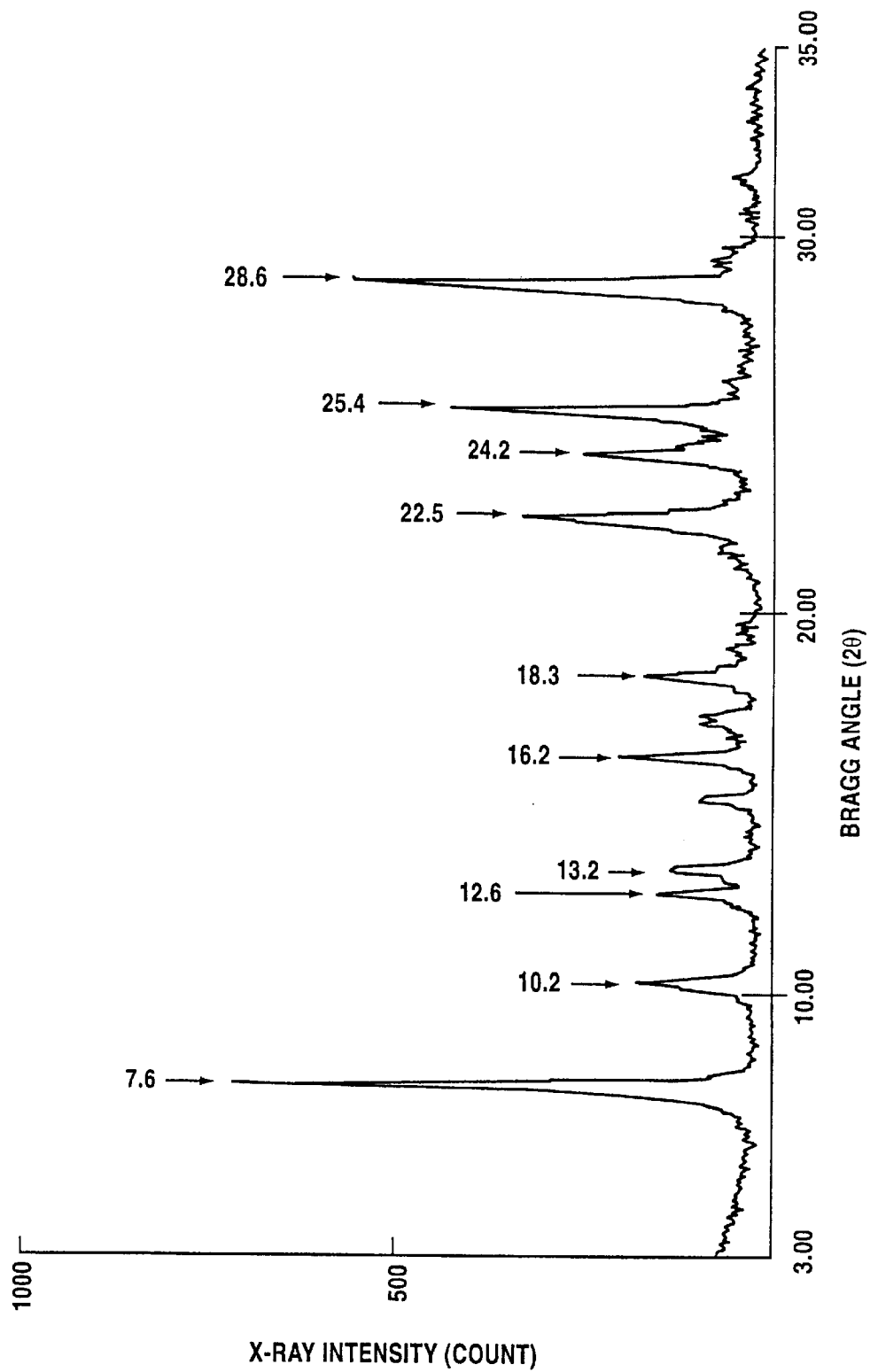
FIG. 5 is the powder X-ray diffraction diagram by a Cu $K_\alpha$ line of oxytitanium phthalocyanine used in Example 1.
Figure 6:
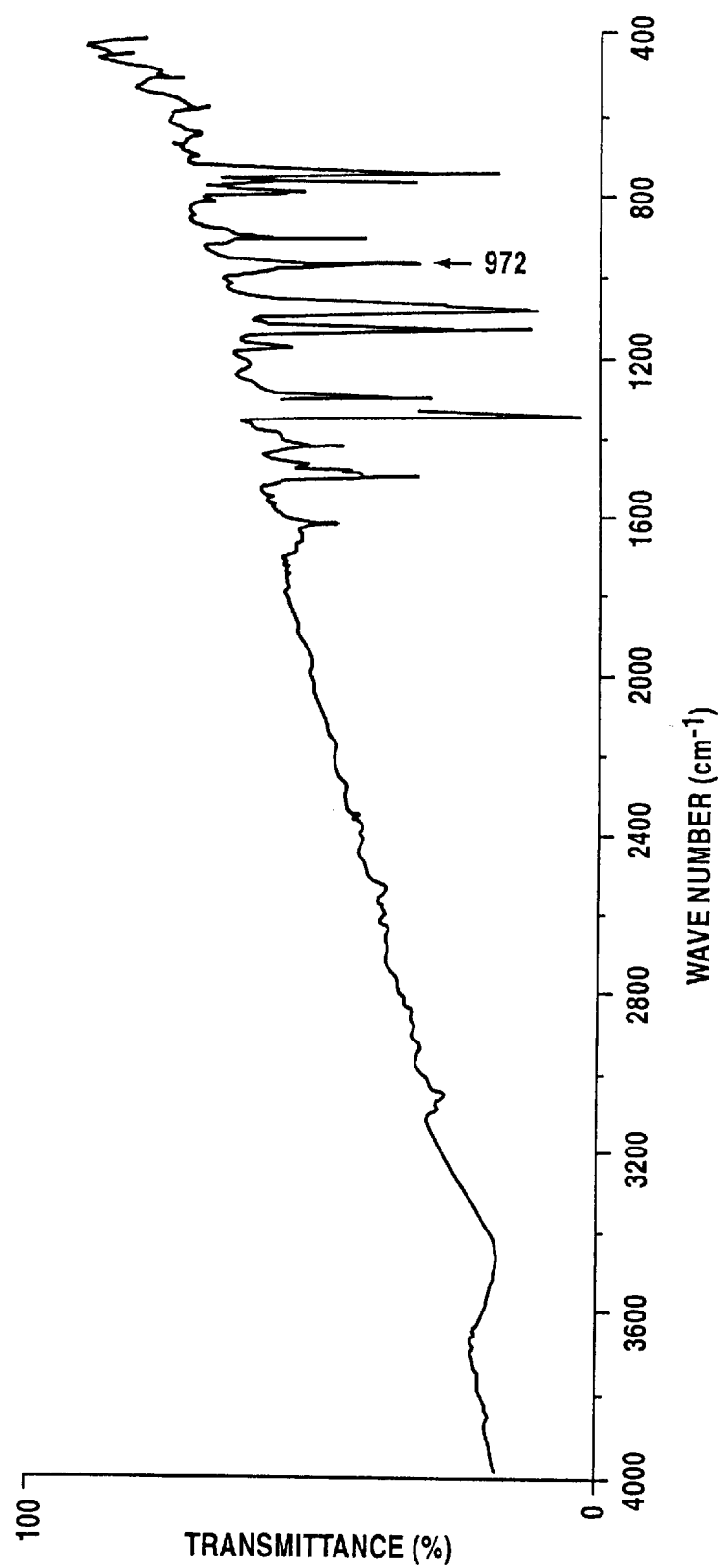
FIG. 6 is a graph showing the IR absorption spectrum of oxytitanium phthalocyanine used in Example 1.

Under stirring 20 parts of oxytitanium phthalocyanine crystals obtained from titanium tetrachloride and orthophthalodinitrile, showing the spectrum of FIG. 5 in the powder X-ray diffraction by the Cu Kα line, showing the spectrum of FIG. 6 in the IR absorption, and showing the pyrolysis curve of FIG. 7 in the thermogravimetry and 4.4 parts of (2R,3R)-(-)-2,3-butanediol in 240 parts of α-chloronaphthalene at a temperature of from 195° C. to 205° C., the reaction was carried out for 1.5 hours.

After cooling to room temperature, the reaction mixture was filtrated and after successively washing the product with benzene, methanol, dimethylformamide (DMF), and then water, the product was dried under reduced pressure to provide 18 parts of a blue crystal powder. The elemental analysis value of the product obtained is shown in Table 1 below.

TABLE 1

|  | C | H | N |
| --- | --- | --- | --- |
| Calculated | 66.7% | 3.7% | 17.3% |
| Found | 66.0% | 3.6% | 17.3% |

Figure 8:
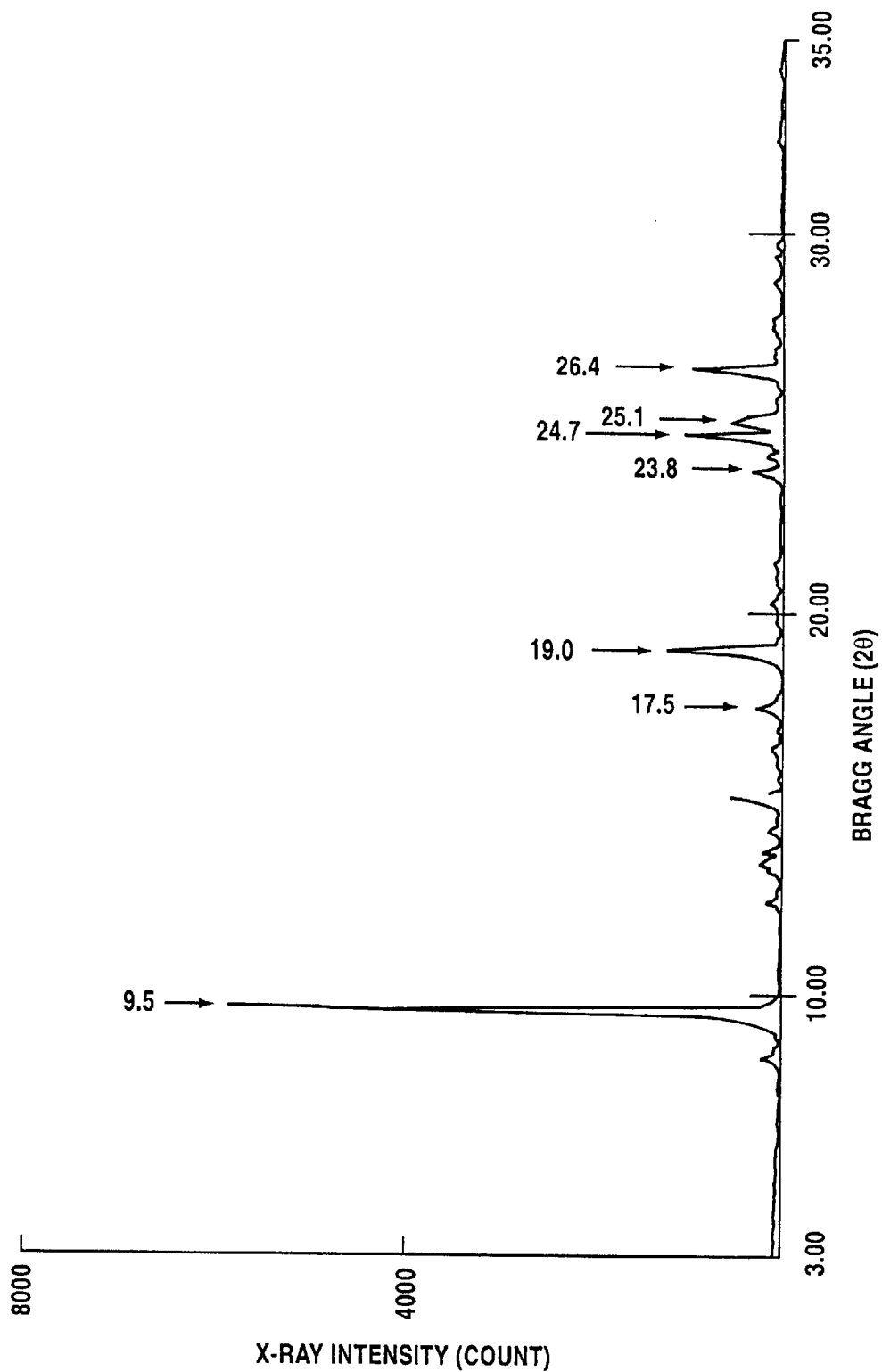
FIG. 8 is the powder X-ray diffraction diagram by a Cu $K_\alpha$ line of the phthalocyanine compound of the present invention obtained in Example 1.
Figure 9:
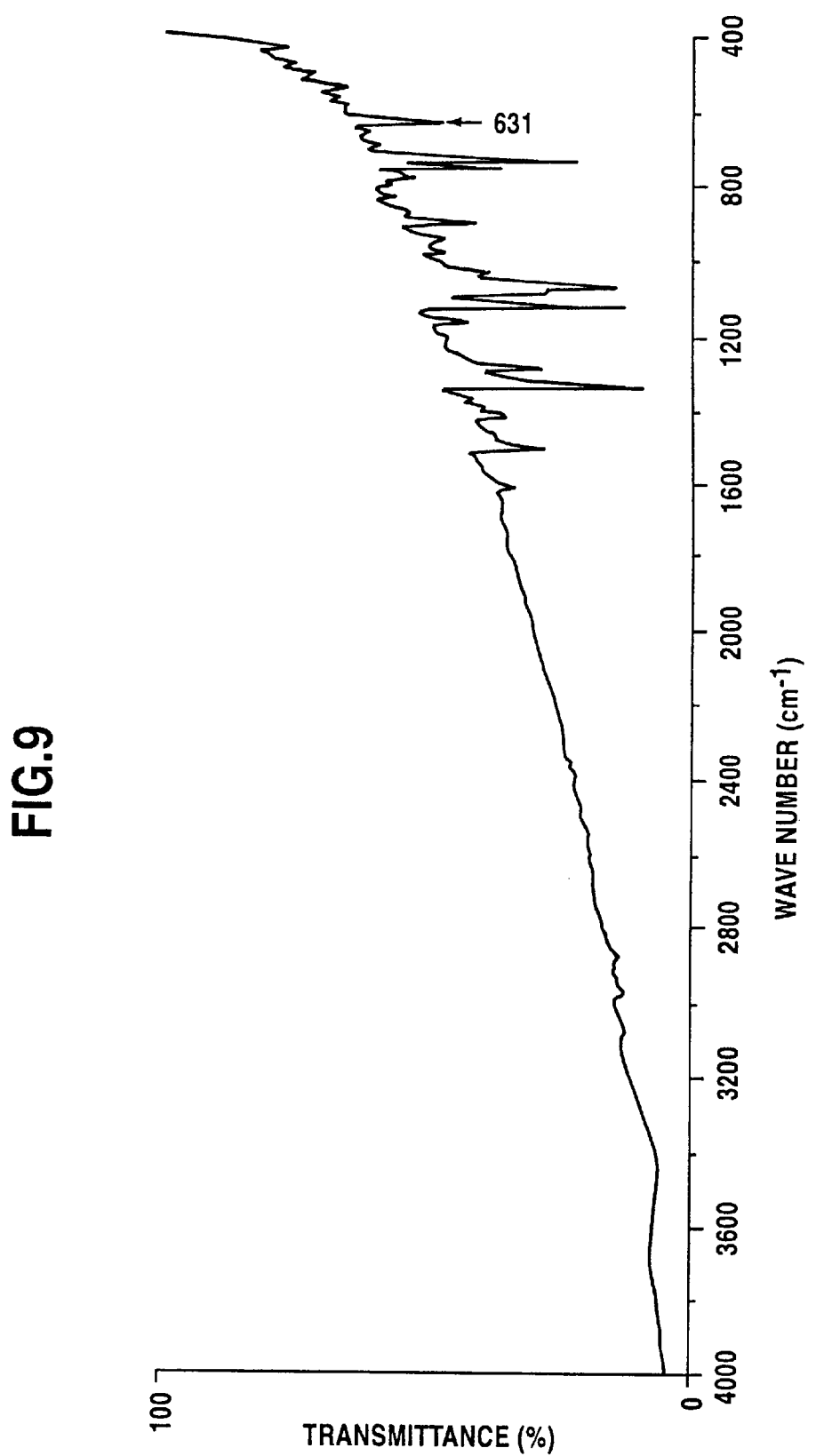
FIG. 9 is a graph showing the IR absorption spectrum of the phthalocyanine compound of the present invention obtained in Example 1.

Also, as the result of the FD-Mass spectrum measurement of the product, the peak of m/Z =648 was confirmed. Also, the powder X-ray diffraction diagram by the Cu Kα line, the IR absorption spectrum diagram, and the pyrolysis curve of the product are shown in FIG. 8, FIG. 9, and FIG. 10, respectively. In particular, in the IR spectrum, it can be seen that the peak of 972 $cm^{-1}$, which is the feature of Ti=O, existed before the reaction is vanished after the reaction and one peak of 631 $cm^{-1}$ caused by the specific isomer structure appears in the range of from 620 to 650 $cm^{-1}$.

To a mixed liquid of 66 parts of methylene chloride and 99 parts of 1,1,2-trichloroethane were added 2 parts of the blue powder obtained and 2 parts of a butyral resin and the mixture obtained was dispersed and mixed by a paint conditioner to form a dispersion. The dispersion was coated on a polyethylene terephthalate film by a wire bar and dried to form a layer of a dry thickness of 0.2 μm to provide a film sample.

Figure 11:
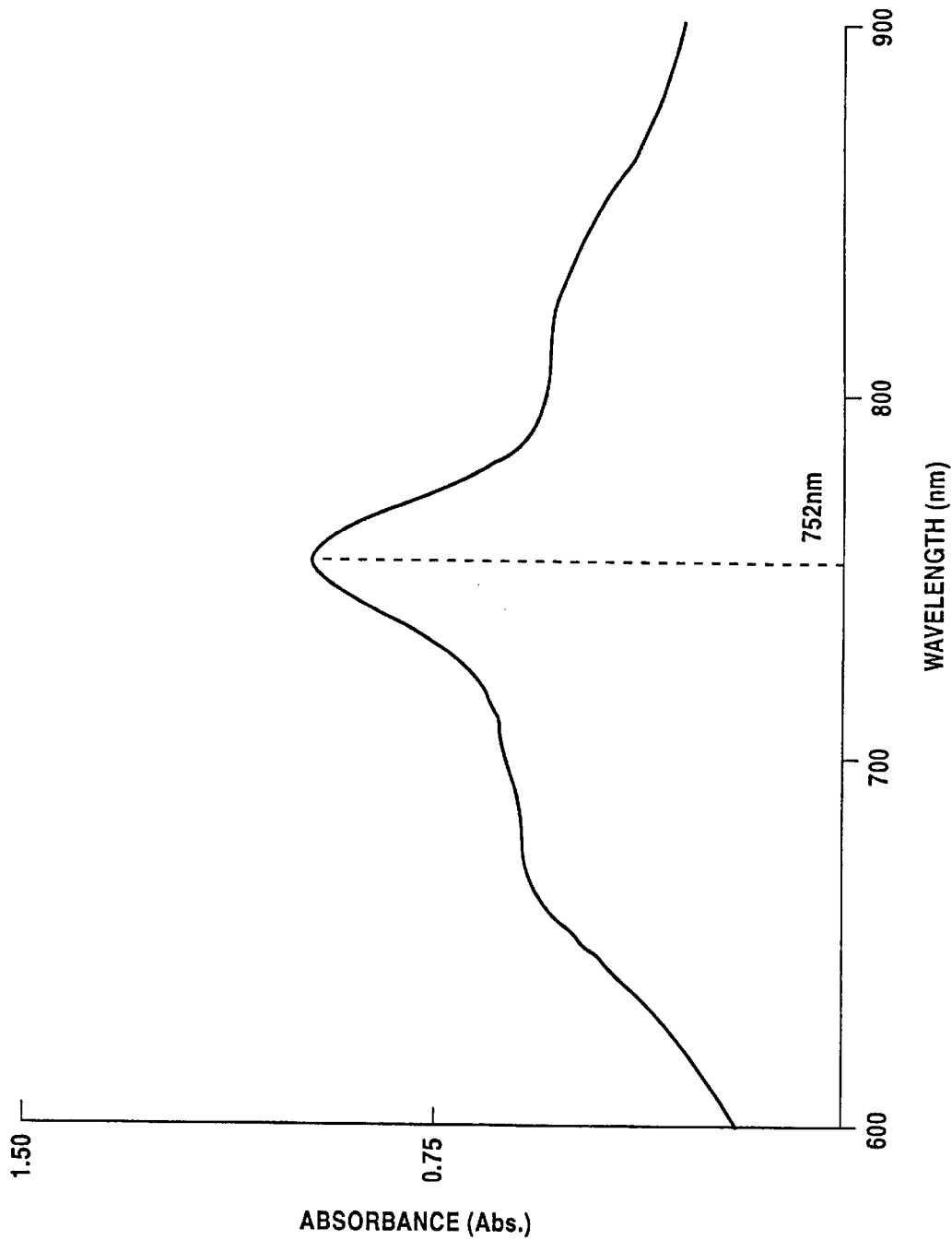
FIG. 11 is a graph showing the extinction spectrum of the dispersed film sample obtained in Example 1.

The light absorption characteristics of the film sample were measured by a spectrophotometer. The result is shown in FIG. 11. From the result, it can be seen that the absorption of the phthalocyanine compound of the present invention having the specific isomer structure strongly exists in a long wavelength region.

EXAMPLE 2

Synthesis of (2S,3S)-2,3-Butylene Glycolate Titanium hthalocyanine (XVI)

By following the same procedure as Example 1 except that the same amount of (2S,3S)-(+)-2,3-butanediol was used in place of (2R,3R)-(-)-2,3-butanediol, a blue powder was obtained. The elemental analysis value of the blue powder obtained is as follows.

TABLE 2

|  | C | H | N |
| --- | --- | --- | --- |
| Calculated | 66.7% | 3.7% | 17.3% |
| Found | 66.0% | 3.6% | 17.4% |

Figure 12:
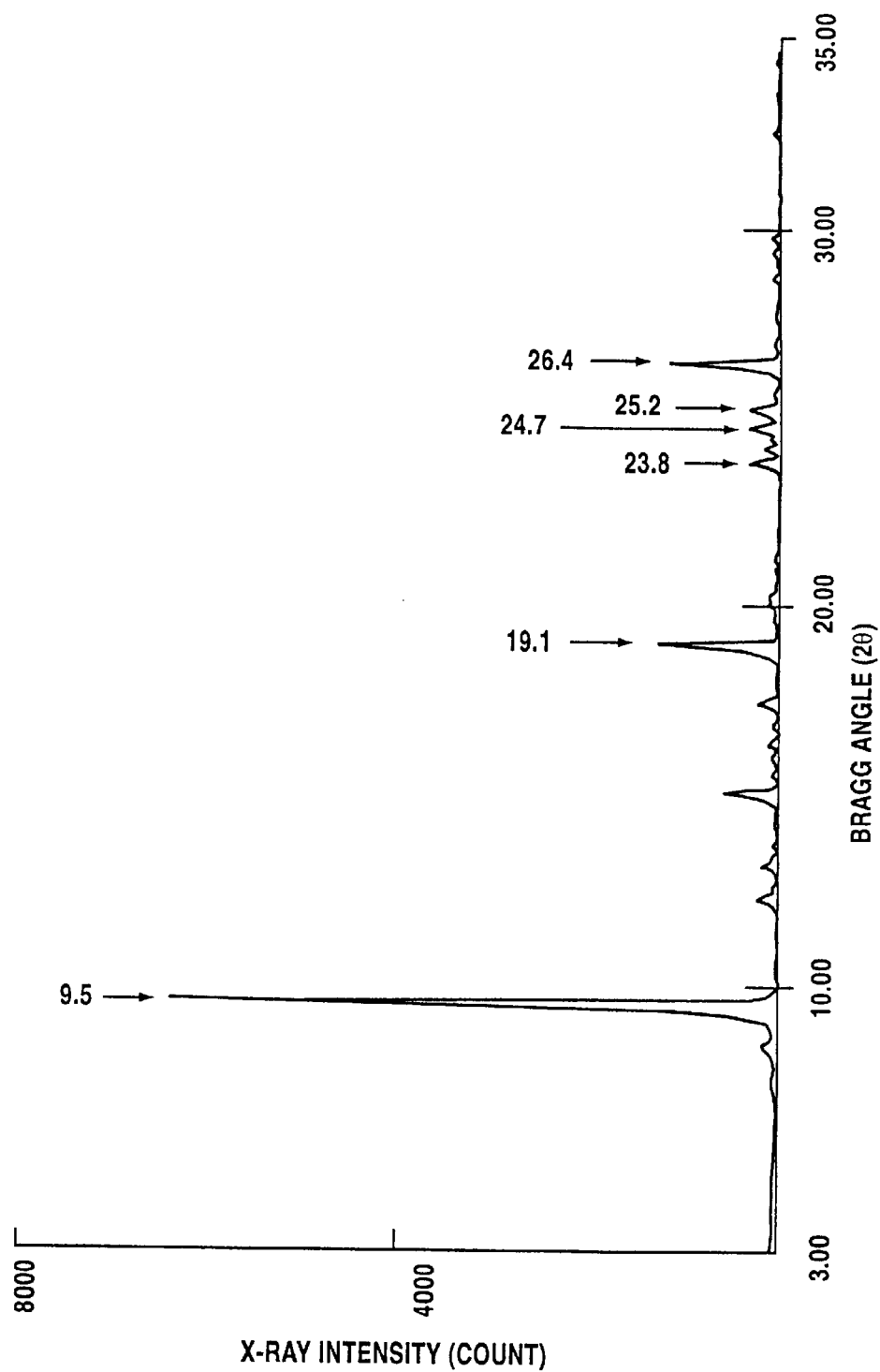
FIG. 12 is the powder X-ray diffraction diagram by a Cu $K_\alpha$ line of the phthalocyanine compound of the present invention obtained in Example 2.
Figure 13:
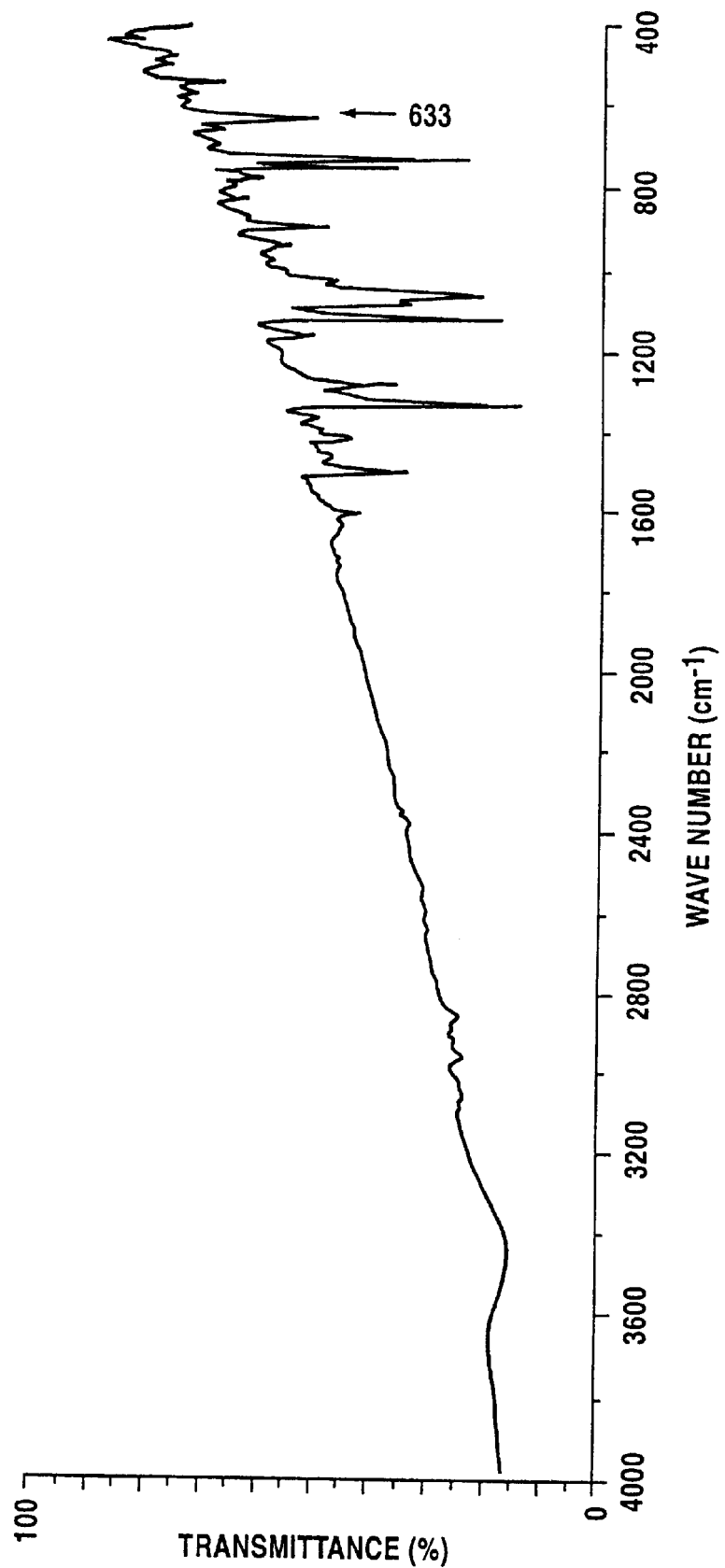
FIG. 13 is a graph showing the IR absorption spectrum of the phthalocyanine compound of the present invention obtained in Example 2.
Figure 14:
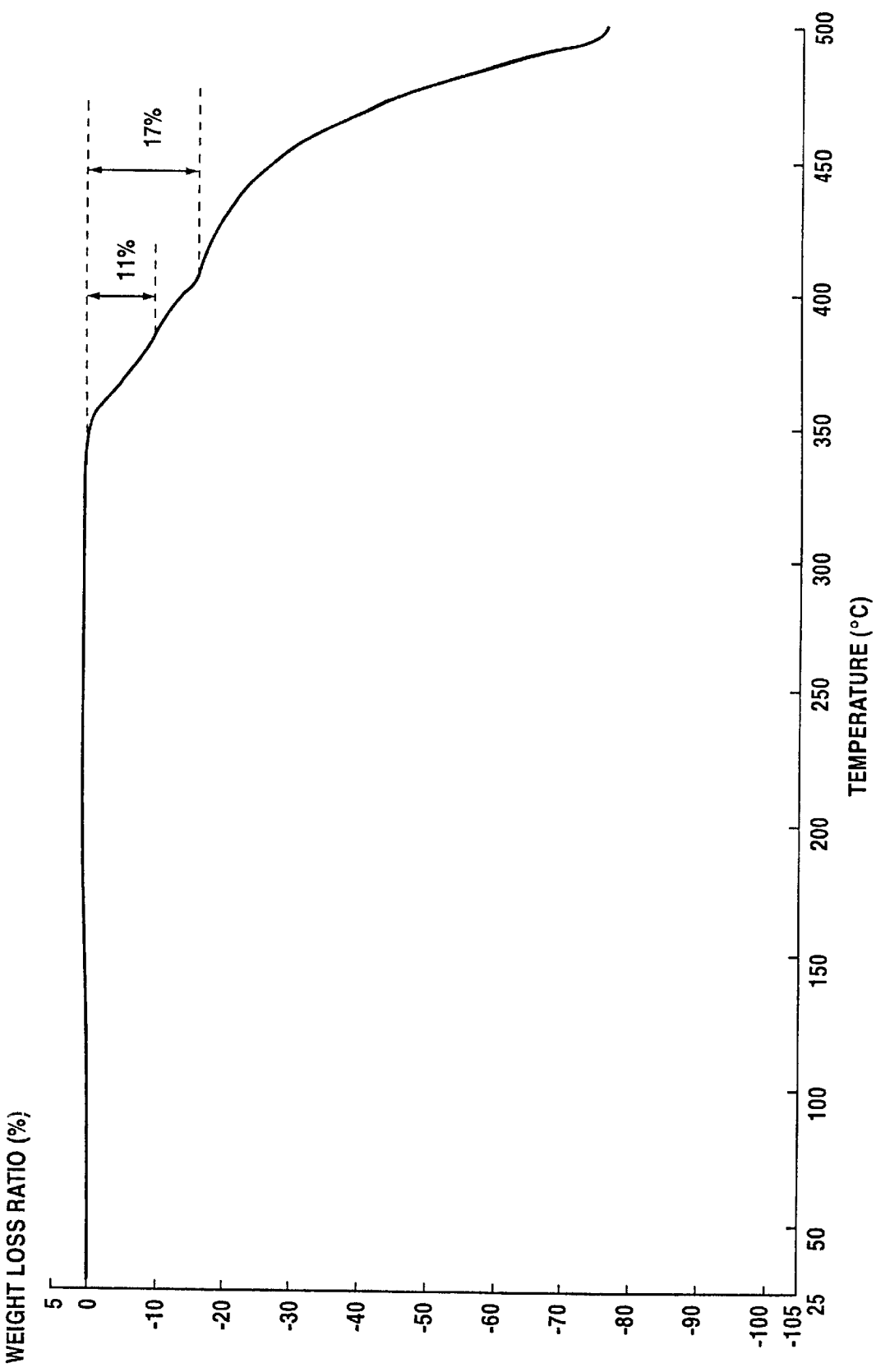
FIG. 14 is a graph showing the pyrolysis curve of the phthalocyanine compound of the present invention obtained in Example 2.

Also, as the result of the FD-Mass spectrum measurement of the product, the peak of m/Z=648 was confirmed. The powder X-ray diffraction diagram by the Cu Kα line, the IR absorption spectrum diagram, and the pyrolysis curve of the product are shown in FIG. 12, FIG. 13, and FIG. 14, respectively. In particular, in the IR spectrum, it can be seen that the peak of 972 cm$^{-1}$, which is the feature of Ti=O, is vanished after the reaction and one peak of 633 cm$^{-1}$ caused by the specific isomer structure appears in the range of from 620 to 650 cm$^{-1}$.

EXAMPLE 3

Figure 15:
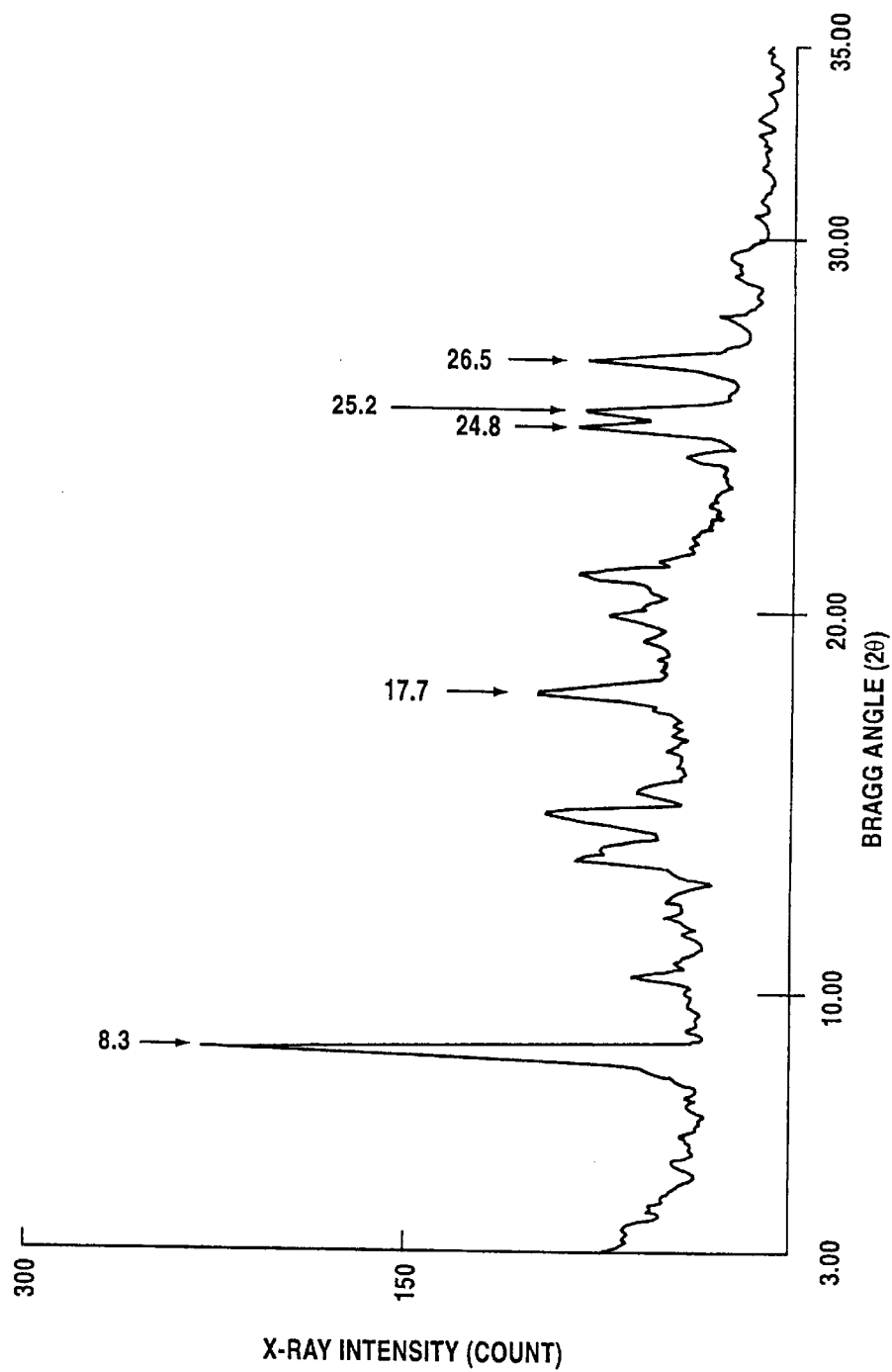
FIG. 15 is the X-ray diffraction diagram of the thin film obtained by dip-coating a resin dispersed liquid of the phthalocyanine compound of the present invention prepared in Example 3 on a thin metal plate.

To a mixed liquid of 66 parts of methylene chloride and 99 parts of 1,1,2-trichloromethane were added 2 parts of the phthalocyanine compound obtained in Example 1 and 2 parts of a butyral resin ("S-LEC BH-3", trade name, made by Sekisui Chemical Co., Ltd. ) and the mixture was dispersed and mixed by a paint conditioner to provide a dispersion of a charge generating material. Also, the x-ray diffraction spectrum of the thin film of 5 μm thick formed by coating the charge generating material dispersion on a metal thin plate by dip coating is shown in FIG. 15.

The charge generating material dispersion obtained was coated on a polyester film having an aluminum layer vapor deposited thereon by a wire bar followed by drying to form a charge generating layer having a dry thickness of 0.3 μm. On the charge generating layer thus formed was coated a coating liquid formed by dissolving 20 parts of the charge transport material of Compound No. (4) described above and 20 parts of a polycarbonate resin ("IUPILON" Z200, trade name, made by Mitsubishi Gas Chemical Company, Inc.) in a mixed liquid composed of 54 parts of methylene chloride and 36 parts of chlorobenzene such that the dry thickness of the coated layer became 15 μm to form a charge transport layer to provide this an organic photoconductor having the layer structure shown in FIG. 1.

EXAMPLE 4

By following the same procedure as Example 3 except that 2 parts of the phthalocyanine compound obtained in Example 2 was used, an organic photoconductor was prepared.

EXAMPLE 5

By following the same procedure.as Example 3 except that 1 part of the phthalocyanine compound of formula (XV) obtained in Example 1 and 1 part of the phthalocyanine compound of formula (XVI) obtained in Example 2 were used in place of 2 parts of the phthalocyanine compound used in Example 3, an organic photoconductor was prepared.

EXAMPLE 6

Figure 16:
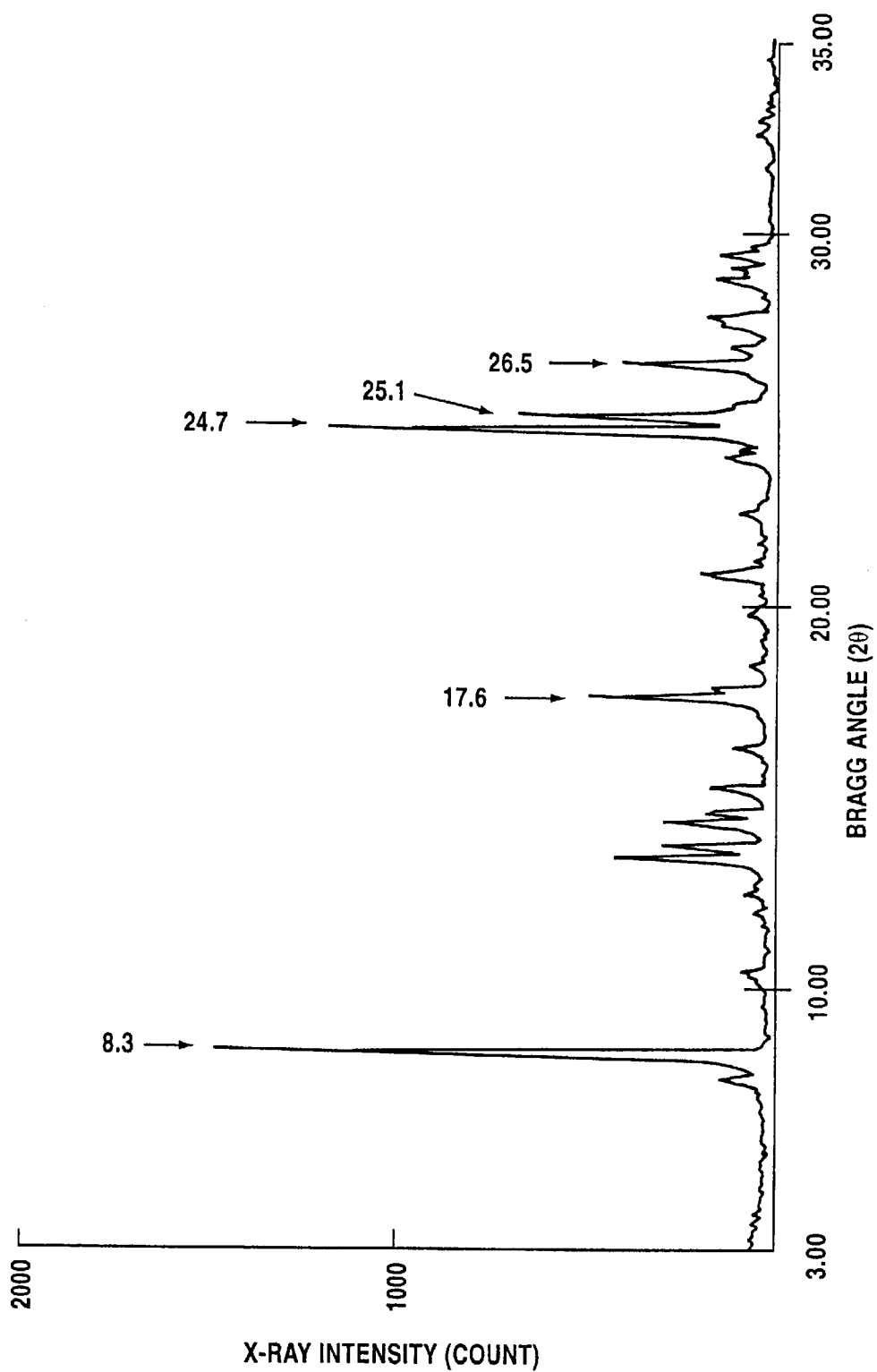
FIG. 16 is the powder X-ray diffraction diagram by a Cu $K_\alpha$ line of the phthalocyanine compound used for the organic photoconductor of the present invention in Example 6.
Figure 17:
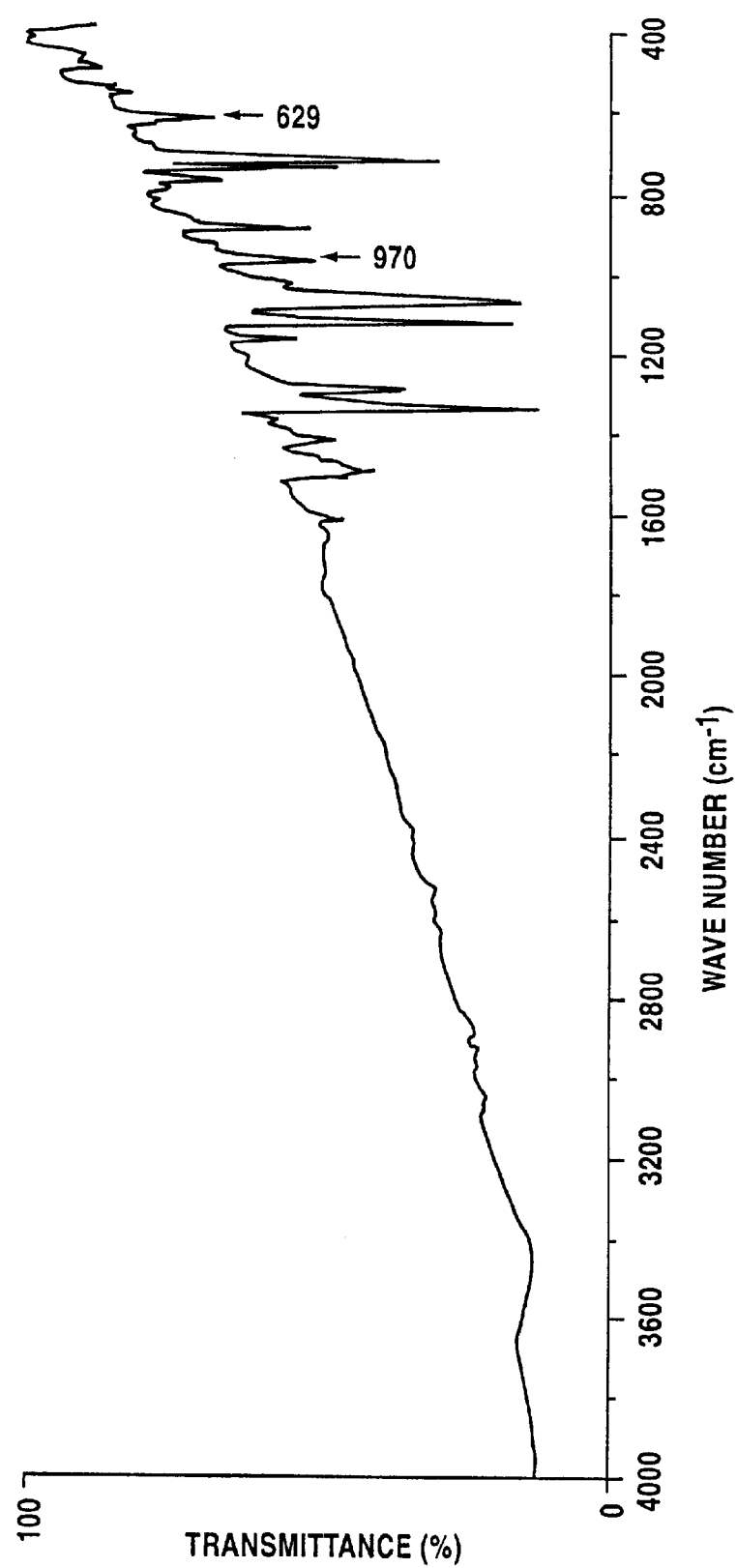
FIG. 17 is a graph showing the IR absorption spectrum of the phthalocyanine compound used for the organic photoconductor of the present invention in Example 6.

By following the same procedure as Example 3 except that 2 parts of the phthalocyanine compound showing the peaks at m/Z=576 and 648 in the mass spectrum, showing the spectrum of FIG. 16 in the powder X-ray diffraction by the Cu Kα line, and showing the spectrum of FIG. 17 in the IR absorption obtained by using 2.2 parts of (2R,3R)-(−)-2,3-butanediol in place of 4.4 parts of (2R,3R)-(−)-2,3-butanediol of Example 1 was used, an organic photoconductor 25 was prepared. In addition, it is assumed that said phthalocyanine compound is a mixed crystal of (2R,3R)-2,3-butylene glycolate titanium phthalocyanine (XV) and oxytitanium phthalocyanine at a molecular ratio (the former/the latter) in the range of from 30/70 to 70/30.

Figure 18:
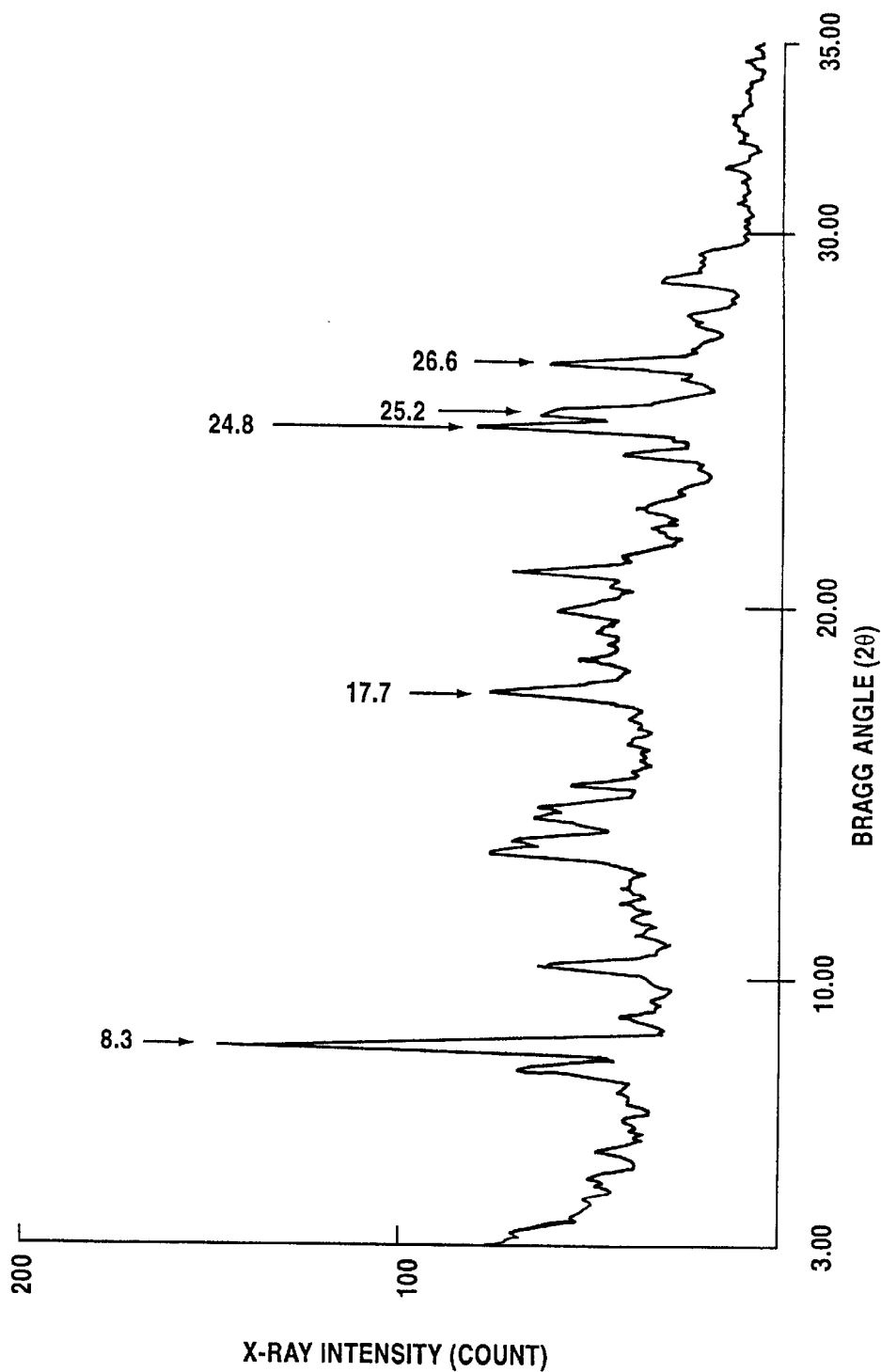
FIG. 18 is the X-ray diffraction diagram of the thin film obtained by dip-coating a resin dispersed liquid of the phthalocyanine compound of the present invention prepared in Example 6 on a thin metal plate.

Also, the X-ray diffraction spectrum of the thin film of 5 μm thick obtained by dip-coating the charge generating material dispersion obtained in the example on a thin metal plate is shown in FIG. 18.

EXAMPLE 7

Figure 19:
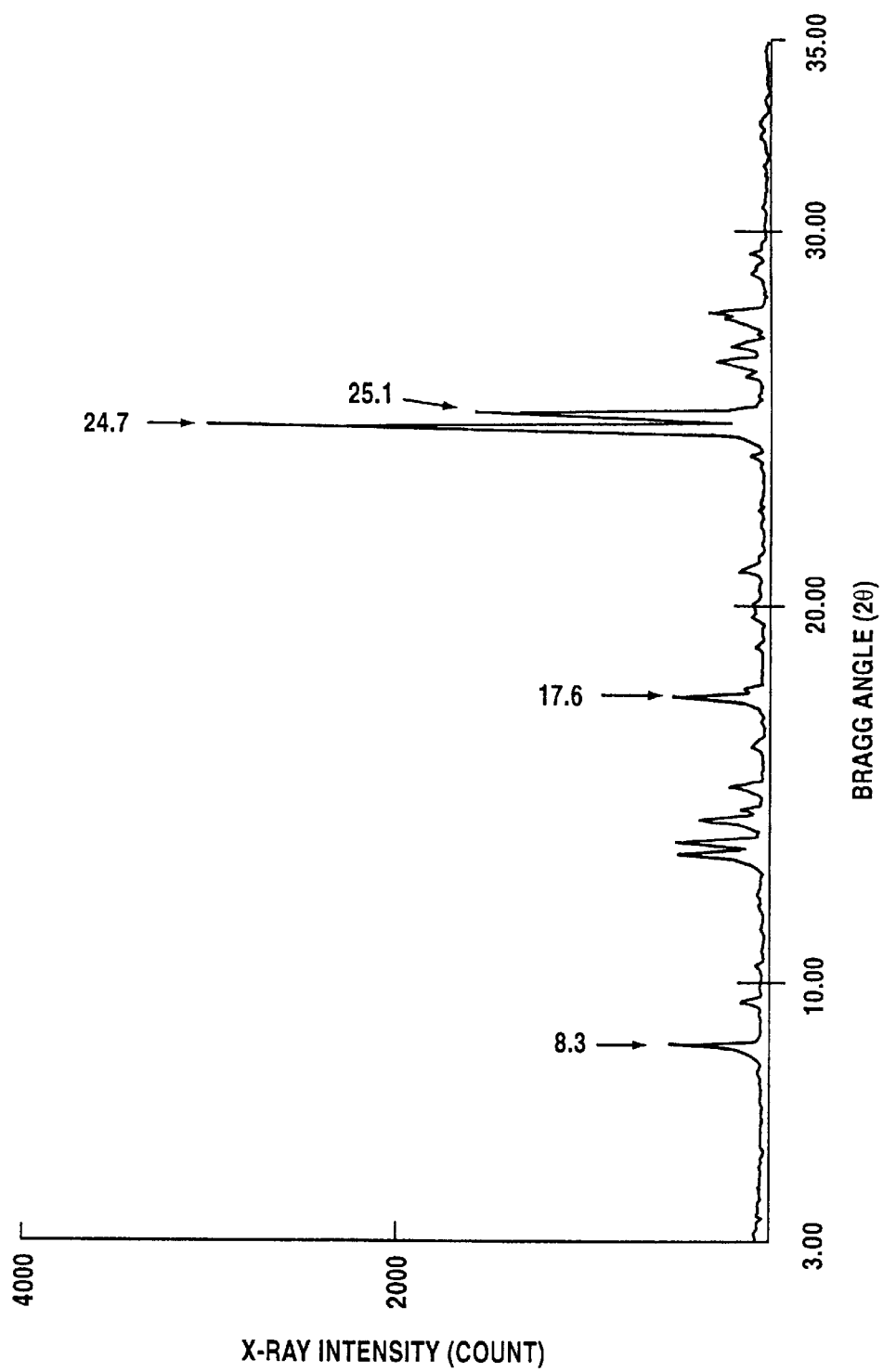
FIG. 19 is the powder X-ray diffraction diagram by a Cu $K_\alpha$ line of the phthalocyanine compound used for the organic photoconductor of the present invention in Example 7.
Figure 20:
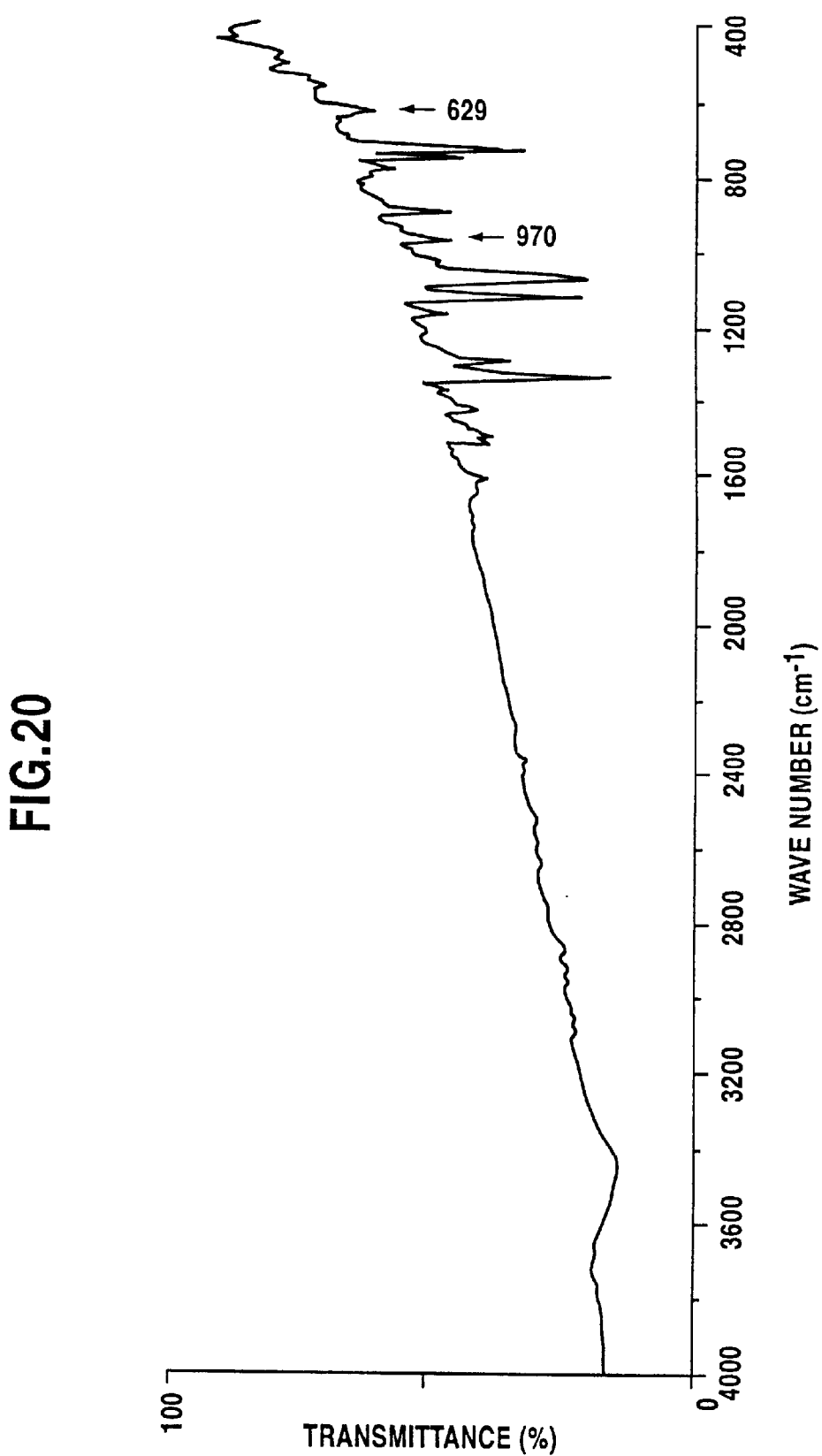
FIG. 20 is a graph showing the IR absorption spectrum of the phthalocyanine compound used for the organic photoconductor of the present invention in Example 7.

By following the same procedure as Example 3 except that the phthalocyanine compound showing the peaks at m/Z=576 and 648 in the mass spectrum, showing the spectrum of FIG. 19 in the powder X-ray diffraction by the Cu Kα line, and showing the spectrum of FIG. 20 in the IR absorption obtained by using 3.1 parts of (2R,3R)-(−)-2,3-butanediol in place of 4.4 parts of (2R,3R)-(−)-2,3-butanediol of Example 1 was used, an organic photoconductor was prepared. In addition, it is assumed that said phthalocyanine compound is a mixed crystal of (2R,3R)-2,3-butylene glycolate titanium phthalocyanine (XV) and oxytitanium phthalocyanine at a molecular ratio (the former/the latter) in the range of from 30/70 to 70/30.

Figure 21:
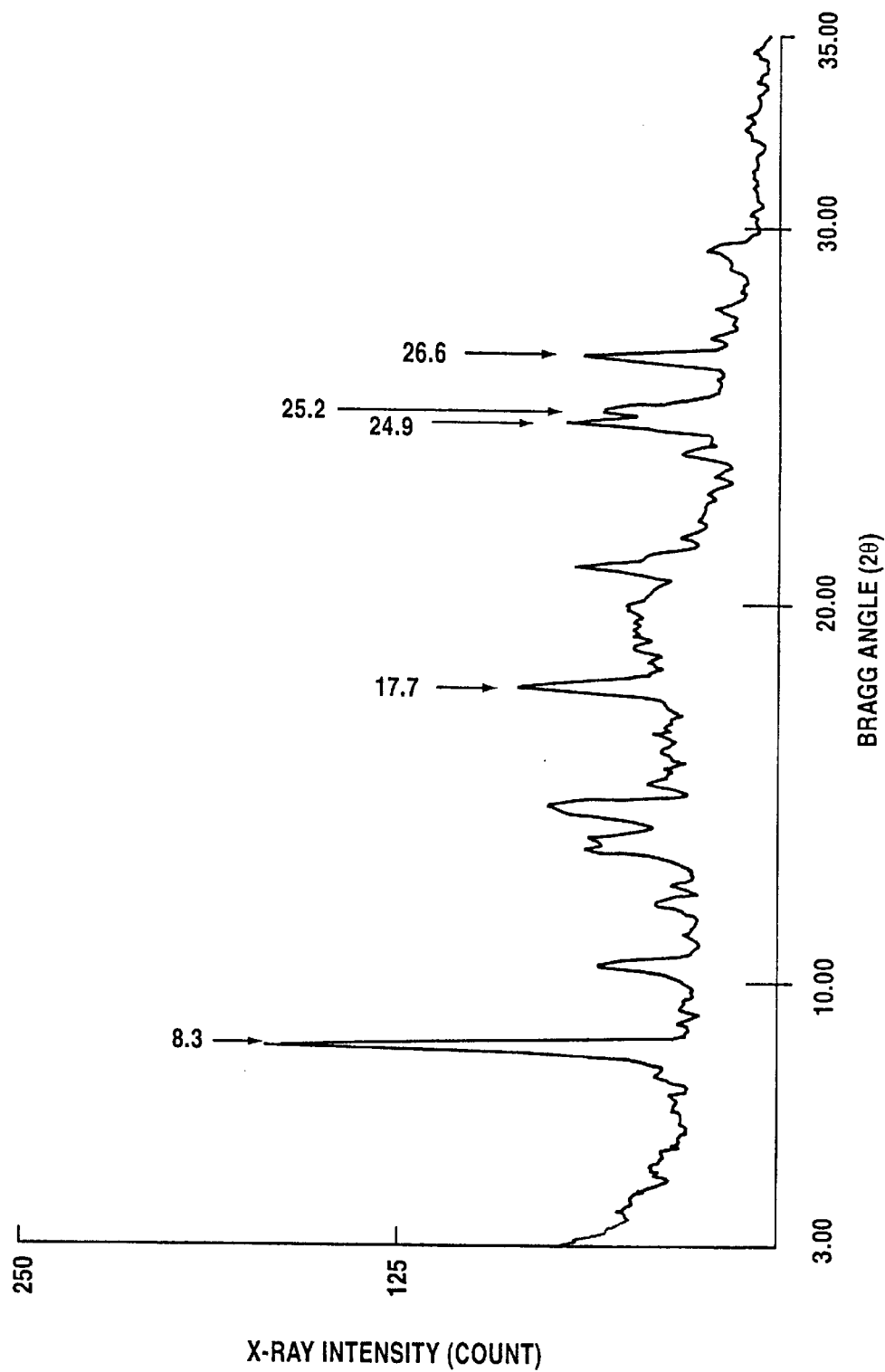
FIG. 21 is the X-ray diffraction diagram of the thin film obtained by dip-coating a resin dispersed liquid of the phthalocyanine compound of the present invention prepared in Example 7 on a thin metal plate.

Also, the X-ray diffraction spectrum of the thin film of 5 μm thick obtained by dip-coating the charge generating material dispersion obtained in the example on a thin metal plate is shown in FIG. 21.

COMPARATIVE EXAMPLE 1

By following the same procedure as Example 3 except that 2 parts of the phthalocyanine compound of formula (XVII)

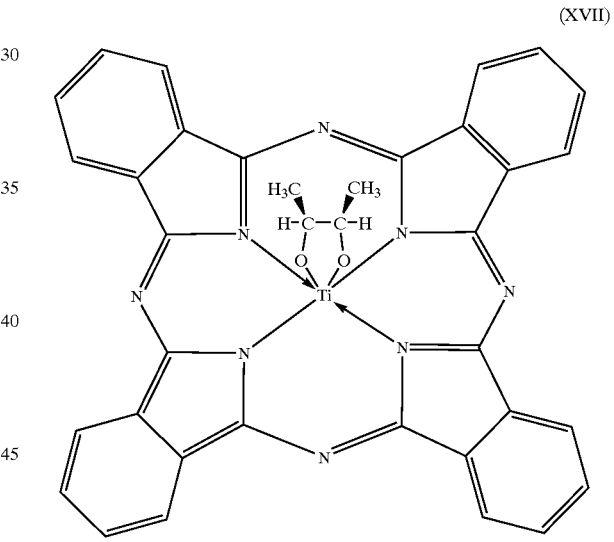

Figure 22:
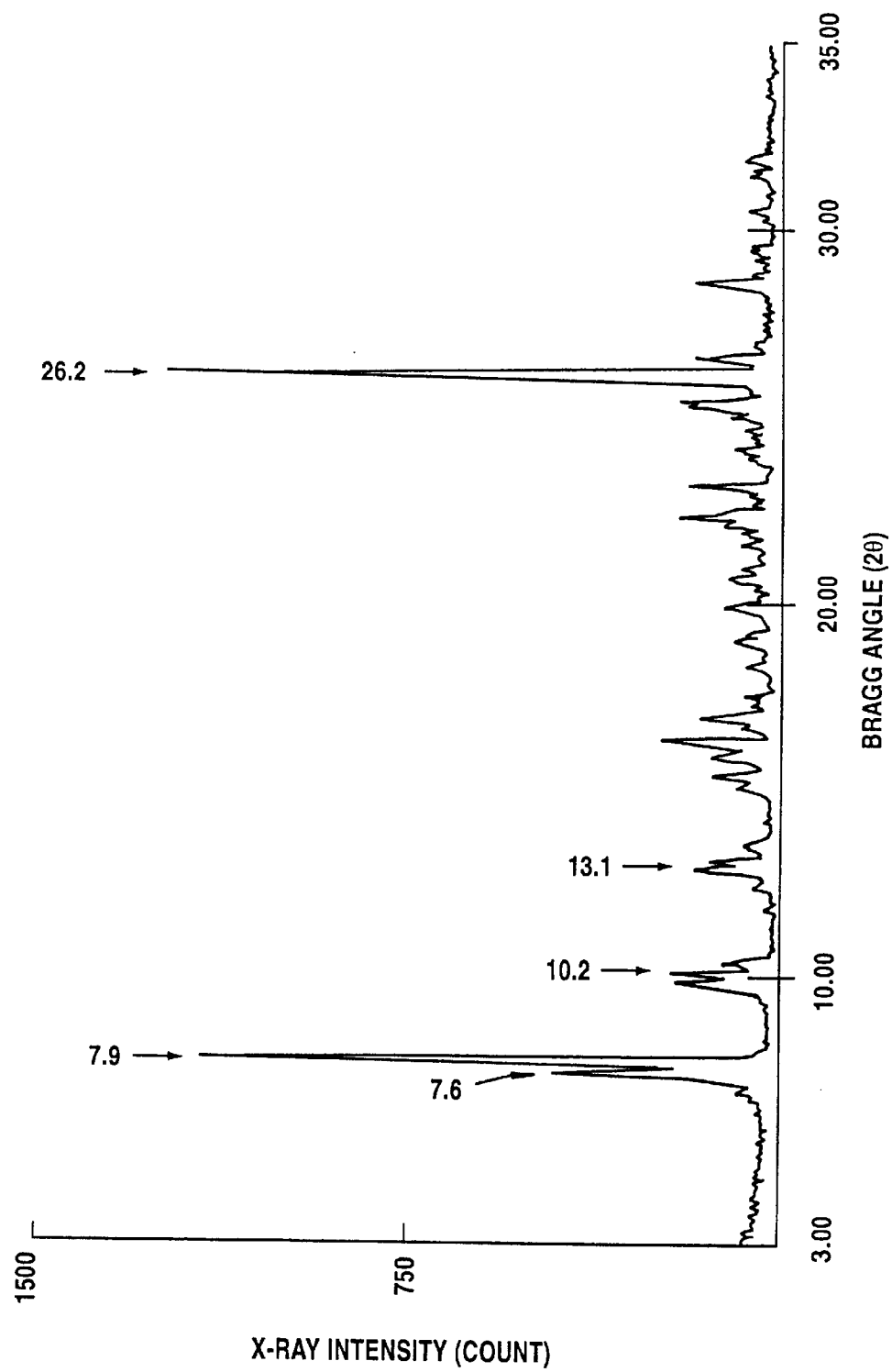
FIG. 22 is the powder X-ray diffraction diagram by a Cu $K_\alpha$ line of the phthalocyanine compound used for the organic photoconductor in Comparative Example 1.
Figure 23:
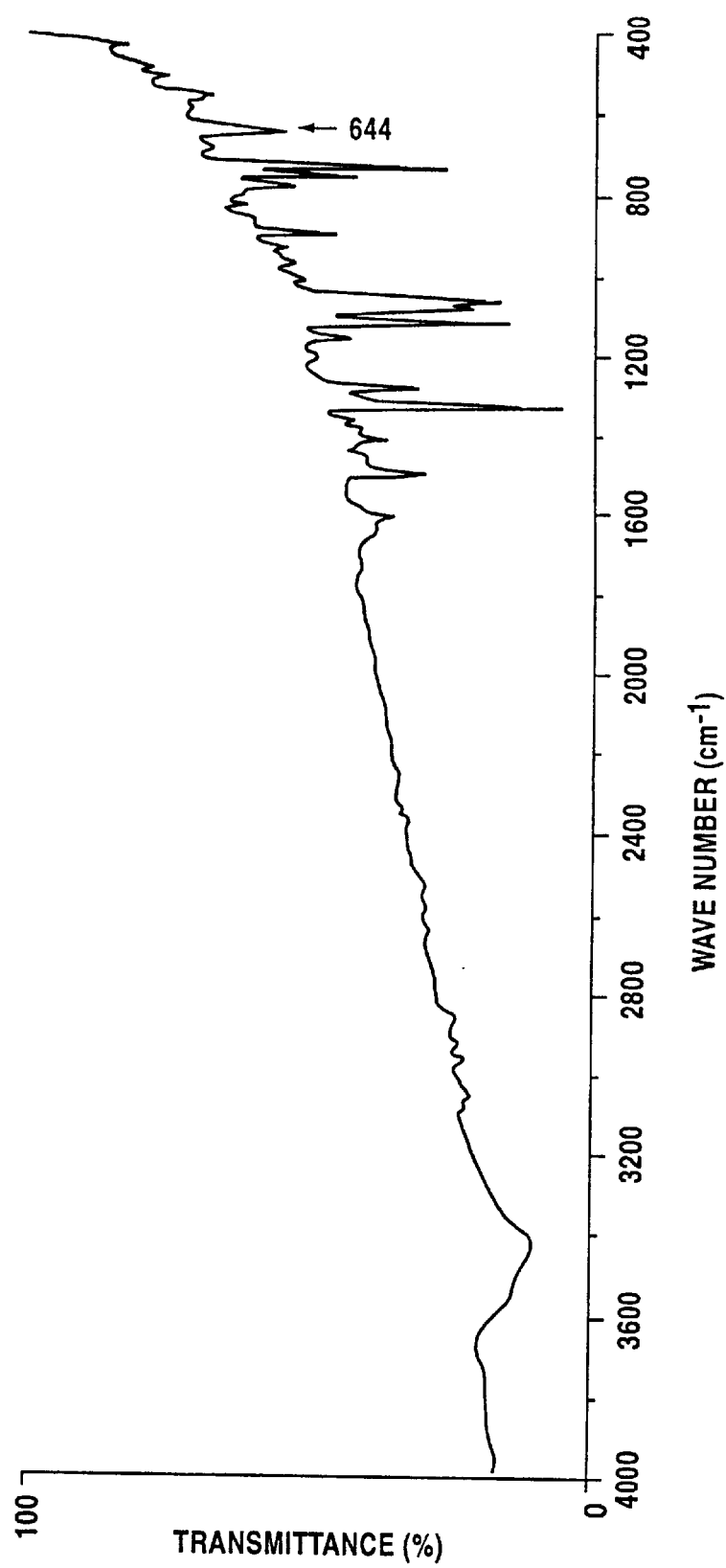
FIG. 23 is a graph showing the IR absorption spectrum of the phthalocyanine compound used for the organic photoconductor in Comparative Example 1.
Figure 24:
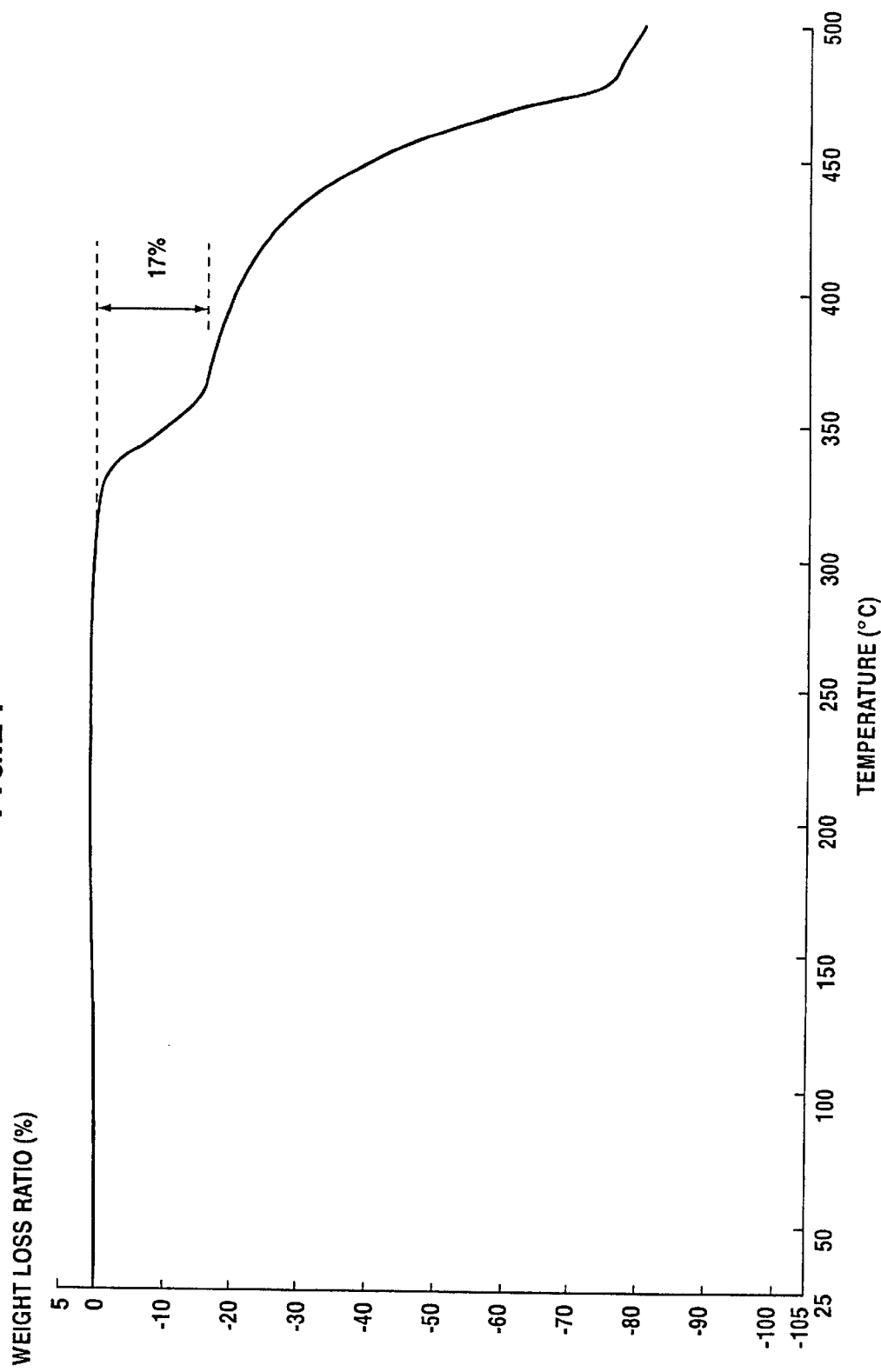
FIG. 24 is a graph showing the pyrolysis curve of the phthalocyanine compound used for the organic photoconductor in Comparative Example 1.
Figure 25:
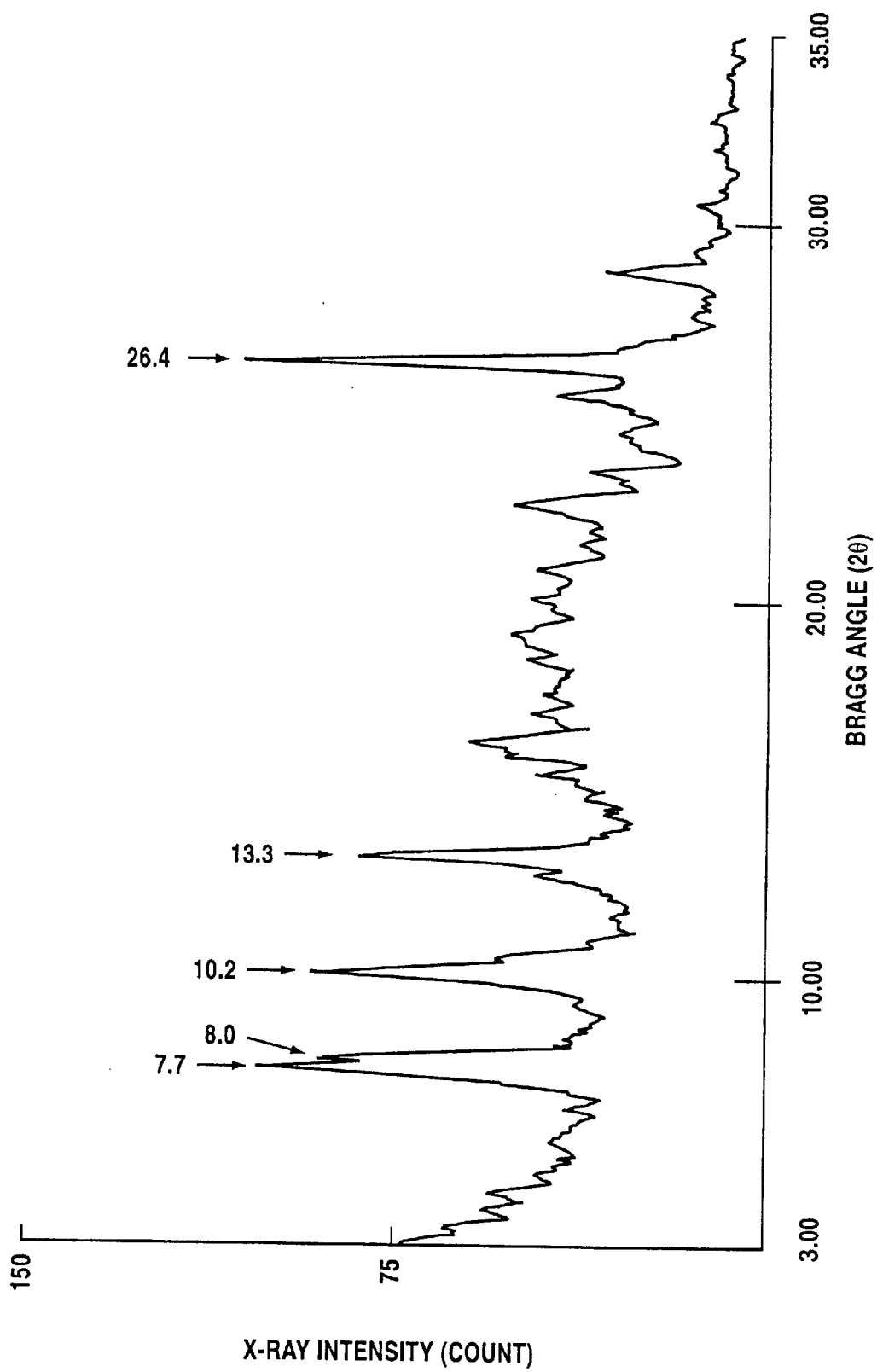
FIG. 25 is the X-ray diffraction diagram of the thin film obtained by dip-coating a resin dispersed liquid of the phthalocyanine compound of the present invention prepared in Comparative Example 1 on a thin metal plate.

(XVII)

showing the peak at m/Z=648 in the mass spectrum, showing the spectrum of FIG. 22 in the powder X-ray diffraction by the Cu Kα line, showing the spectrum of FIG. 23 in the IR absorption, and showing the pyrolysis curve of FIG. 24 by the thermogravimetry obtained by using meso-2,3-butanediol in place of (2R,3R)-(−)-2,3-butanediol of Example 1 was used, an organic photoconductor was prepared. Also, the X-ray diffraction spectrum of the thin film of 5 μm thick obtained by dip-coating the charge generating material dispersion obtained in the comparative example on a thin metal plate is shown in FIG. 25.

COMPARATIVE EXAMPLE 2

By following the same procedure as Example 3 except that 2 parts of the phthalocyanine compound of formula (XVIII)

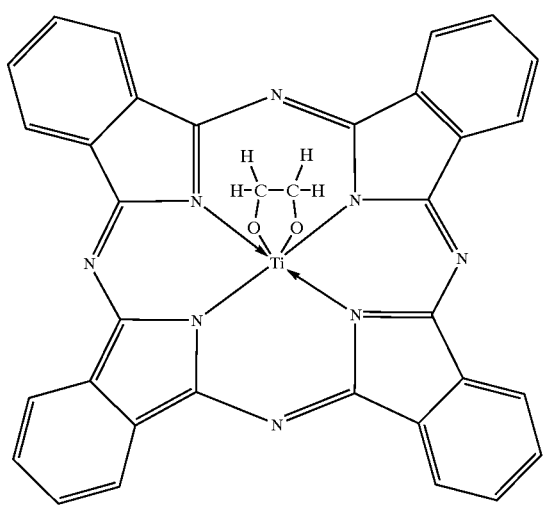

Figure 26:
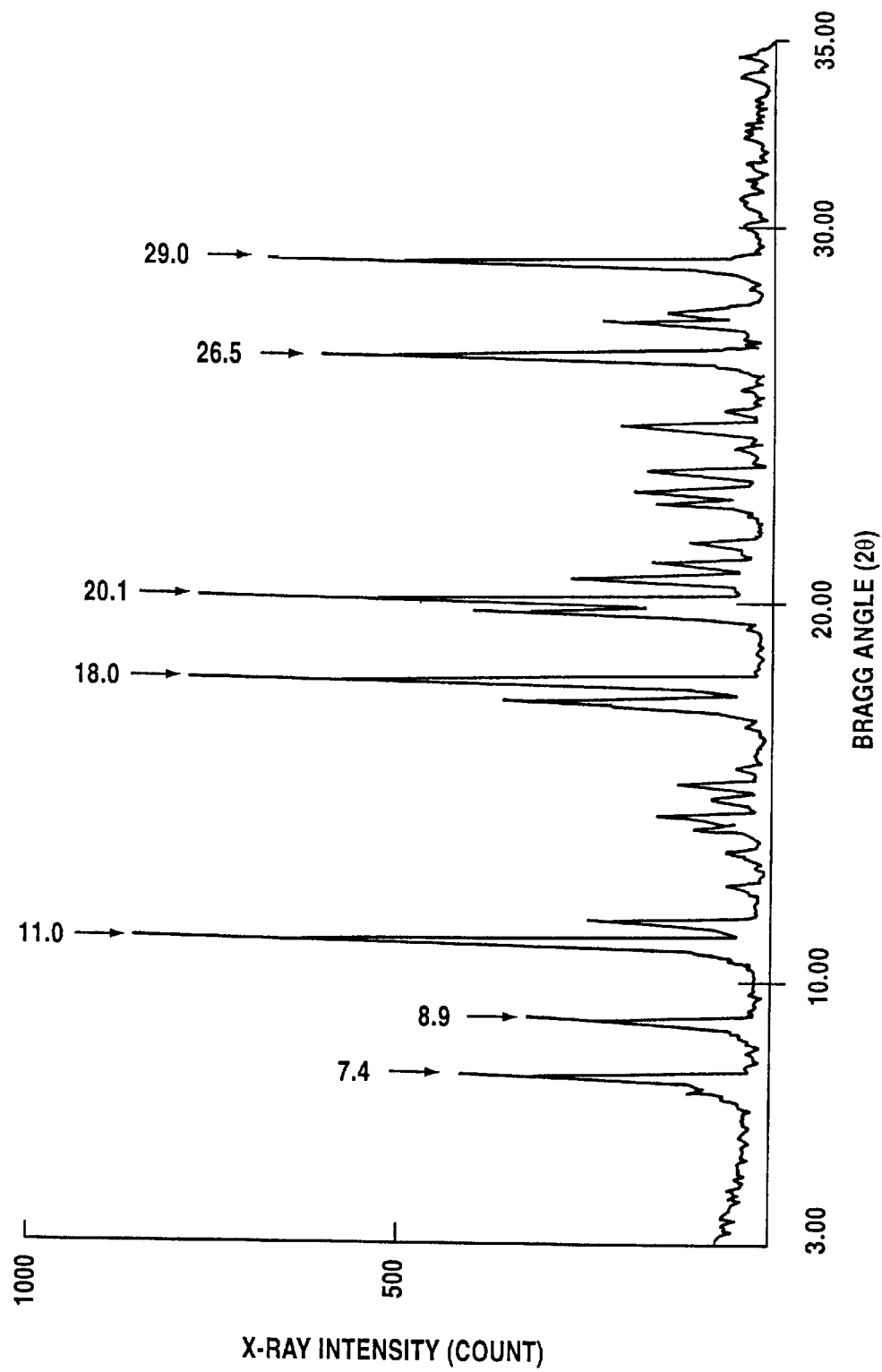
FIG. 26 is the powder X-ray diffraction diagram by a Cu $K_\alpha$ line of the phthalocyanine compound used for the organic photoconductor in Comparative Example 2.
Figure 27:
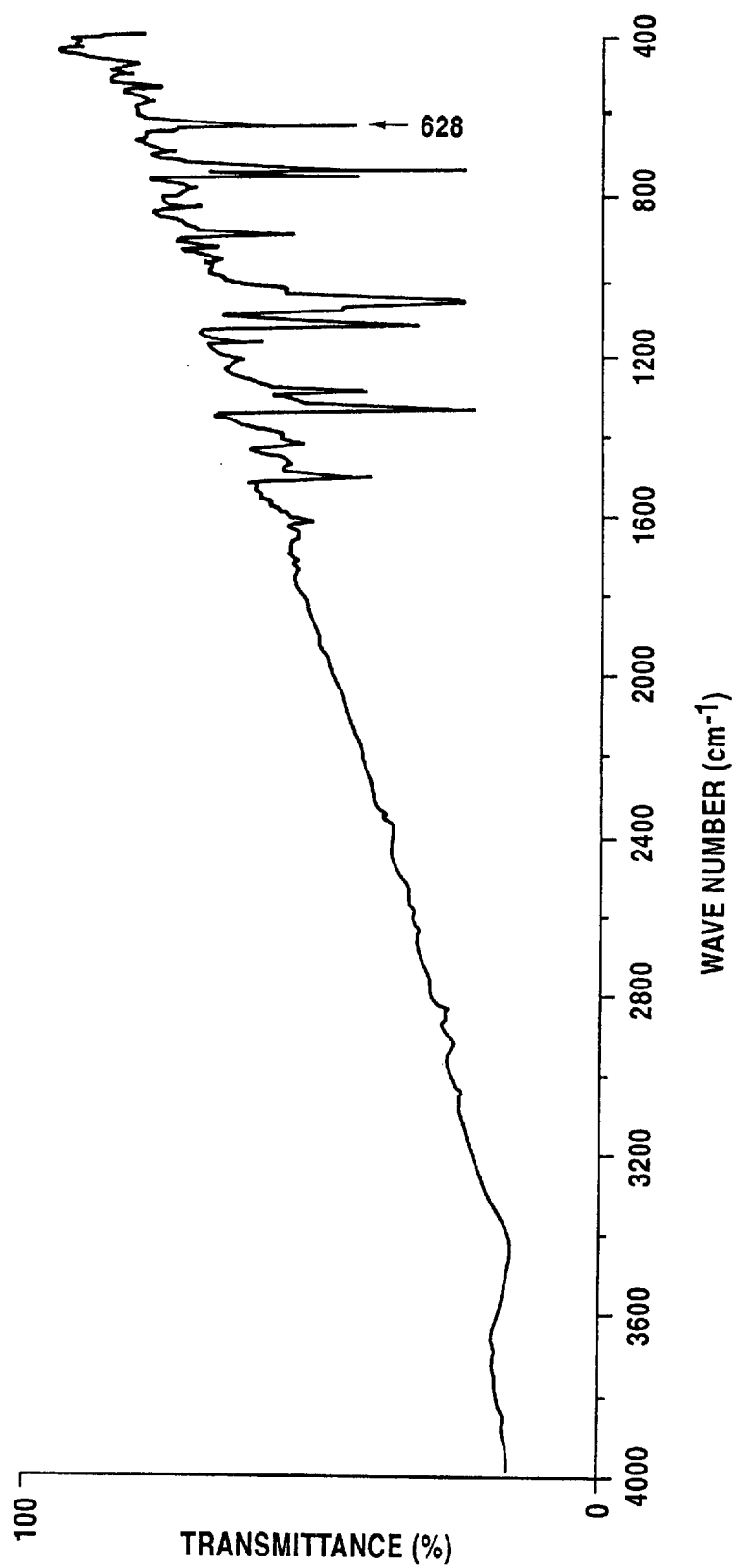
FIG. 27 is a graph showing the IR absorption spectrum of the phthalocyanine compound used for the organic photoconductor in Comparative Example 2.
Figure 28:
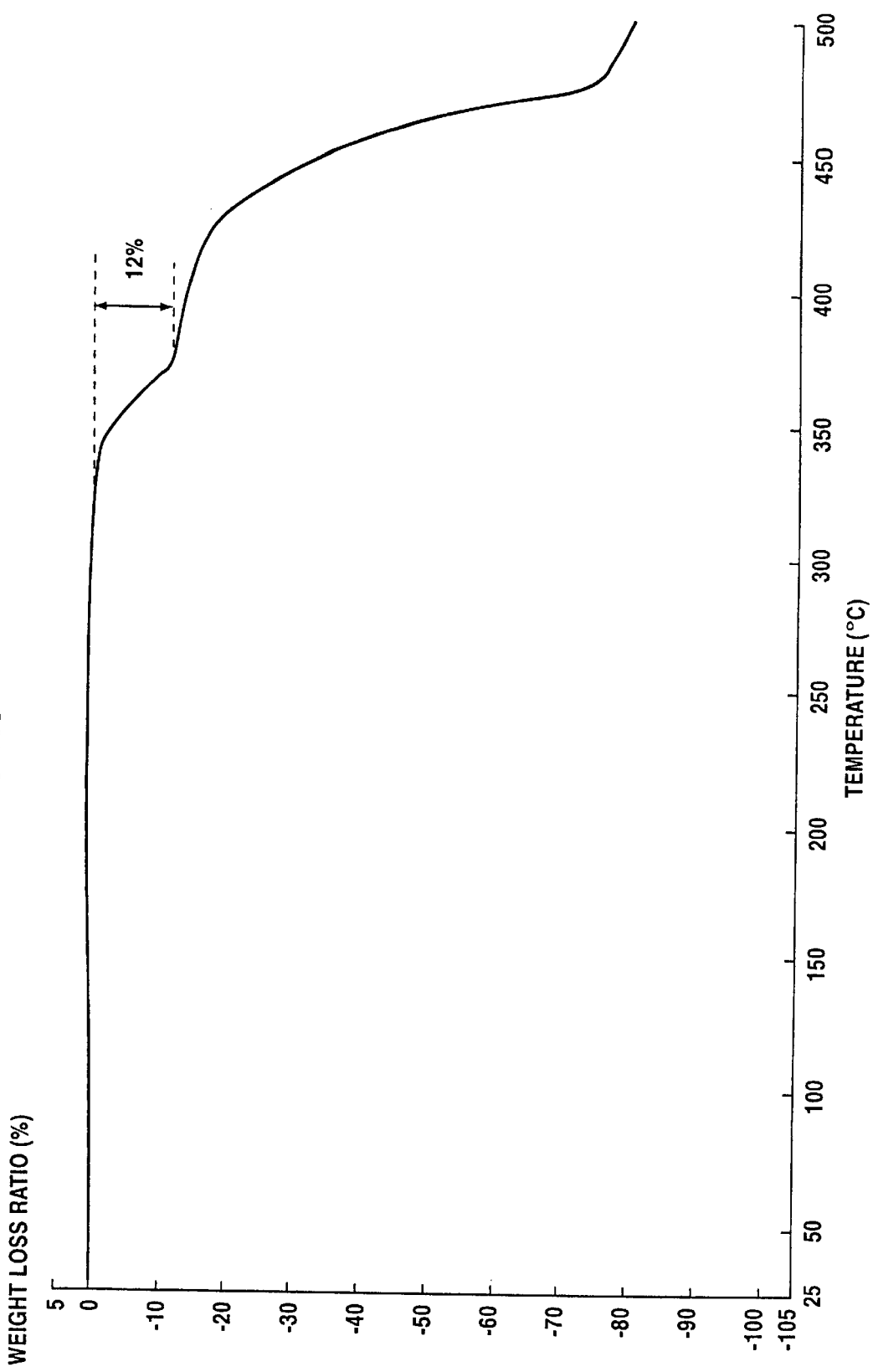
FIG. 28 is a graph showing the pyrolysis curve of the phthalocyanine compound used for the organic photoconductor in Comparative Example 2.
Figure 29:
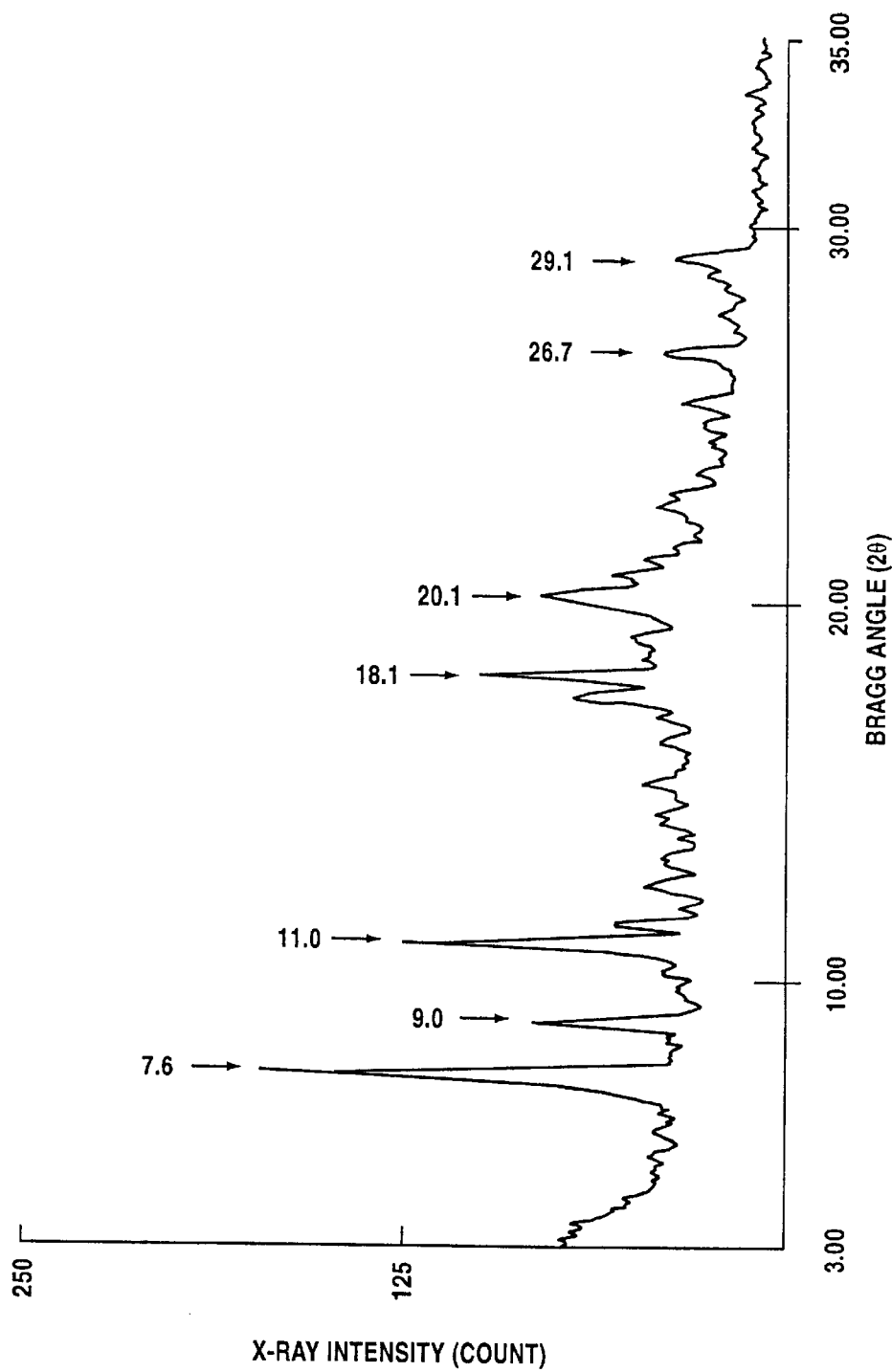
FIG. 29 is the X-ray diffraction diagram of the thin film obtained by dip-coating a resin dispersed liquid of the phthalocyanine compound of the present invention prepared in Comparative Example 2 on a thin metal plate.

(XVIII)

showing the peak at m/Z of 620 in the mass spectrum, showing the spectrum of FIG. 26 in the powder X-ray diffraction by the Cu Kα line, showing the spectrum of FIG. 27 in the IR spectrum, and showing the pyrolysis curve of FIG. 28 in the thermogravimetry obtained by using ethylene glycol in place of (2R,3R)-(−)-2,3-butanediol of Example 1 was used, an organic photoconductor wad prepared. Also, the X-ray diffraction spectrum of the thin film of 5 μm thick obtained by dip-coating the charge generating material dispersion obtained in the comparative example on a thin metal plate is shown in FIG. 29.

About each of the organic photoconductors obtained in Examples 3, 4, 5, 6, and 7 and Comparative Examples 1 and 2, the organic photoconductor was electrostatically charged by corona discharging of −6 kV in the dark using an electrostatic copying paper test apparatus ("SP 428", trade name, made by Kawaguchi Denki Seisaku Sho) and the surface potential of each organic photoconductor in this case is defined as $V_0(-V)$. Then, the surface potential of each organic photoconductor in the case of allowing to stand the organic photoconductor as it is for 10 seconds in the dark is defined as $V_{10}(-V)$.

From $V_0$ and $V_{10}$, the potential retention (DDR) (%) for the surface potential of each organic photoconductor is calculated. Furthermore, each organic photoconductor having the surface potential $V_{10}$ is exposed with light having a wavelength of 780 nm and an exposure energy of 1 μW/cm² and from the time until the surface potential becomes a half of $V_{10}$, a half decay exposure amount $E_{1/2}$ (PJ/cm²) is obtained. The measurement results of the dark decay and the light decay of the surface potential are shown in Table 3 below.

TABLE 3

|  | $V_0(-V)$ | $V_{10}(-V)$ | DDR (%) | $E_{1/2}(\mu J/cm^2)$ |
|---|---|---|---|---|
| Example 3 | 954 | 811 | 85 | 0.40 |
| Example 4 | 950 | 789 | 83 | 0.38 |
| Example 5 | 952 | 800 | 84 | 0.39 |
| Example 6 | 950 | 798 | 84 | 0.37 |
| Example 7 | 952 | 790 | 83 | 0.37 |
| Comparative Example 1 | 932 | 746 | 80 | 2.07 |

TABLE 3-continued

|  | $V_0(-V)$ | $V_{10}(-V)$ | DDR (%) | $E_{1/2}(\mu J/cm^2)$ |
|---|---|---|---|---|
| Comparative Example 2 | 955 | 812 | 85 | 2.10 |

EXAMPLE 8

By following the same procedure as Example 1 except that 8.8 parts of (2R,3R)-(−)-2,3-butanediol was used in place of 4.4 parts of (2R,3R)-(−)-2,3-butanediol, a blue crystal powder was obtained.

Figure 30:
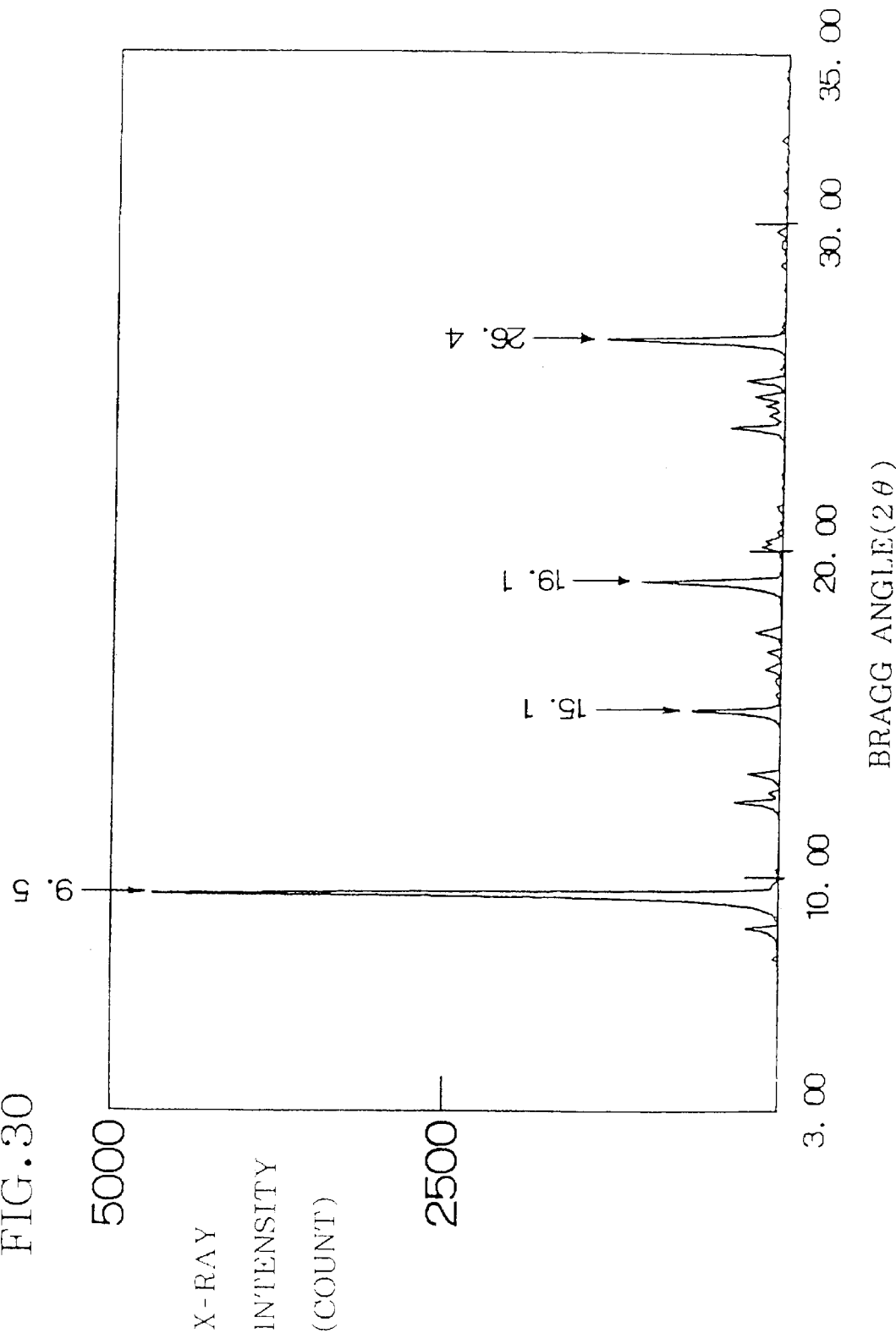
FIG. 30 is the powder X-ray diffraction diagram by a Cu $K_\alpha$ line of the phthalocyanine compound used for the monolayer organic photoconductor of the present invention in Example 8.
Figure 31:
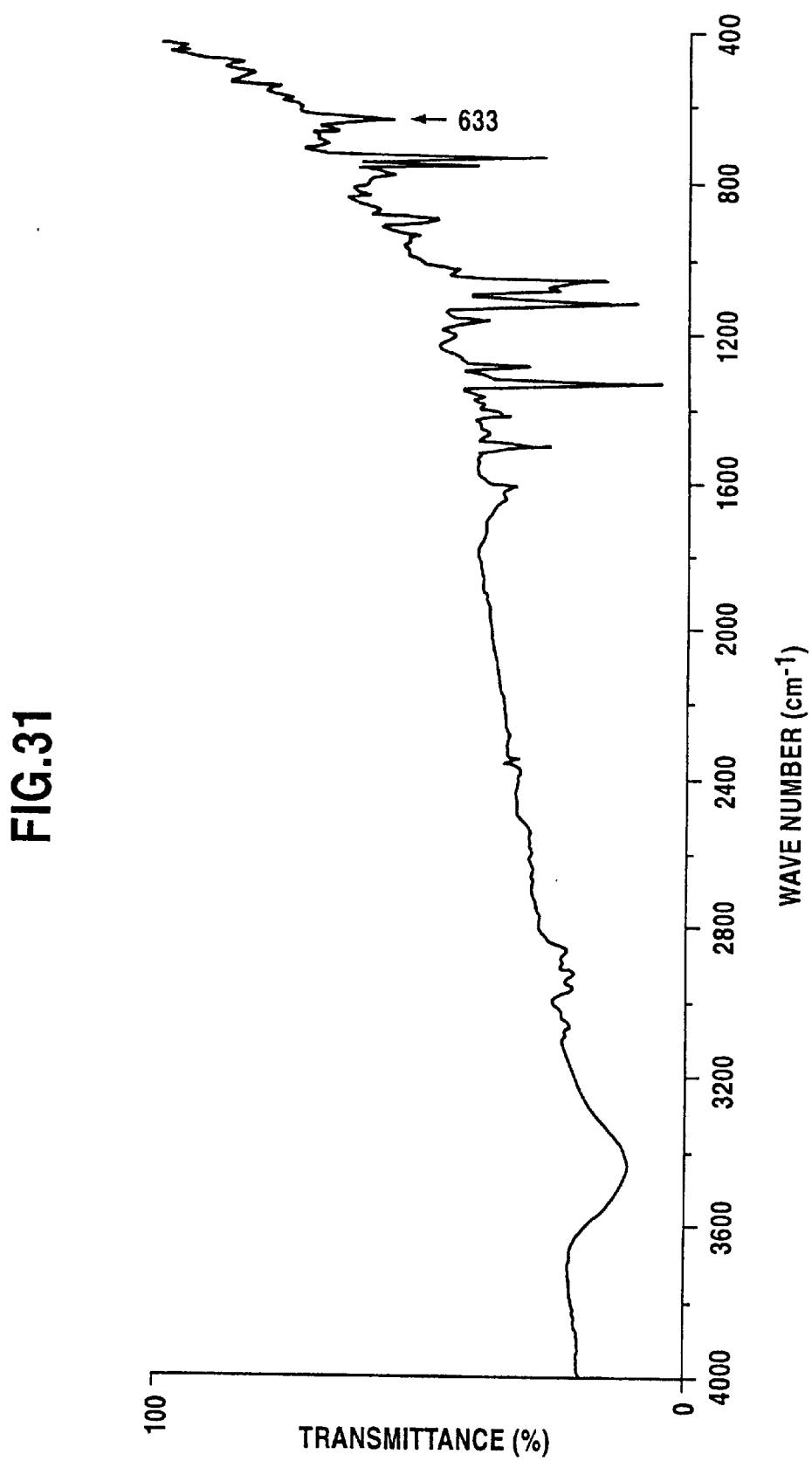
FIG. 31 is a graph showing the IR absorption spectrum of the phthalocyanine compound used for the monolayer organic photoconductor of the present invention in Example 8.

It can be seen that since the product obtained shows the peak at m/Z=648 in the mass spectrum, the spectrum of FIG. 30 in the powder X-diffraction by the Cu Kα line, and the spectrum of FIG. 31 in the IR absorption, the product is the phthalocyanine compound of formula (XV) shown above.

To a mixed liquid of 15 parts of a polyester resin ("VYLON", trade name, made by TOYOBO CO., LTD.), 51 parts of dichloromethane, and 34 parts of 1,1,2-trichloroethane was added 3 parts of the crystal powder obtained and the mixture was dispersed and mixed by a paint conditioner together with glass beads to provide a dispersion. The dispersion was coated on a polyester film having an aluminum layer formed thereon by vapor deposition with a wire bar and dried to form a photosensitive layer having a dry thickens of from 12 to 13 μm to provide a monolayer-type organic photoconductor having the form shown in FIG. 4.

EXAMPLE 9

By following the same procedure as Example 8 except that 3 parts of the mixed crystal product obtained in Example 6, a monolayer-type organic photoconductor was prepared.

EXAMPLE 10

By following the same procedure as Example 1 except that 12.6 parts of (2S,3S)-(−)-1,4-bis(benzyloxy)-2,3-butanediol in place of 4.4 parts of (2R,3R)-(−)-2,3-butanediol, a blue crystal powder was obtained.

Figure 32:
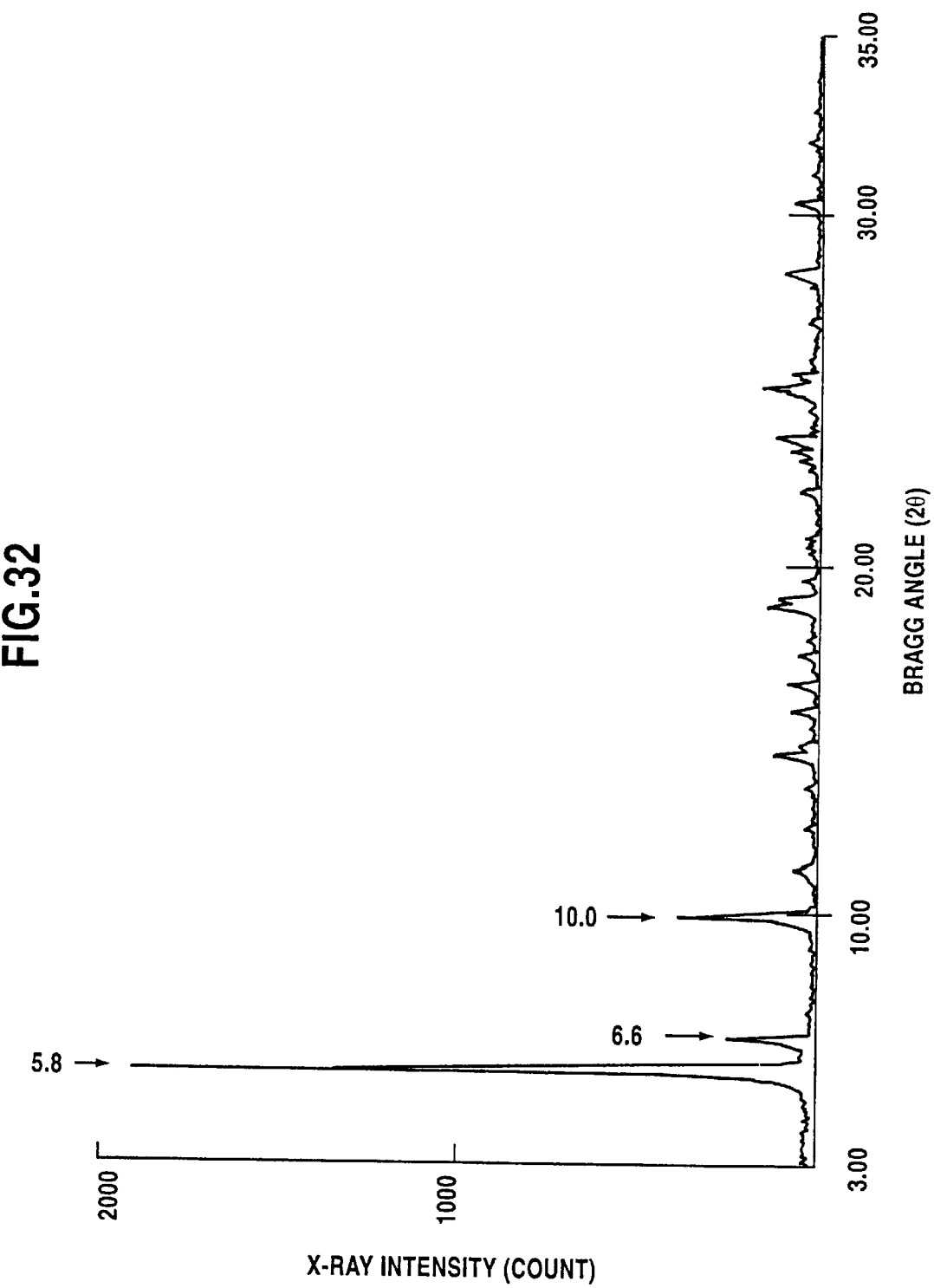
FIG. 32 is the powder X-ray diffraction diagram by a Cu $K_\alpha$ line of the phthalocyanine compound used for the monolayer organic photoconductor of the present invention in Example 10.
Figure 33:
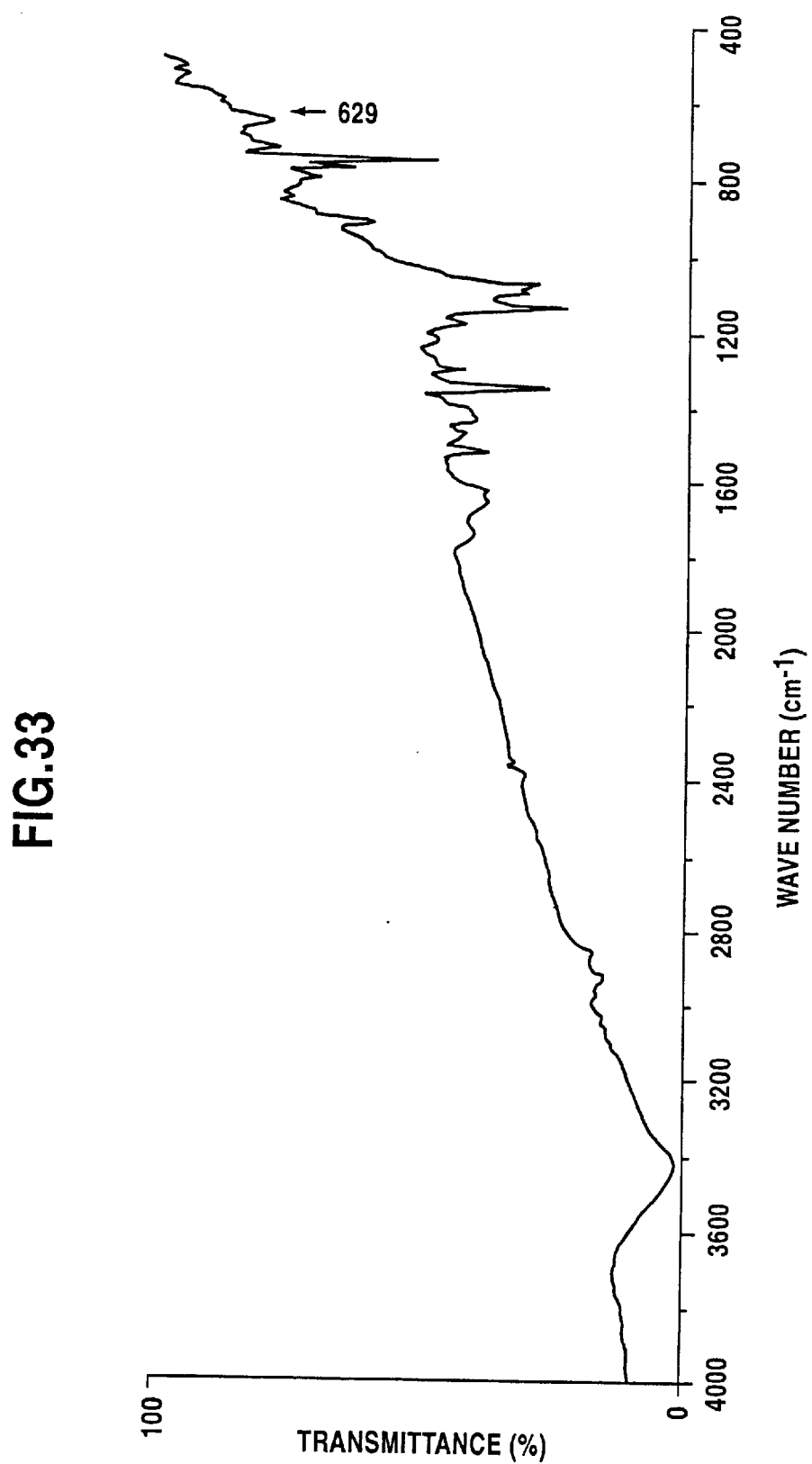
FIG. 33 is a graph showing the IR absorption spectrum of the phthalocyanine compound used for the monolayer organic photoconductor of the present invention in Example 10.

It can be seen that since the product shows the peak at m/Z=860 in the mass spectrum, shows the spectrum of FIG. 32 in the powder X-ray diffraction by the Cu Kα line, and shows the spectrum of FIG. 33 in the IR absorption, the product is the addition product of the phthalocyanine compound shown in formula (XIX);

(XIX)

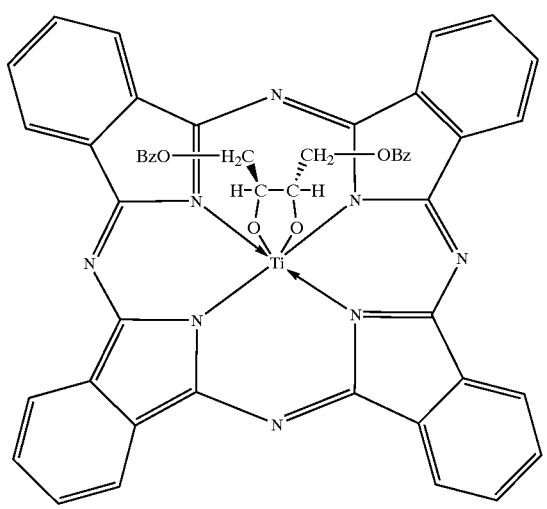

wherein Bz represents a benzyl group.

Furthermore, by following the same procedure as Example 8 except that 3 parts of the addition product crystal powder thus obtained, a monolayer-type organic photoconductor was prepared.

COMPARATIVE EXAMPLE 3

By following the same procedure as Example 8 except that 3 parts of the oxytitanium phthalocyanine crystal powder used for obtaining the phthalocyanine compound in Example 1 were used in place of the addition product crystal powder of the phthalocyanine compound (XV), a monolayer-type organic photoconductor was prepared.

Each of the organic photoconductors obtained in Examples 8, 9, and 10 and Comparative Example 3 was electrostatically charged by corona discharging of +6 kV in the dark using an electrostatic copying paper test apparatus ("SP 428", trade name, made by Kawaguchi Denki Seisaku Sho) and the surface potential of each organic photoconductor in this case is defined as $V_0$ (V). Also, the surface potential of each organic photoconductor in the case of allowing to stand the organic photoconductor as it is for 10 seconds in the dark is defined as $V_{10}$ (V). From $V_0$ and $V_{10}$, the potential retention (DDR) (%) for the surface potential of the organic photoconductor is calculated. Furthermore, each organic photoconductor having the surface potential of $V_{10}$ is exposed by light having a wavelength of 780 nm and an exposure energy of 1 $\mu J/cm^2$ and from the time until the surface potential becomes a half of $V_{10}$, the half decay exposure amount $E_{1/2}$ ($\mu J/cm^2$) is obtained.

The measurement results of the dark decay and the light decay of the surface potential are shown in Table 4 below.

TABLE 4

|  | $V_0(V)$ | $V_{10}(V)$ | DDR (%) | $E_{1/2}(\mu J/cm^2)$ |
|---|---|---|---|---|
| Example 8 | 523 | 482 | 92 | 0.78 |
| Example 9 | 485 | 427 | 88 | 0.76 |
| Example 10 | 486 | 455 | 94 | 0.85 |
| Comparative Example 3 | 462 | 404 | 87 | 1.51 |

Effect of the Invention

The phthalocyanine compound of the present invention has a specifically remarkable effect that the absorption wavelength exists in a longer wavelength region owing to the specific structure. Accordingly, the phthalocyanine compound is very useful as an absorption material for long wavelength near infrared rays. Furthermore, the phthalocyanine compound can be expected as photoelectric functional materials and various recording and memory materials such as solar cells, optical sensors, EL elements, optical discs, etc.

Moreover, since the multilayer-type or monolayer-type organic photoconductor of the present invention comprises the phthalocyanine compound having the specific isomer structure, the organic photoconductor has excellent sensitivity characteristics and is very useful for practical use.

While the invention has been described in detail and with reference to specific embodiments thereof, it will be apparent to one skilled in the art that various changes and modifications can be made therein without departing from the spirit and scope thereof.

What is claimed is:

1. A reaction product obtained by reacting (a) (2R,3R)-(–)-2,3-butanediol with (b) an oxytitanium phthalocyanine compound, wherein said reaction product shows largest main peak at the Bragg angle (2θ±0.2°) of 8.3° in the X-ray diffraction spectrum to CuKα.

2. The reaction product according to claim 1, wherein said reaction product further shows main peaks at the Bragg angle (2θ±0.2°) of at least 24.7° and 25.1° in the X-ray diffraction spectrum to CuKα.

3. A method for producing a reaction product comprising reacting (a) an optically active threo-butanediol having one hydroxy group per each of the two adjacent carbon atoms, said carbon atoms each being a secondary carbon atom with (b) an α-type oxytitanium phthalocyanine compound in a molar ratio of the diol to the oxytitanium phthalocyanine of from 0.5 to 1.5.

4. The method for producing a reaction product according to claim 3, wherein said threo-butanediol (a) is (2R, 3R)-(–)-2,3-butanediol or (2S, 3S)-(+)-2,3-butanediol.

5. A dispersion comprising a reaction product obtained by reacting (a) an optically active threo-butanediol having one hydroxy group per each of the two adjacent carbon atoms, said carbon atoms each being a secondary carbon atom, with (b) an oxytitanium phthalocyanine compound, said reaction product being dispersed in a dispersion medium, wherein said reaction product is obtained by the method of claim 3.

6. An organic photoconductor comprising a photosensitive layer and an electroconductive support, wherein said photosensitive layer comprises as a change generating material a reaction product produced by the method of claim 3.

7. A layer of dispersion comprising a reaction product produced by the method of claim 3.

8. A dispersion comprising a reaction product obtained by reacting (a) an optically active threo-alkanediol having one hydroxy group per each of the two adjacent carbon atoms, said carbon atoms each being a secondary carbon atom, with (b) an oxytitanium phthalocyanine compound, said reaction product being dispersed in a dispersion medium, wherein said reaction product shows a largest main peak at the Bragg angle (2θ±0.2°) of 8.3° or 24.7°.

9. A layer of dispersion formed by using the dispersion according to claim 8, which shows a largest main peak at the Bragg angle (2θ±0.2°) of 8.3° in the X-ray diffraction spectrum to CuKα.

10. An organic photoconductor comprising a photosensitive layer and an electroconductive support, wherein said photosensitive layer comprises as a charge generating material a reaction product obtained by reacting (a) (2R, 3R)-(−)-2,3-butanediol with (b) an oxytitanium phthocyanine compound, wherein said photosensitive layer shows a largest main peak at the Bragg angle (2θ±0.2°) of 8.3° in the X-ray diffraction spectrum to CuKα, wherein said reaction product shows a largest main peak at the Bragg angle (2θ±0.2°) of 24.7° in the X-ray diffraction spectrum to CuKα and is dispersed in said photosensitive layer.

11. A reaction product obtained by reacting (a) (2R, 3R)-(−)-2,3-butanediol with (b) an oxytitanium phthalocyanine compound, wherein said reaction product shows a largest main peak at the Bragg angle (2θ±0.2°) of 24.7° in the X-ray diffraction spectrum to CuKα.

* * * * *